US011953843B2

(12) United States Patent
Nodera et al.

(10) Patent No.: US 11,953,843 B2
(45) Date of Patent: Apr. 9, 2024

(54) POWDER CONTAINER, POWDER SUPPLY DEVICE, AND IMAGE FORMING APPARATUS INCLUDING SAME

(71) Applicant: Ricoh Company, Ltd., Tokyo (JP)

(72) Inventors: Kentaro Nodera, Kanagawa (JP); Emi Kita, Osaka (JP); Akihiro Takayama, Kanagawa (JP); Susumu Tateyama, Ibaraki (JP); Shinnosuke Koshizuka, Kanagawa (JP); Tatsuya Kubo, Kanagawa (JP); Teppei Kikuchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/863,424

(22) Filed: Jul. 13, 2022

(65) Prior Publication Data

US 2022/0342347 A1 Oct. 27, 2022

Related U.S. Application Data

(60) Continuation of application No. 17/103,007, filed on Nov. 24, 2020, now Pat. No. 11,422,483, which is a (Continued)

(30) Foreign Application Priority Data

Mar. 15, 2012 (JP) ................................ 2012-059279
Dec. 18, 2012 (JP) ................................ 2012-275672

(51) Int. Cl.
*G03G 15/08* (2006.01)

(52) U.S. Cl.
CPC ..... *G03G 15/0865* (2013.01); *G03G 15/0867* (2013.01); *G03G 15/0868* (2013.01); *G03G 15/0879* (2013.01); *G03G 15/0886* (2013.01)

(58) Field of Classification Search
CPC .......... G03G 15/0886; G03G 15/0865; G03G 15/0867; G03G 15/0868; G03G 15/0879
See application file for complete search history.

(56) References Cited

U.S. PATENT DOCUMENTS 4,611,899 A 9/1986 Kasamura et al.
5,091,750 A 2/1992 Yoshida et al.
(Continued)

FOREIGN PATENT DOCUMENTS

CN 1532646 A 9/2004
CN 101251737 A 8/2008
(Continued)

OTHER PUBLICATIONS

Office Action dated Dec. 10, 2021 in Taiwanese Patent Application No. TW109141008, 9 pages.
(Continued)

*Primary Examiner* — Victor Verbitsky
(74) *Attorney, Agent, or Firm* — XSENSUS LLP

(57) ABSTRACT

A powder container includes a powder chamber for containing powder for forming images, a powder outlet formed in a face of the powder container, and a shutter assembly to open and close the powder outlet and including first and second shutters. The first shutter is movable between a sealing position to close the powder outlet and an open position to open the powder outlet and includes a pressed member to cancel retention of the first shutter at the sealing position. The second shutter includes a pressing projection that interferes with the pressed member of the first shutter and is movable between a shielding position to cover the pressed member without interference between the pressing projection and the pressed member and a releasing position to press the pressed member with the pressing projection.

7 Claims, 51 Drawing Sheets

Related U.S. Application Data division of application No. 16/792,302, filed on Feb. 17, 2020, now Pat. No. 10,871,729, which is a continuation of application No. 16/171,633, filed on Oct. 26, 2018, now Pat. No. 10,606,187, which is a division of application No. 15/690,974, filed on Aug. 30, 2017, now Pat. No. 10,146,154, which is a continuation of application No. 15/247,342, filed on Aug. 25, 2016, now Pat. No. 9,835,977, which is a division of application No. 14/823,624, filed on Aug. 11, 2015, now Pat. No. 9,459,556, which is a division of application No. 13/783,528, filed on Mar. 4, 2013, now Pat. No. 9,146,497.

(56) References Cited

U.S. PATENT DOCUMENTS

| | | | |
|---|---|---|---|
| 5,294,963 | A | 3/1994 | Nakano et al. |
| 5,812,914 | A | 9/1998 | Johroku |
| 6,151,459 | A | 11/2000 | Hashimoto et al. |
| 6,564,029 | B2 | 5/2003 | Kojima et al. |
| 7,106,995 | B2 | 9/2006 | Nagai et al. |
| 7,447,470 | B2 | 11/2008 | Lee |
| 7,590,338 | B2 | 9/2009 | Mihara |
| 7,801,468 | B2 | 9/2010 | Shimomura |
| 8,693,925 | B2 | 4/2014 | Horii et al. |
| 9,146,497 | B2 | 9/2015 | Nodera et al. |
| 2004/0190944 | A1 | 9/2004 | Kita |
| 2005/0025528 | A1 | 2/2005 | Nagai et al. |
| 2005/0084296 | A1 | 4/2005 | Takuwa |
| 2006/0009012 | A1 | 5/2006 | Kita et al. |
| 2006/0285885 | A1 | 12/2006 | Lee |
| 2007/0077098 | A1 | 4/2007 | Katsuyama et al. |
| 2007/0122204 | A1 | 5/2007 | Kita |
| 2007/0122205 | A1 | 5/2007 | Taguchi et al. |
| 2007/0140747 | A1 | 6/2007 | Kita et al. |
| 2007/0154243 | A1 | 7/2007 | Taguchi et al. |
| 2007/0212119 | A1 | 9/2007 | Kurenuma et al. |
| 2007/0242983 | A1 | 10/2007 | Sano |
| 2008/0016777 | A1 | 1/2008 | Miyamoto et al. |
| 2008/0175828 | A1 | 7/2008 | Kita et al. |
| 2008/0181630 | A1 | 7/2008 | Matsumoto et al. |
| 2008/0199224 | A1 | 8/2008 | Pani et al. |
| 2008/0247786 | A1 | 10/2008 | Nakayama et al. |
| 2008/0279592 | A1 | 11/2008 | Matsumoto et al. |
| 2009/0074432 | A1 | 3/2009 | Kita et al. |
| 2009/0087214 | A1 | 4/2009 | Utsunomiya et al. |
| 2009/0142103 | A1 | 6/2009 | Chaudhuri et al. |
| 2009/0263164 | A1 | 10/2009 | Koeda et al. |
| 2010/0296847 | A1 | 11/2010 | Kurenuma et al. |
| 2011/0052266 | A1* | 3/2011 | Yoon .................. G03G 15/0886 399/258 |
| 2011/0068867 | A1 | 3/2011 | Hori et al. |
| 2011/0082266 | A1 | 3/2011 | Yoon et al. |
| 2011/0123232 | A1 | 5/2011 | Takashima et al. |
| 2011/0164898 | A1 | 7/2011 | Isomura et al. |
| 2011/0243579 | A1 | 10/2011 | Oshikawa et al. |
| 2011/0280619 | A1 | 11/2011 | Itabashi |
| 2012/0121286 | A1 | 5/2012 | Yagi et al. |
| 2012/0183877 | A1 | 6/2012 | Kikuchi et al. |

FOREIGN PATENT DOCUMENTS

| | | | |
|---|---|---|---|
| CN | 101308854 | A | 4/2009 |
| EP | 0514666 | A2 | 11/1992 |
| EP | 2 290 481 | A2 | 8/2011 |
| EP | 2. 388 660 | A2 | 11/2011 |
| JP | 08-287905 | A | 11/1991 |
| JP | 2004302020 | | 10/2004 |
| JP | 2011-078064 | A | 4/2011 |
| TW | 201209529 | A | 3/2012 |

OTHER PUBLICATIONS

Chinese Office Action dated Apr. 2, 2019, issued in corresponding Chinese Patent Application No. 201610280479.8, 8 pages.

Office Action issued in Chinese Application No. 201310080838.1, dated Nov. 15, 2014.

Extended European Search Report issued in European Application No. 13156659.8 dated Apr. 11, 2017.

Combined Office Action and Search Report dated Dec. 21, 2017 in Taiwanese Application No. 108132137 (with English language translation of Office Action and English translation of categories of cited documents), 5 pages.

Extended European Search Reported dated Jun. 29, 2020, issued in corresponding European Patent Application No. 20168446.1, 7 pages.

* cited by examiner

POWDER CONTAINER, POWDER SUPPLY DEVICE, AND IMAGE FORMING APPARATUS INCLUDING SAME

CROSS-REFERENCE TO RELATED APPLICATIONS

This application is a continuation of U.S. application Ser. No. 17/103,007, filed Nov. 24, 2020, which is a divisional of U.S. application Ser. No. 16/792,302, filed Feb. 17, 2020 (now U.S. Pat. No. 10,871,729), which is a continuation of U.S. application Ser. No. 16/171,633, filed Oct. 26, 2018 (now U.S. Pat. No. 10,606,187), which is a divisional of U.S. application Ser. No. 15/690,974, filed Aug. 30, 2017 (now U.S. Pat. No. 10,146,154), which is a continuation of U.S. application Ser. No. 15/247,342, filed Aug. 25, 2016 (now U.S. Pat. No. 9,835,977), which is a divisional of U.S. application Ser. No. 14/823,624, filed Aug. 11, 2015 (now U.S. Pat. No. 9,459,556), which is a divisional of U.S. application Ser. No. 13/783,528, filed Mar. 4, 2013 (now U.S. Pat. No. 9,146,497), which is based on and claims priority pursuant to 35 U.S.C. § 119 to Japanese Patent Application Nos. 2012-059279, filed Mar. 15, 2012, and 2012-275672, filed Dec. 18, 2012, in the Japan Patent Office. The entire disclosures of each of the above are hereby incorporated by reference herein.

BACKGROUND OF THE INVENTION

Field of the Invention

The present invention generally relates to a powder container for containing powder for image formation, supplied to an image forming apparatus, such as, a copier, a printer, a facsimile machine, or a multifunction machine including at least two of these functions; a supply device to supply powder from the powder container; and an image forming apparatus including same.

Description of the Related Art

There are image forming apparatuses that develop electrostatic latent images formed on a latent image bearer by a development device using developer such as toner, thereby forming images. In such image forming apparatuses, toner inside the development device is consumed in image formation. Accordingly, a toner container serving as a powder container is typically used to contain toner supplied to the development device.

For example, JP-2011-076064-A proposes a toner container, as a powder container, employing a slidable shutter to close a toner outlet formed therein. Specifically, when the shutter is positioned to cover the toner outlet, a stopper provided to the shutter is latched to the toner container, thereby preventing movement of the shutter. The stopper can be released by pushing a releasing member therefor. Thus, the shutter can be prevented from being moved accidentally from the toner outlet. Therefore, users can be inhibited from accidentally opening the toner outlet, and scattering of toner from the toner outlet can be inhibited.

SUMMARY OF THE INVENTION

In view of the foregoing, one embodiment of the present invention provides a powder container that includes a powder chamber for containing powder, a powder outlet formed in a face of the powder container, and a shutter assembly configured to open and close the powder outlet and including first and second shutters. The first shutter is movable between a sealing position to close the powder outlet and an open position to open the powder outlet and includes a pressed member to cancel retention of the first shutter at the sealing position. The second shutter includes a pressing projection that interferes with the pressed member of the first shutter. The second shutter is movable between a shielding position to cover the pressed member without interference between the pressing projection and the pressed member and a releasing position to press the pressed member with the pressing projection.

Another embodiment provides a powder supply device to which powder is supplied from the powder container described above and further characterized in that the first and second shutters of the powder container are planar, parallel to the face in which the powder outlet is formed, and move parallel to a predetermined installation direction.

The powder supply device includes a container mount to which the powder container is removably mountable. The container mount includes a first recess to receive the first shutter being at the sealing position, a second recess to receive the second shutter being at the shielding position, and an inlet rim enclosing a powder inlet though which powder is supplied from the powder container to the powder supply device. The inlet rim and the first recess of the together create a first step that interferes with the first shutter in the predetermined installation direction without interfering with the powder chamber of the powder container. The first and second recesses together create a second step that interferes with the second shutter in the predetermined installation direction without interfering with the powder chamber and the first shutter.

Yet another embodiment provides an image forming apparatus including an image forming unit to form images, and the above-described powder supply device.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
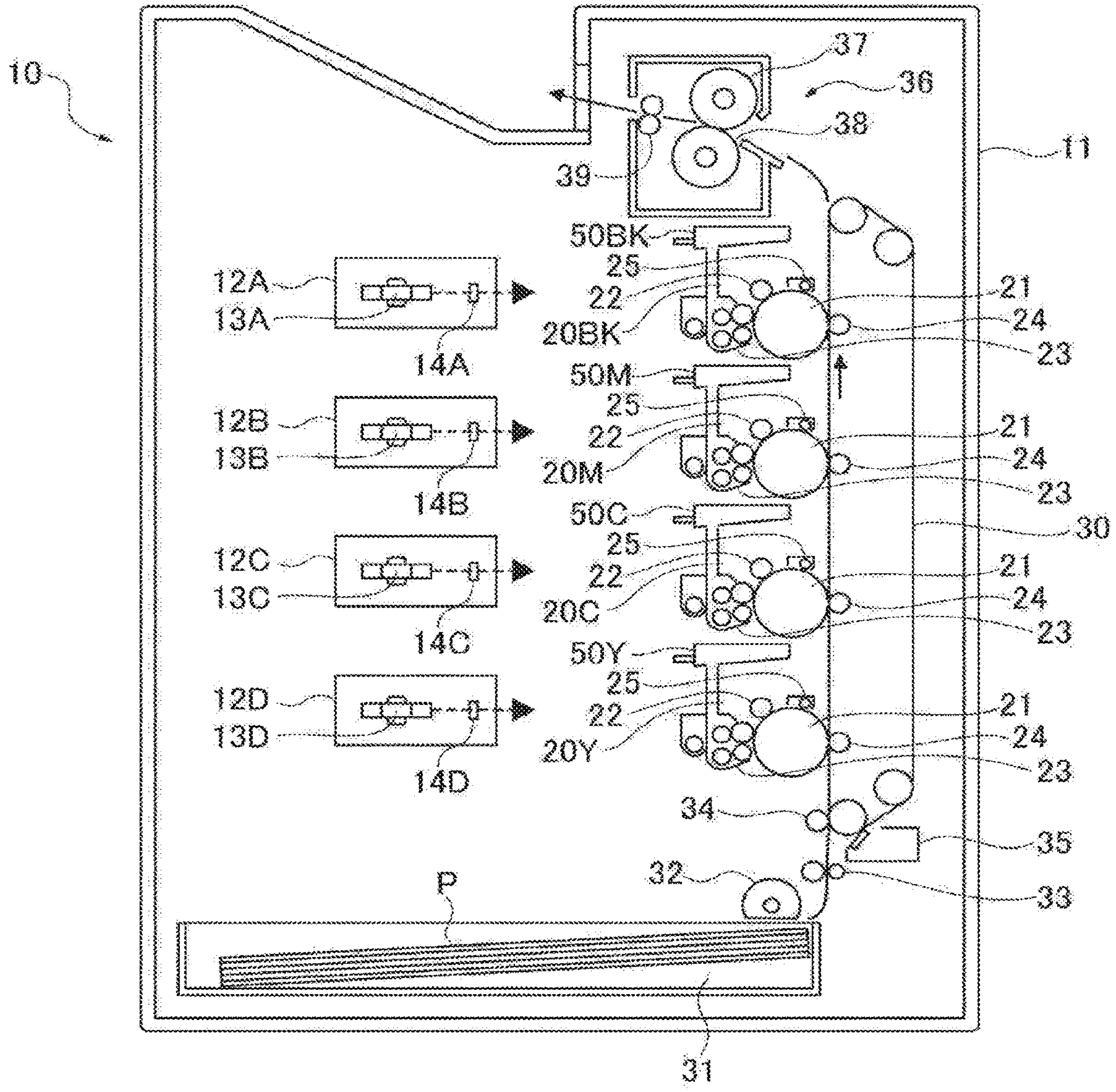
FIG. 1 is a schematic front view of an image forming apparatus according to an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, a multicolor image forming apparatus according to an embodiment of the present invention is described.

First Embodiment

Initially, a configuration and operation of an image forming apparatus 10 according to the present embodiment is described below. The image forming apparatus 10 shown in FIG. 1 can be a multicolor printer and includes a box-shaped apparatus body 11 serving as a housing.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary.

The image forming apparatus 10 includes writing units 12A through 12D to write electrostatic latent images on photoreceptor drums 21 according to image data after a charging process. The writing units 12A through 12D can be optical scanning devices employing polygon mirrors 13A through 13D, optical elements 14A through 14D, and the like. Alternatively, an array of light-emitting diodes (LED) may be used as the writing units instead. The electrostatic latent images formed by the writing units 12A through 12D are developed and transferred onto transfer sheets P (hereinafter simply "sheets P) serving as recording media. The sheets P can be recording paper, overhead project (OHP) films and stacked in a sheet feeder 31.

In image formation, the sheets P contained in the sheet feeder 31 are sent out from the top to a transfer belt 30 as a feed roller 32 rotates. The transfer belt 30 is an endless belt and adsorbs the sheet P electrostatically onto its surface and transports the sheet P to the photoreceptor drum 21. An adsorbing roller 34 and a belt cleaning device 35 are provided on an outer circumferential surface of the transfer belt 30.

The photoreceptors drums 21 face respective transfer rollers 24 via the transfer belt 30. Each transfer roller 24 includes a metal core and a conductive elastic layer covering the metal core. The conductive elastic layer of the transfer roller 24 is constructed of an elastic material such as polyurethane rubber or ethylene-propylene-diene polyethylene (EPDM), and its electrical resistance value (volume resistivity) is adjusted to a medium value with dispersion of a conductive applicator such as carbon black, zinc oxide, tin oxide, or the like. A fixing device 36 is provided above the transfer belt 30 in FIG. 1. The fixing device 36 includes a pressure roller 37 and a heating roller 38 to fix the toner image on the sheet P with heat and pressure.

In FIG. 1, four process cartridges 20Y, 20C, 20M, and 20BK are arranged vertically along the transfer belt 30. The four process cartridges 20 form yellow, cyan, magenta, and black toner images. Above the process cartridges 20Y, 20C, 20M, and 20BK, toner cartridges 50Y, 50C, 50M, and 50BK serving as powder containers are provided. The toner cartridges 50Y, 50C, 50M, and 50BK contain and supply carrier (magnetic carrier particles) and yellow; cyan, magenta, and black toner (i.e., toner particles) to respective development devices 23. The writing units 12, the photoreceptor drums 21, and the development devices 23 can together serve as an image forming unit to form images.

The process cartridges 20 and the toner cartridges 50 can be mounted in the apparatus body 11 and removed therefrom when the transfer belt 30 is rotated around a rotation shaft.

When the image forming apparatus 10 performs copying, image data is read by, for example, a scanner, and image processing, such as analog to digital conversion, MTF (Modulation Transfer Factor) correction, gradation processing, is performed. When the image forming apparatus 10 functions as a printer, image data in the form of page description language (PDL), bitmap, or the like transmitted from a computer or the like is processed into image writing data.

The writing units 12A through 12D emit exposure light according to image data of black, magenta, cyan, and yellow to the respective process cartridges 20. The exposure light (i.e., laser beams) emitted from light sources of the writing units 12A through 12D is directed to the photoreceptor drums 21 via the polygon mirrors 13A to 13D and the optical elements 14A to 14D, forming latent images.

The sheet P fed from the sheet feeder 31 is timed at a pair of registration rollers 33 and then forwarded to the transfer belt 30. Specifically, the registration rollers 33 are driven, timed to coincide with the passage of the toner image formed on the photoreceptor drum 21. The adsorbing roller 34 disposed at an entry position of the transfer belt 30 adsorbs the sheet P onto the transfer belt 30 by application of voltage. Then, the sheet P moves as the transfer belt 30 rotates in the direction indicated by arrow shown in FIG. 1. While the sheet P passes by the process cartridges 20 sequentially, respective color toners are superimposed one on another thereon.

Subsequently, the sheet P is separated from the transfer belt 30 and reaches the fixing device 36. The toner image is fixed on the sheet P while the sheet P is sandwiched and heated between the pressure roller 37 and the heating roller 38. Then, the surface of the transfer belt 30 is cleaned by the belt cleaning device 35.

The process cartridges and the toner cartridges are described below. It is to be noted that the writing devices 20A through 20D have a similar configuration, and hereinafter the suffixes A through D attached to the reference numeral thereof are omitted for simplicity.

Figure 2:
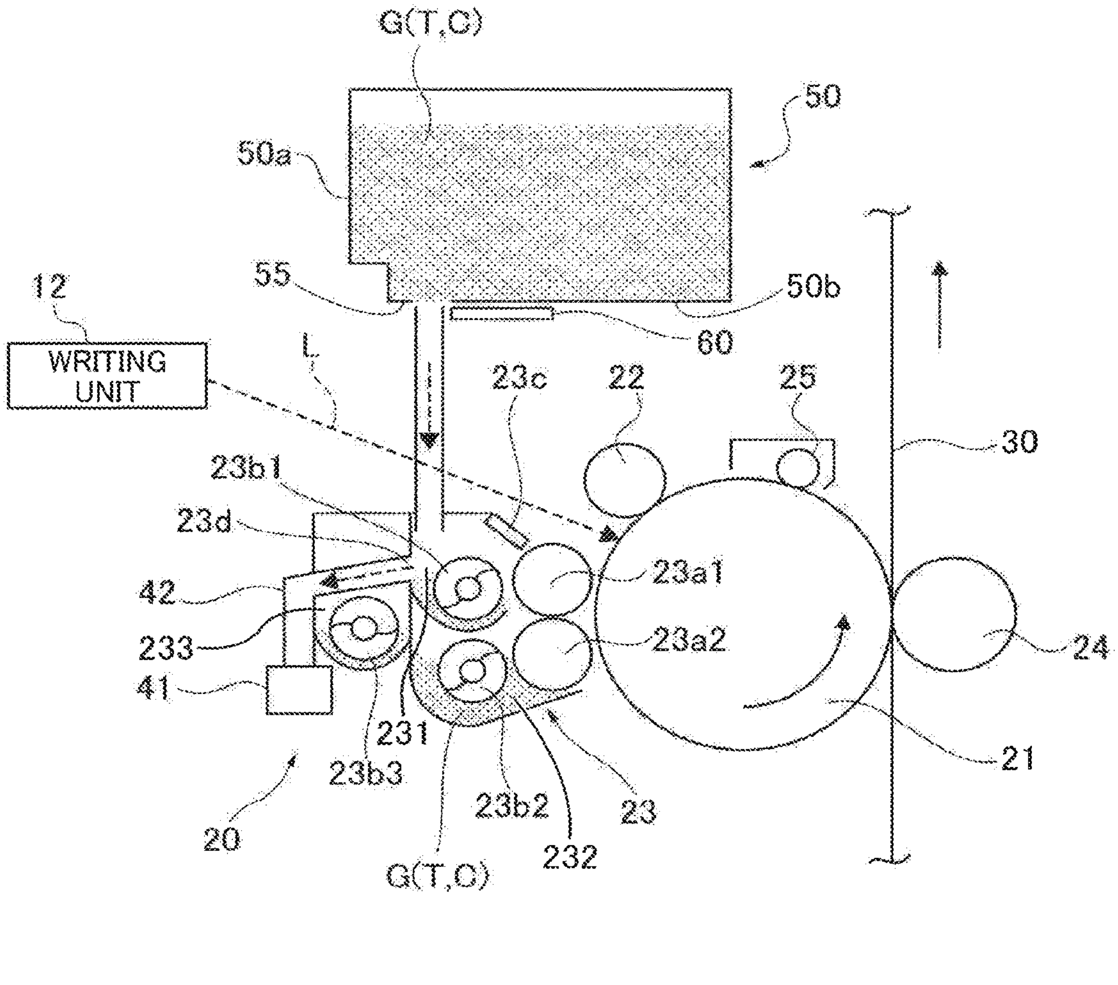
FIG. 2 illustrates a process cartridge and a toner cartridge according to an embodiment.

As shown in FIG. 2, each process cartridge 20 includes the photoreceptor drum 21, the charging unit 25, the development device 23, the cleaning unit 25, and the like. The process cartridges 20 employ a premix development method in which carrier is supplied and discharged as required.

It is to be noted that, n FIG. 2, reference character 50*a* represents a front end face of the toner cartridge 50, 50*b* represents a bottom wall 50*b* of the toner cartridge 50.

In the present embodiment, the photoreceptor drum 21, serving as an image bearer, can be a negatively-charged organic photoreceptor and rotated counterclockwise in FIG. 2 by a driving unit. The charging unit 25 is an elastic charging roller and can be formed by covering a metal core with an elastic layer of moderate resistivity, such as foamed urethane layer, that includes carbon black as electroconductive particles, sulfuretin agent, foaming agent, and the like. The material of the elastic layer of moderate resistivity include, but not limited to, rubber such as urethane, ethylene-propylene-diene (EPDM), acrylonitrile butadiene rubber (NBR), silicone rubber, and isoprene rubber to which electroconductive material such as carbon black or metal oxide is added to adjust the resistivity. Alternatively, foamed rubber including these materials may be used. The cleaning unit 25 includes a cleaning brush or cleaning blade that slidingly contacts the surface of the photoreceptor drum 21 and removes any toner adhering to the photoreceptor drum 21 mechanically.

The development device 23 includes development rollers 23*al* and 23*a*2, serving as developer bearer, disposed adjacent to the photoreceptor drums 21. A development range in which magnetic brushes contact the photoreceptor drum 21 is formed at positions facing the development rollers 23*al* and 23*a*2. The development device 23 contains two-component developer G including toner T and carrier particles C. The development device 23 develops the latent image formed on the photoreceptor drum 21 with the developer G into a toner image. The configuration and operation of the development device 23 are described in further detail later.

The development device 23 in the present embodiment is premix development type, and fresh developer G is supplied from the toner cartridge 50 as required, and degraded developer (i.e., waste developer) is discharged to a developer reservoir 41 outside the development device 23. The toner cartridge 50 contains premixed developer G including toner (toner particles) T and carrier (carrier particles) C to be supplied to the development device 23. The toner cartridge 50 can serve as a supply device to supply toner to the development device 23 as well as a supply device to supply carrier to the development device 23. The ratio of toner to carrier in the developer contained in the toner cartridge 50 is relatively high in the present embodiment.

Next, image formation performed on the photoreceptor drum 21 is described below.

As the photoreceptor drum 21 is rotated counterclockwise in FIG. 2, a charging unit 22 charges the surface of the photoreceptor drum 21 uniformly. Subsequently, the charged portion of the photoreceptor drum 21 reaches the position receiving the exposure light L. Specifically, the surface of the photoreceptor drum 21 is discharged (electrical potentials is changed) with the exposure light L selectively according to image data, thus forming an electrostatic latent image by differences (potential contrast) in electrical potential between the discharged portion and portions that are not discharged. In the exposure process, receiving the light, an electric charge generating substance in a photosensitive layer of the photoreceptor drum 21 generates electrical charges, and holes among them counteract with the charge potential on the photoreceptor drum 21.

Subsequently, the surface of the photoreceptor drum 22 where the electrostatic latent image is formed reaches the position facing the development device 23. The electrostatic latent image formed on the photoreceptor drum 21 sequentially comes into contact with the magnetic brushes formed on the development rollers 23*a*1 and 23*a*2, and the toner particles T, charged negatively, in the magnetic brushes adhere to the electrostatic latent image, developing it into a toner image. Specifically, the amount of developer G attracted by magnetic force of the magnetic pole of the upper development roller 23*a* is adjusted by a doctor blade 23*c*, and the developer is transported to the development range between the photoreceptor drum 21 and the development rollers 23*al* and 23*a*2. In the development range, carrier C standing on end slidingly contacts the surface of the photoreceptor drum 21. At that time, toner T is charged negatively by friction with carrier C. By contrast, carrier C is charged positively. The development rollers 23*al* and 23*a*2 receive a predetermined development bias from a power source. Thus, an electrical field is formed between the photoreceptor drum 21 and the development rollers 23*al* and 23*a*2. The electrical field causes the negatively charged toner T to selectively adhere to an image portion (electrostatic latent image) on the photoreceptor drum 21.

Subsequently, the toner image formed on the photoreceptor drum 22 reaches the position facing the transfer belt 30 and the transfer roller 24. The sheet P is transported to that position timed to coincide with the toner image, and the toner image is transferred to the sheet P. At that time, a predetermined voltage is applied to the transfer roller 24.

Subsequently, the sheet P passes through the fixing device 36 and is discharged by a pair of discharge rollers 39 outside the image forming apparatus. Toner remaining on the photoreceptor drum 21 after image transfer is removed by the cleaning unit 25. Additionally, residual potential is removed from the photoreceptor drum 21 by discharge device, and thus a sequence of image formation.

The configuration and operation of the development device 23 are described. The development device 23 includes the development rollers 23*al* and 23*a*2, conveyance screws 23*bl*, 23*b*2, and 23*b*3 (i.e., auger screws), and the doctor blade 23*c*. Each of the development rollers 23*al* and 23*a*2 include a cylindrical sleeve formed of a nonmagnetic material such as aluminum, brass, stainless steel, or conductive resin and is rotated clockwise in FIG. 2 by a driving unit. Inside the sleeve of the development rollers 23*al* and 23*a*2, magnets are fixed to generate magnetic fields for causing developer G to stand on end on the circumferential surface of the sleeve. Carrier C in developer G stands on end along the magnetic force lines in a normal direction from the magnets, forming chains. Toner T adheres to the carrier C standing on end into chains, thus forming a magnetic brush. As the sleeve rotates, the magnetic brush is transported in the same direction (clockwise in FIG. 2).

The doctor blade 23*c* is disposed upstream from the development range to adjust the amount of developer carried magnetically on the development roller 23*al*. In the present embodiment, the doctor blade 23*c* is a planar member having a thickness of about 2 mm, constructed of nonmagnetic metal such as SUS (Steel Use Stainless) 316 or XM7 according to Japan Industrial Standard (JIS). It is to be noted that a thin plate of about 0.3 mm constructed of SUS430 or the like may be provided to a position facing the doctor blade 23*c*.

Each of the conveyance screws 23*b*1 through 23*b*3 has a spiral blade provided to a shaft and agitates developer G contained in the development device 23 while circulating developer G in the longitudinal direction or the axial direction (hereinafter "developer conveyance direction"), perpendicular to the surface of the paper on which FIG. 2 is drawn. The conveyance screw 23*b*1 facing the development roller 23*al* transports developer G horizontally and supplies developer to the development roller 23*al*.

The conveyance screw 23*b*2 is disposed beneath the conveyance screw 23*b*1 and faces the development roller 23*a*2. The conveyance screw 23*b*2 horizontally transports developer G that has left the development roller 23*a*2 (developer that is forced to leave the development roller 23*a*2 by a developer release pole). The developer release pole is formed where no pole of the magnet inside the development roller 23*a*2 is provided. Alternatively, the developer release pole can be formed using a magnet that generates a repulsive magnetic field with arrangement of magnetic poles. The conveyance screws 23*b*1 and 23*b*2 are disposed so that their axes of rotation are substantially horizontal similarly to the development rollers 23*al* and 23*a*2 and the photoreceptor drum 21.

The conveyance screw 23*b*3 is oblique to a horizontal direction to linearly connect the downstream side of a conveyance channel 232 in which the conveyance screw 23*b*2 is provided and the upstream side of a conveyance channel 231 in which the conveyance screw 23*b*1 is provided in the developer conveyance direction. The conveyance screw 23*b*3 forwards developer G transported from the conveyance screw 23*b*2 to the upstream side of the conveyance screw 23*b*1 and transports developer G circulated from the downstream side of the conveyance screw 23*b*1 via a downward channel to the upstream side of the conveyance screw 23*b*1 in the developer conveyance direction.

Inner walls of the development device 23 separate the conveyance channel 231 in which the conveyance screw 23*b*1 is disposed, the conveyance channel 232 in which the conveyance screw 23*b*2 is disposed, and a conveyance channel 233 in which the conveyance screw 23*b*3 is provided from each other. A downstream end of the conveyance channel 232 communicates with an upstream end of the conveyance channel 233 through a first communication opening. The downstream end of the conveyance channel 233 communicates with the upstream end of the conveyance channel 231 through a second communication opening. The downstream end of the conveyance channel 231 communicates with the upstream end of the conveyance channel 233 through the downward channel. Thus, a circulation channel through which the developer G is circulated in the longitudinal direction is formed by the conveyance screws 23*b*1 through 23*b*3.

Additionally, a discharge opening 23*d* is formed in the wall defining the conveyance channel 231. The discharge opening 23*d* is for discharging excessive developer to the developer reservoir 41 when the level of developer G inside the development device 23 becomes higher than a threshold as developer is supplied from the toner cartridge 50. Specifically, when the level of developer G is higher than a bottom of the discharge opening 23*d*, excessive developer is discharged from the discharge opening 23*d* and drops through a discharge channel 42 to the developer reservoir 41. Since carrier C can be discharged from the development device 23, degradation of image quality over time can be inhibited even if carrier C is degraded or contaminated by motor resin of toner T. It is to be noted that a discharge screw is provided in the discharge channel 42 to transport developer horizontally or substantially horizontally.

Figure 3:
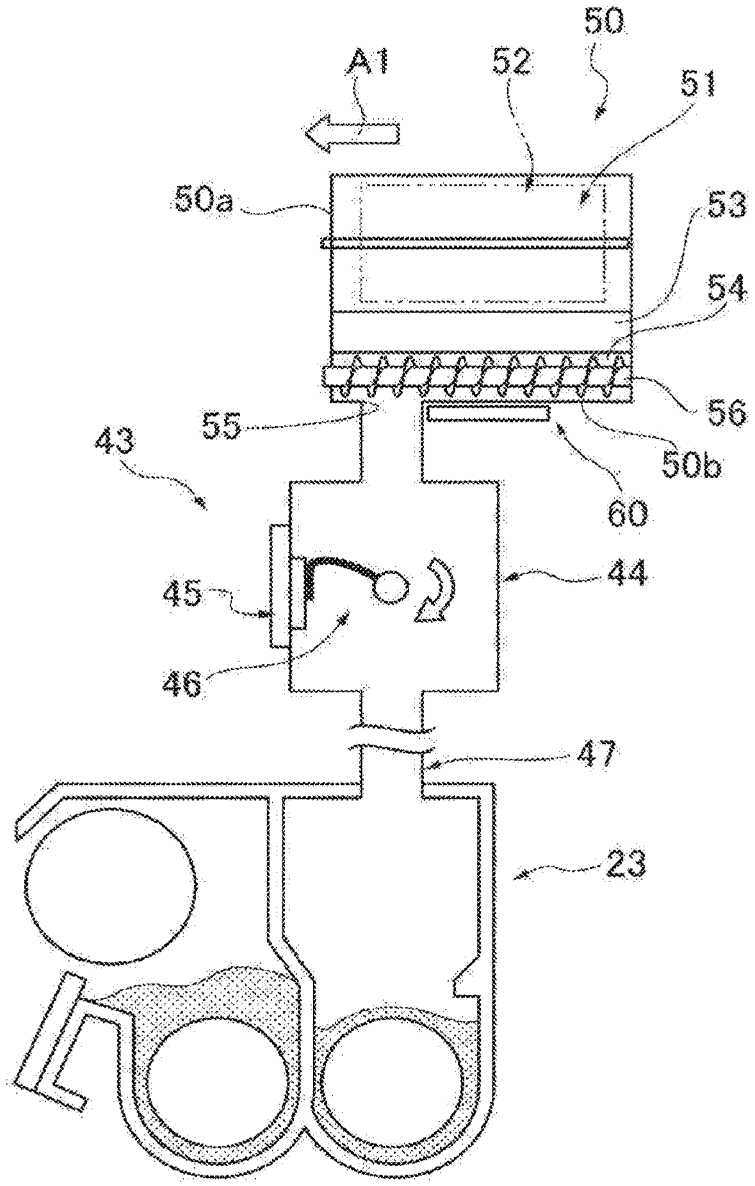
FIG. 3 is a schematic cross-sectional view illustrating the toner cartridge connected to a toner supply device and an adjacent configuration according to an embodiment.

A toner supply device 43 serving as a powder supply device is described below. FIG. 3 is a schematic cross-sectional view illustrating the toner cartridge 50 connected to the toner supply device 43 and adjacent configuration.

As shown in FIG. 3, the toner cartridge 50 includes a developer chamber 51, serving as a powder chamber, for containing developer (toner T, carrier C or both), in which an agitator 52 is provided. The developer chamber 51 includes a tapered portion 53 and a discharge channel 54 in which a conveyance screw 56 is provided. A slidable shutter assembly 60 is provided to an outlet 55 formed in the discharge channel 54. The agitator 52 is rotatable inside the developer chamber 51 and agitates developer G while rotating. The developer G is moved from the developer chamber 51 to the tapered portion 53 under the gravity. The tapered portion 53 is positioned on the bottom side of the developer chamber 51 and shaped such that its size decreases progressively from inside. The discharge channel 54 is continuous with the tapered portion 53 and is provided to a lower end in FIG. 3 of the tapered portion 53. Thus, the bottom of the developer chamber 51 is open. The outlet 55 is provided to an end of the discharge channel 54 and serves as an opening to discharge developer from the developer chamber 51, that is, the toner cartridge 50. The conveyance screw 56 is rotatable inside the discharge channel 54 and transports developer to the outlet 55 while rotating.

Figure 4:
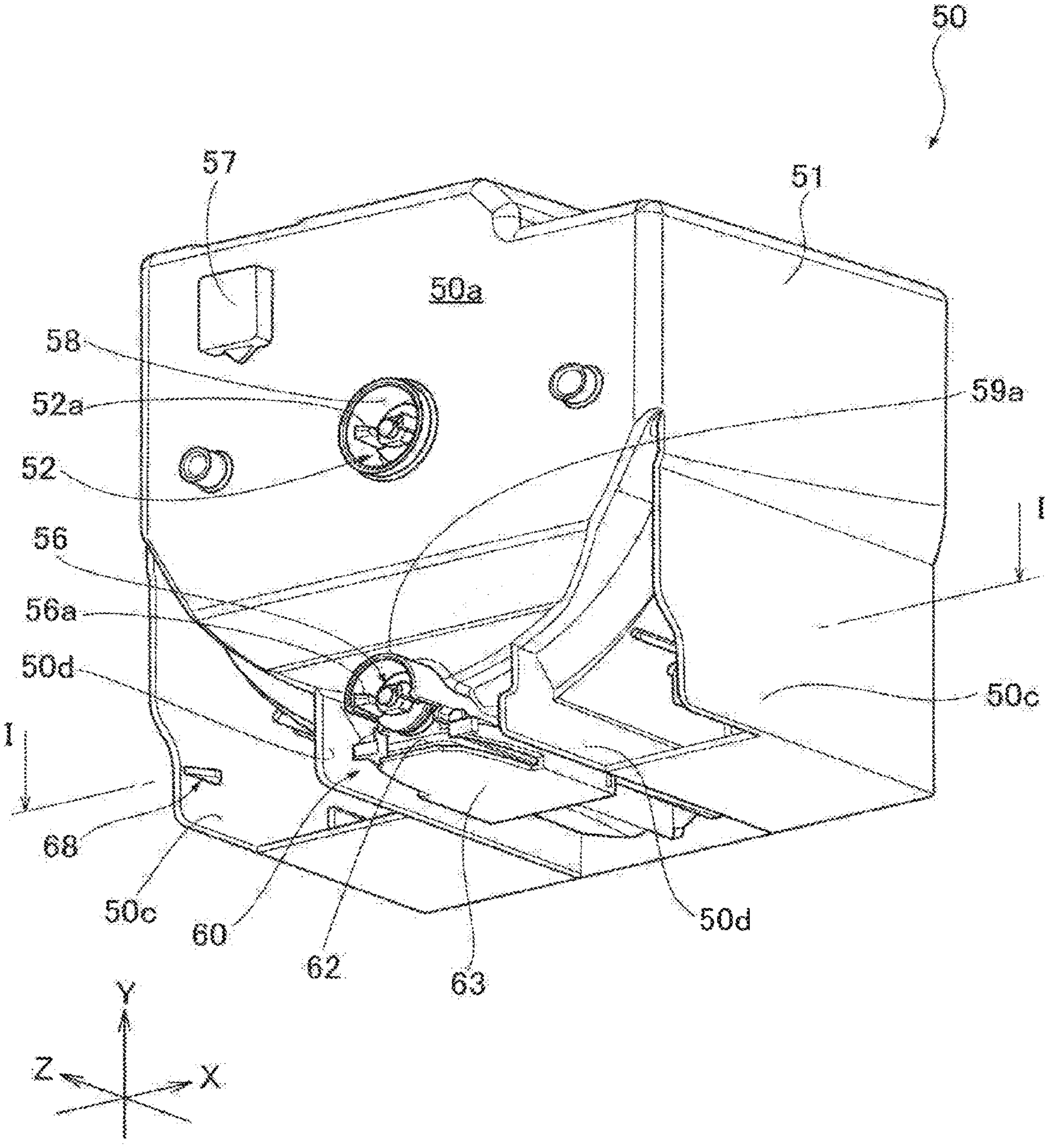
FIG. 4 is a perspective view of the toner cartridge as viewed from a bottom side.

The slidable shutter assembly 60 is provided to an outer wall at the bottom of the developer chamber 51 or the toner cartridge 50. In an initial state, the shutter assembly 60 is positioned facing the outlet 55 to close the outlet 55 as shown in FIG. 4. The outlet 55 can be opened by sliding the shutter assembly 60 on the outer wall at the bottom of the developer chamber 51 (toner cartridge 50) as shown in FIG. 3. As the toner cartridge 50 is mounted to the toner supply device 43, the shutter assembly 60 slides to open the outlet 55.

Users can mount the toner cartridge 50 to the toner supply device 43 by sliding the toner cartridge 50 from a front side to a back side of the image forming apparatus 10 as indicated by arrow A1 in FIG. 3. Then, the shutter assembly 60 slides relative to the developer chamber 51, thereby opening the outlet 55. At that time, the agitator 52 and the conveyance screw 56 are connected to an agitator drive coupling 301 shown in FIGS. 32A to 32D and a screw drive coupling, respectively. Then, being agitated by the agitator 52, developer G inside the developer chamber 51 moves to the tapered portion 53 under the gravity. The developer G moves along the inner wall defining the tapered portion 53 and is collected to the discharge channel 54. As the conveyance screw 56 rotates, the developer G is transported to the outlet 55. The developer G discharged from the outlet 55 reaches to the toner supply device 43.

Developer discharged from the outlet 55 of the toner cartridge 50 falls under the gravity to a temporary reservoir 44 provided in the toner supply device 43. A toner detector 45 and a rotary cleaner 46 are provided to the temporary reservoir 44. The toner detector 45 can be a piezoelectric sensor and is configured to detect the presence of developer inside the temporary reservoir 44. The rotary cleaner 46 includes a rotary shaft and a flexible cleaning member constructed of, for example, polyethylene terephthalate (PET) film, provided to the rotary shaft. The rotary cleaner 46 removes developer G adhering to a detection face of the toner detector 45 as the rotary shaft is driven by a driving source provided to the toner supply device 43.

Developer G moves under the gravity from the temporary reservoir 44 to a conveyance tube 47 connected to a bottom of the temporary reservoir 44. An end of the conveyance tube 47 is connected to the development device 23 of the process cartridge 20 mounted in the apparatus body 11. Developer inside the conveyance tube 47 is transported to the development device 23 as a conveyance member, such as a screw or an auger screw, provided therein rotates.

A controller of the image forming apparatus 10 deems that the developer chamber 51 (toner cartridge 50) is empty or almost empty, which is a state referred to as "toner end" when the toner detector 45 does not transmit a toner detection signal even if the agitator 52 and the conveyance screw 56 are driven. Even when toner end is detected, developer can be supplied for a certain period since developer G remains in the conveyance tube 47. Even if a toner detector is not provided, the controller can detect the time when the developer chamber 51 (toner cartridge 50) becomes empty based on the presence of toner inside the temporary reservoir 44.

Next, specific features of the present embodiment are described below with reference to FIGS. 4 through 11.

In powder containers including a shutter to close a powder outlet and to be retained at the close position by a stopper, it is preferred not to accidentally move the shutter from the position of the powder outlet. In view of the foregoing, an object of the present embodiment is to provide an improved powder container capable of inhibiting unintended opening of the powder outlet.

In the description below, the direction in which the toner cartridge 50 is inserted into a cartridge mount 90 (shown in FIG. 10) of the toner supply device 43 is referred to as "direction Z" or "installation direction Z", and a front side in the insertion direction is referred to as "a positive side in the direction Z". In a state in which the toner cartridge 50 is mounted to the cartridge mount 90, a vertical direction (axis Y in the drawings) perpendicular to the axis Z, is referred to as "the direction Y", which is the direction of height in the present embodiment. The upper side in the direction Y is a positive side. The direction perpendicular to the direction Y as well as the direction Z, is referred to as "direction X" (axis X in the drawings), which is a lateral direction in the present embodiment, with a positive side in the direction X on the right in FIG. 4. Further, the directions of axis X, axis Y, and axis Z are also used when a first shutter 62 and a second shutter 63 are described individually. The direction toward the positive side in axis X, axis Y, or axis Z is also simply referred to as the direction X, Y, or Z.

Figure 5:
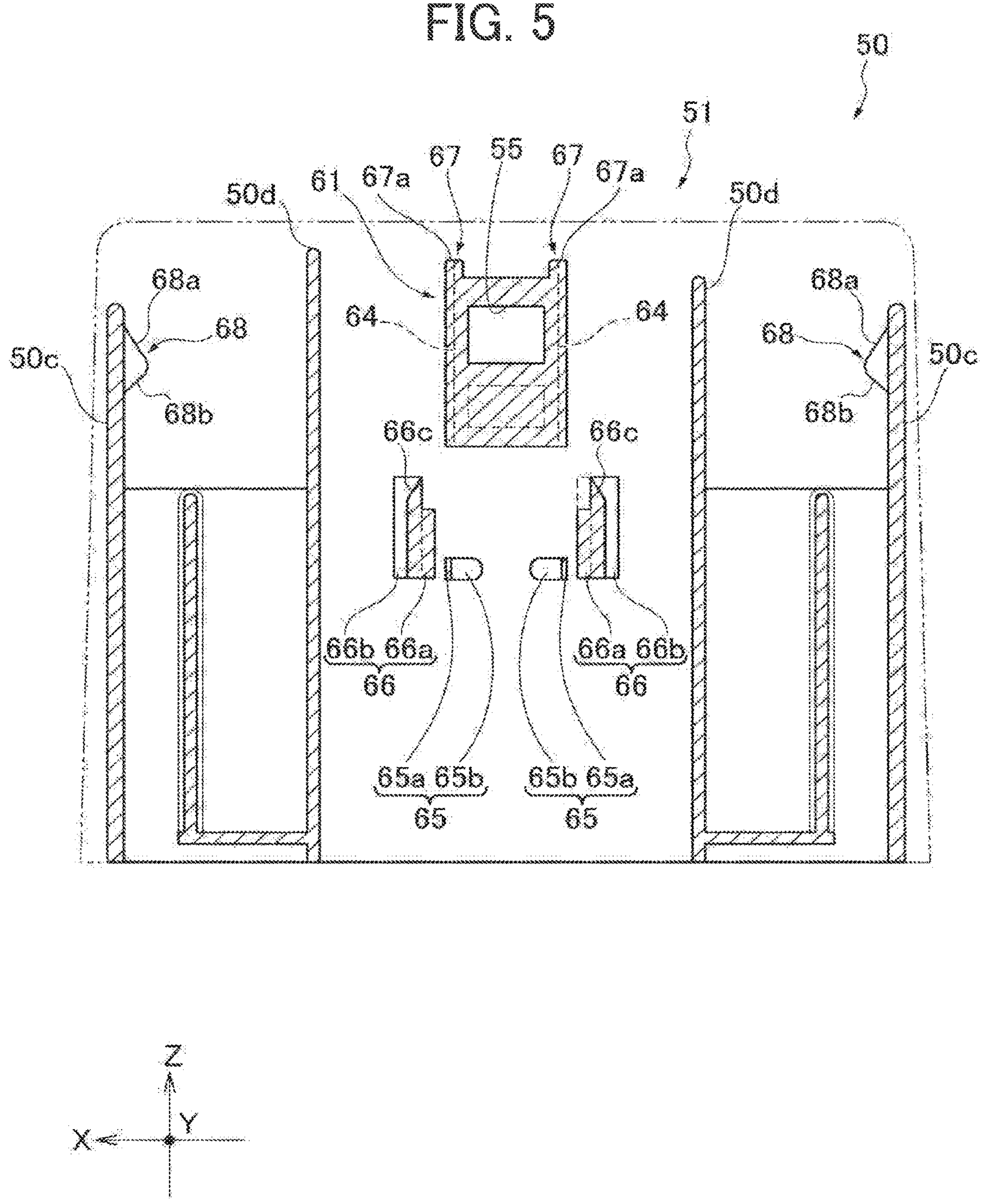
FIG. 5 is a bottom view of a chamber of the toner cartridge on an X-Z cross section along line I-I shown in FIG. 4.
Figure 6B:
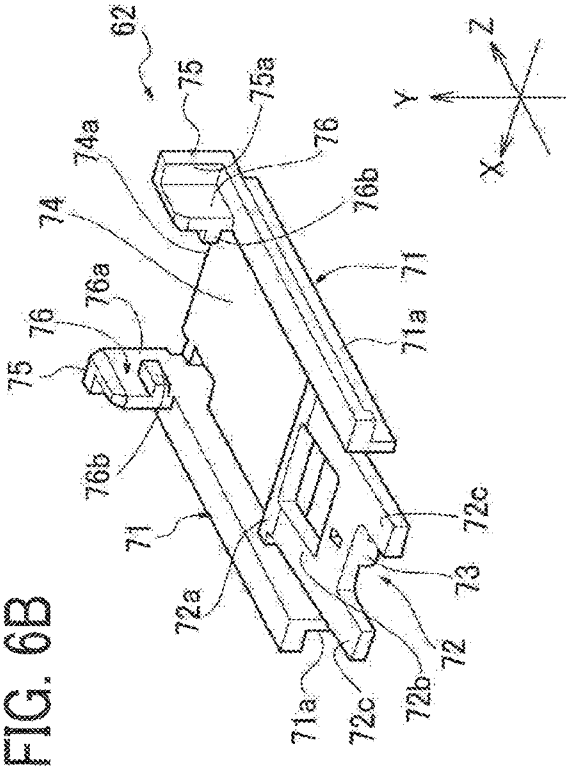
FIG. 6B is a perspective view of the first shutter as viewed from the top side and the trailing side in an insertion direction.
Figure 6C:
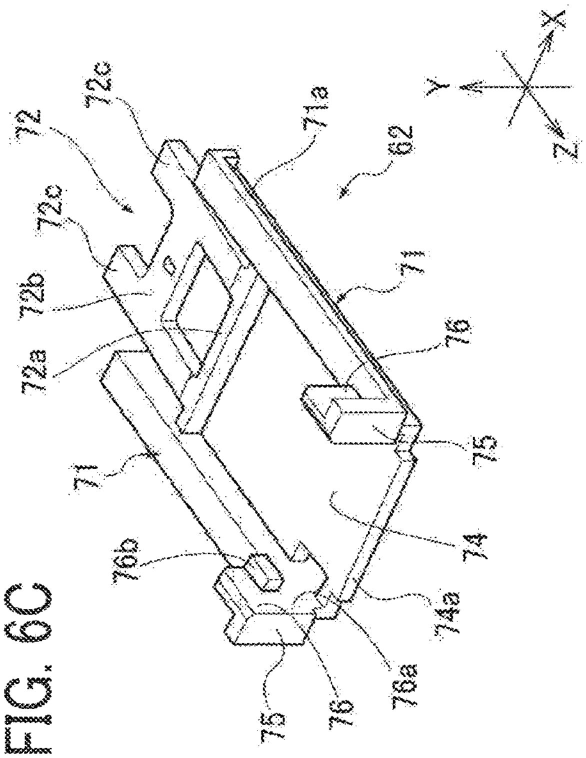
FIG. 6C is a perspective view of the first shutter as viewed from the top side and the leading side in the insertion direction.
Figure 6A:
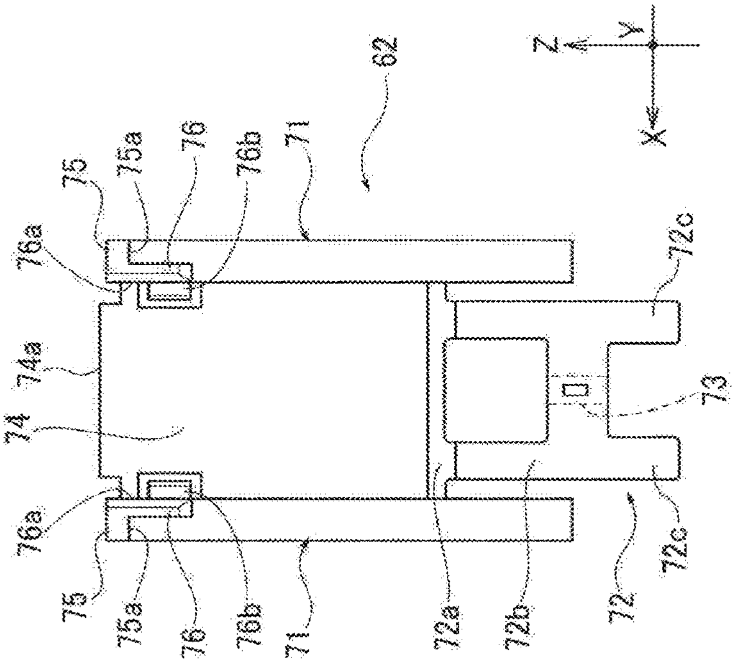
FIG. 6A is a front view of a first shutter as viewed from the top side (positive side in the direction of axis Y)

FIG. 4 is a perspective view of the toner cartridge 50 as viewed from the bottom. FIG. 5 is a bottom view of the developer chamber 51 (toner cartridge 50) on an X-Z cross section along line I-I in FIG. 4. FIG. 6A is a front view of the first shutter 62 as viewed from the top side (positive side in the direction Y), FIG. 6B is a perspective view of the first shutter 62 as viewed from the top side and the trailing side (negative side) in the installation direction Z, and FIG. 6C is a perspective view of the first shutter 62 as viewed from the top side and the leading side in the installation direction Z.

Figures 7A, 7B, 7C:
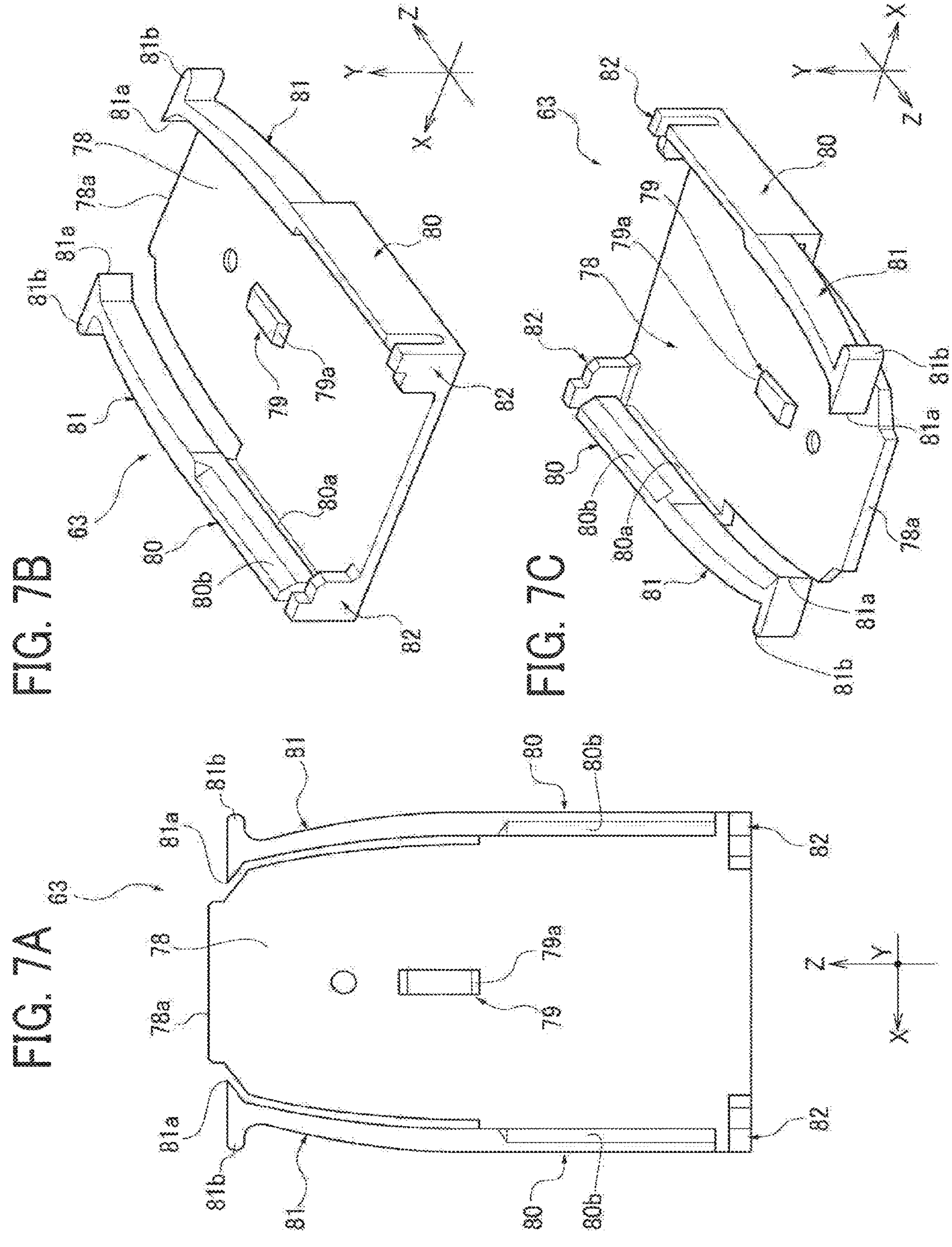
FIG. 7A is a front view of a second shutter as viewed from the top side.
FIG. 7B is a perspective view of the second shutter as viewed from the top side and the trailing side in the insertion direction.
FIG. 7C is a perspective view of the second shutter as viewed from the top side and the leading side in the insertion direction.
Figure 8:
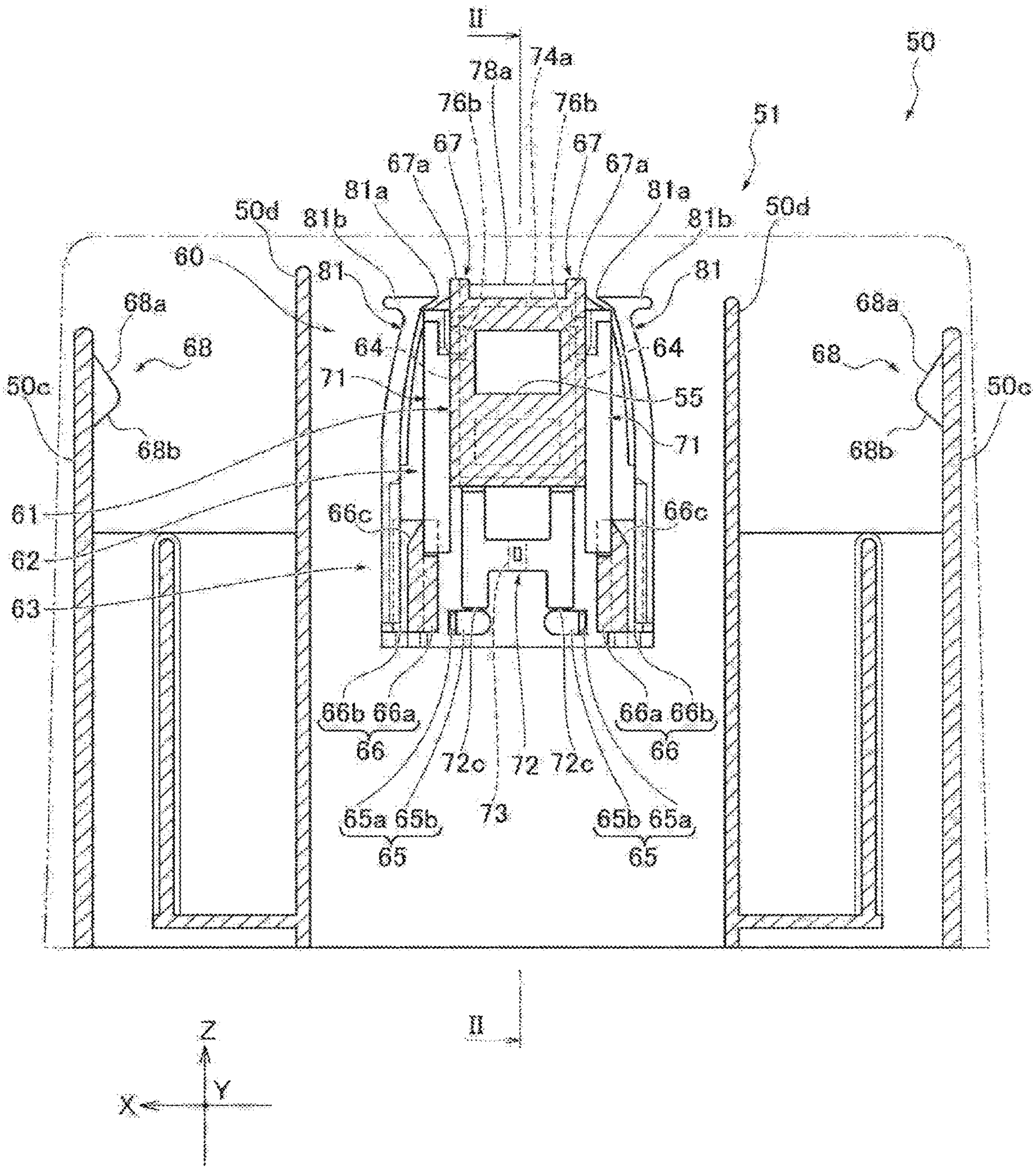
FIG. 8 illustrates the shutter constructed of the first shutter and the second shutter mounted to a bottom face of the chamber of the toner cartridge on a cross section along line I-I shown in FIG. 4.

FIG. 7A is a front view of the second shutter 63 as viewed from the top side, FIG. 7B is a perspective view of the second shutter 63 as viewed from the top side and the trailing side in the installation direction Z, and FIG. 7C is a perspective view of the second shutter 63 as viewed from the top side and the leading side in the installation direction Z. FIG. 8 is a view of the shutter assembly 60 constructed of the first shutter 62 and the second shutter 63 mounted to a bottom face of the developer chamber 51 (toner cartridge 50) on a cross section along line I-I shown in FIG. 4.

Figure 9:
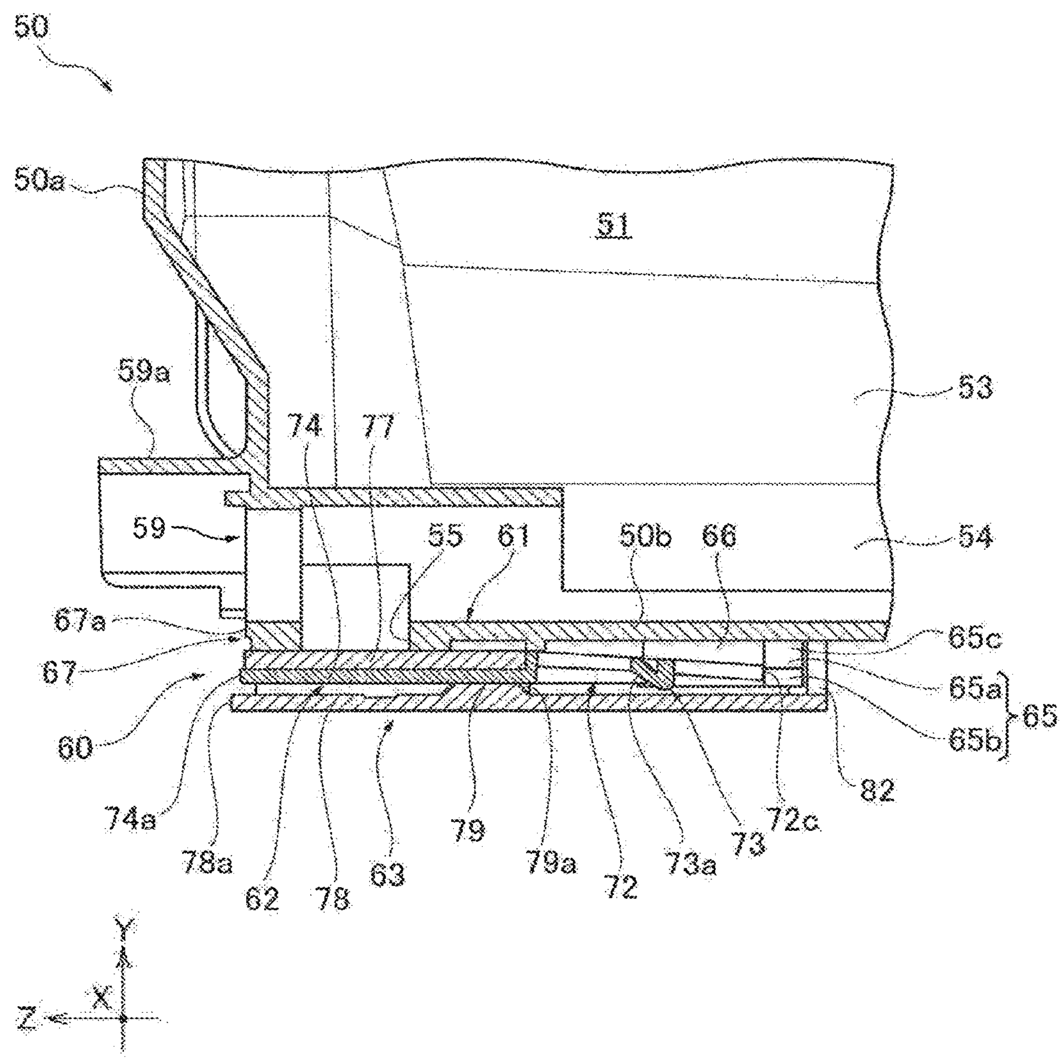
FIG. 9 is a cross-sectional view of the toner cartridge along line II-II shown in FIG. 8.
Figure 10:
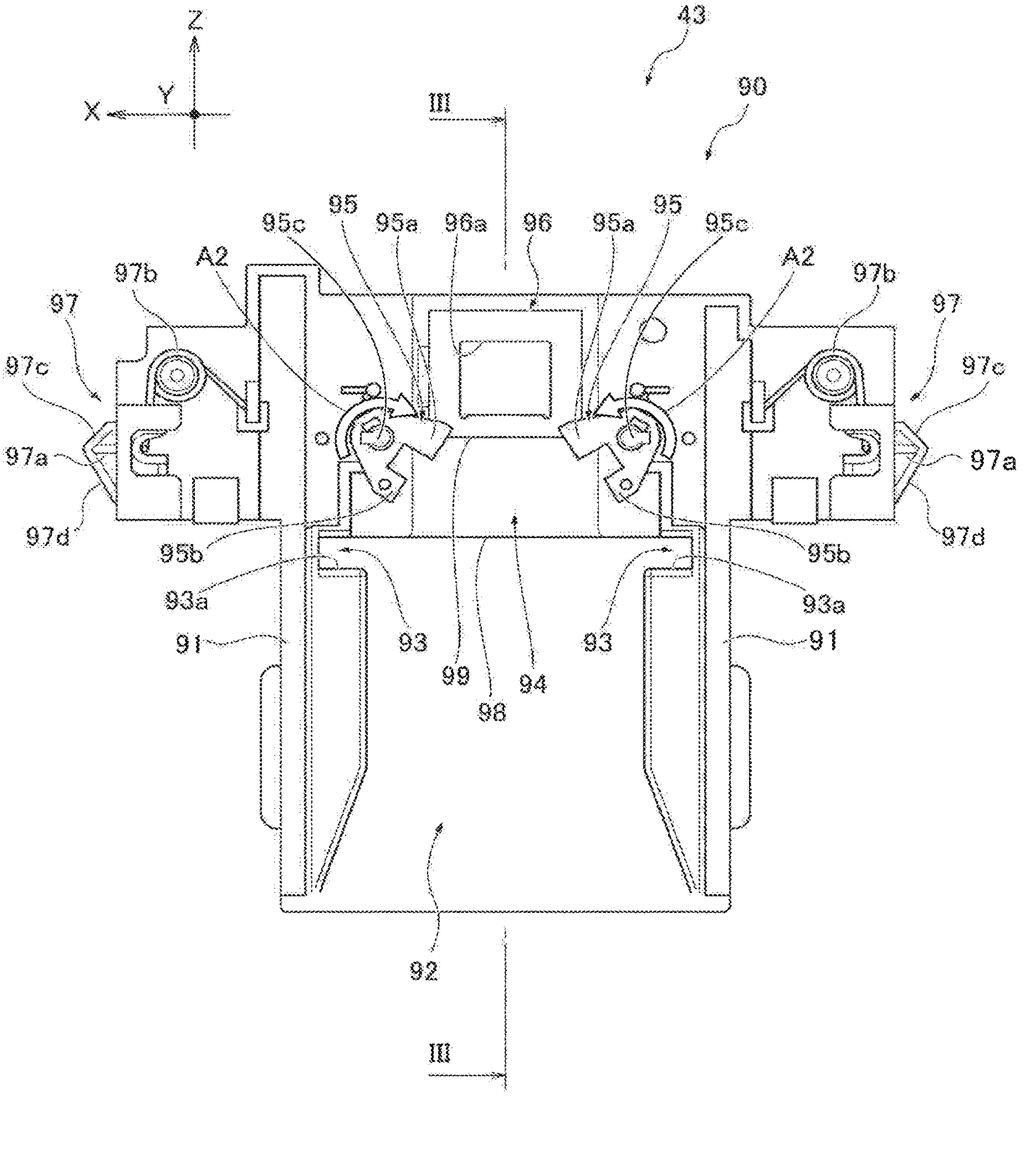
FIG. 10 is a front view of a cartridge mount according to an embodiment, as viewed from the top side.
Figure 11:
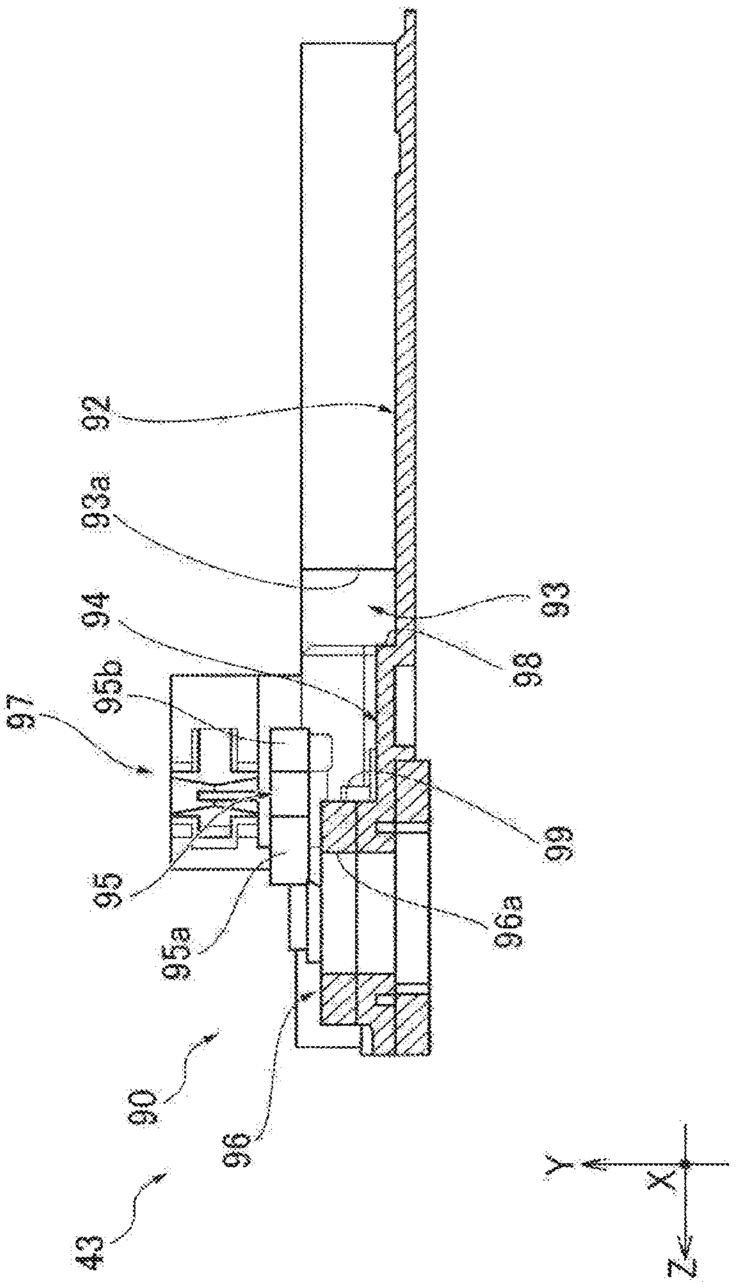
FIG. 11 is a cross-sectional view of the cartridge mount along line III-III shown in FIG. 10.

FIG. 9 is a cross-sectional view of the toner cartridge 50 along line II-II in FIG. 8. FIG. 10 is a front view of the cartridge mount 90 as viewed from the top (positive side in the direction Y). FIG. 11 is a cross-sectional view of the cartridge mount 90 along line III-III in FIG. 10. It is to be noted that, in FIGS. 6A to 6C, the shutter seal 77 is omitted for simplicity. In FIG. 9, the conveyance screw 56 is omitted for simplicity.

As shown in FIG. 4, the toner cartridge 50 has a box-shaped appearance, and the developer chamber 51 for containing developer is provided inside the toner cartridge 50. On a front side of the developer chamber 51, an electronic board 57 and a connection opening 58 are provided. The electronic board 57 includes radio frequency identification (RFID) and exchange data with the controller of the image forming apparatus 10 via an antenna board provided to the toner supply device 43. The data exchanged includes, for example, the production serial number of the toner cartridge 50, the number of times the toner cartridge is reused, the production lot number, the production date, the color of the toner, and usage history of the image forming apparatus 10. Other data may also be included.

Further, data including the amount of toner remaining in the toner cartridge 50 is written with the antenna board in the electronic board 57 as required in accordance with the amount of toner consumed. A receiving face of the electronic board 57 is shaped in conformity to the front face of the developer chamber 51 (toner cartridge 50) to prevent drop of developer on the receiving face. Accordingly, degradation in communication sensitivity caused by interjacent developer can be prevented.

The connection opening 58 is formed to expose a connected portion 52*a* of the agitator 52 from the front side (positive side in the direction Z) of the developer chamber 51. The connected portion 52*a* is connected to the agitator drive coupling 301 shown in FIG. 32A.

The tapered portion 53, the discharge channel 54, and the outlet 55 are provided to the bottom of the developer chamber 51 as shown in FIGS. 3 and 9. The discharge channel 54 is continuous with a screw junction section 59 (shown in FIG. 9) that is open on the front side. That is, an opening is formed in the front end face 50*a* of the developer chamber 51 (of the toner cartridge 50) to be continuous with the discharge channel 54 and the outlet 55. The screw junction section 59 has an inner diameter greater than that of the conveyance screw 56, and a canopy 59*a* extending in the direction Z is provided to an upper side (positive side in the direction Y) of the screw junction section 59. Thus, a connected portion 56*a* of the conveyance screw 56 is exposed on the front side of the developer chamber 51 and shielded by the canopy 59*a* from above. The connected portion 56*a* is connected to the screw drive coupling provided to the toner supply device 43. The conveyance screw 56 transports developer inside the discharge channel 54 to the outlet 55 penetrating, in the direction Y, the bottom wall 50*b* (the shutter mount 61 shown in FIG. 5) of the toner cartridge 50 as shown in FIGS. 2 and 9.

The shutter mount 61, shaped like a rectangular parallelepiped, is provided to a periphery of the outlet 55, projecting from the bottom wall 50*b* in the direction Y. In other words, the outlet 55 penetrates the shutter mount 61 of the bottom wall 50*b* in the direction Y. The bottom wall 50*b* serves as a face of the toner cartridge 50 in which the outlet 55 is formed, and the shutter assembly 60 covers the outlet 55.

The first and second shutters 62 and 63 are slidable in the direction Z and provided to the bottom wall 50*b* (the shutter mount 61 in particular), together forming the shutter assembly 60. The first shutter 62 can be disposed at a sealing position (shown in FIG. 9) facing the outlet 55 in the direction Y and be slid therefrom to the negative side in the direction Z to an open position (shown in FIGS. 20 and 21). The second shutter 63 can be disposed at a shielding position (shown in FIGS. 4 and 8) in line with the first shutter 62 being at the sealing position in the direction Y. The second shutter 63 can be slid therefrom to the negative side in the direction Z to a releasing position (shown in FIGS. 16, 17, and 21) relative to the first shutter 62.

Referring to FIG. 5, a pair of guide grooves 64, a pair of retaining projections 65, a pair of support projections 66, and a pair of releasing projections 67 are provided to the bottom wall 50*b* of the toner cartridge 50 to enable and restrict sliding movement of the first and second shutters 62 and 63 in the direction Z. The guide grooves 64, extending in the direction Z, are recesses formed in side faces of the shutter mount 61 as viewed in the direction X.

The retaining projections 65 are positioned on the negative side of the shutter mount 61 in the direction Z. Each retaining projection 65 includes a base end 65*a*, projecting in the direction Y from the bottom wall 50*b*, and a pressed portion 65*b*, provided to a projecting end of the base end 65*a* and extending toward the other retaining projections 65. Thus, a channel 65*c* (shown in FIG. 9) can be defined between the bottom wall 50*b* and the pressed portion 65*b* in the direction Y.

The support projections 66 are positioned outside the retaining projections 65 in the direction X. Each support projection 66 includes a base end 66*a*, projecting in the direction Y from the bottom wall 50*b*, and a planar portion 66*b*, provided to a projecting end of the base end 65*a* and extending along a plane X-Y in the drawings. The base end 66*a* is tapered at an end on the positive side in the direction Z and has an inclined wall 66*c* inclined outward in the direction X as the position moves to the negative side in the direction Z.

Each releasing projection 67 projects in the direction Z from an end of the shutter mount 61 in the direction Z. End faces 67*a* of the releasing projections 67 are flat and on a plane identical or similar to the plane X-Y. An outer face of each releasing projection 67 in the direction X is on an identical plane with that of the shutter mount 61.

Additionally, as shown in FIGS. 4 and 5, a pair of side walls 50*c* are provided outside the shutter mount 61 in the direction X, and a retention releasing piece 68 is provided on the inner side of each side wall 50*c*. It is to be noted that FIG. 4 illustrates the retention releasing piece 68 on only one side. The retention releasing piece 68 is shaped like a thin plate projecting from the side wall 50*c* inward in the direction X. When viewed in the direction Y, the retention releasing piece 68 is triangular. As shown in FIG. 5, the retention releasing piece 68 includes an inclined front side 68*a* on the positive side in the direction Z and an inclined rear side 68*b* on the negative side in the direction Z.

Additionally, as shown in FIGS. 4 and 5, a pair of guide walls 50*d* is provided inside the pair of side walls 50*c* and outside the shutter assembly 60 (first and second shutters 62 and 63) in the direction X. Each guide wall 50*d* is planar and parallel to a plane Y-Z. In the direction X, the guide walls 50*d* are disposed on both sides of the shutter assembly 60 and parallel to the shutter assembly 60. The first shutter 62 is mounted to the bottom wall 50*b* to which the above-described elements are provided.

Referring to FIGS. 6A to 6C, the first shutter 62 is planar entirely and includes a pair of side walls 71, a retained piece 72, a pressed projection 73 serving as a pressed member pressed to cancel retention, a mount 74, a pair of engaging portions 75, and a pair of guide walls 76. The side walls 71 are shaped like rods extending in the direction Z and positioned at both ends of the first shutter 62 in the direction X. The side wall 71 is L-shaped in cross section parallel to the plane X-Y such that a side on the outer side in the direction X and the negative side in the direction Y is cut away (open), forming a cutout 71*a* shown in FIGS. 6B and 6C. The retained piece 72 is attached to the side walls 71, extending between the side walls 71.

Specifically, the retained piece 72 includes a base end 72*a* attached to the side walls 71 and a body 72*b* extending from the base end 72*a*. The base end 72*a* is disposed at an intermediate position of the side walls 71 in the direction Z and extends in the direction X. The body 72*b* is planar, extending from the base end 72*a* to the negative side in the direction Z, and is inclined from the base end 72*a* to the negative side in the direction Y. That is, the body 72*b* is inclined toward the negative side in the direction Y as the position moves to the negative side in the direction Z (refer to FIG. 9). In the present embodiment, the body 72*b* is shaped like an H-shaped plate as viewed in the direction Y and includes a pair of legs 72*c* symmetrical in the direction X, projecting from an end opposite the base end 72*a*. When the first shutter 62 is at the sealing position, each leg 72*c* contacts the pressed portion 65*b* of the retaining projections 65 provided to the bottom wall 50*b* in the direction Z as shown in FIGS. 8 and 9, which is referred to as a fixed posture of the body 72*b*.

Figure 21:
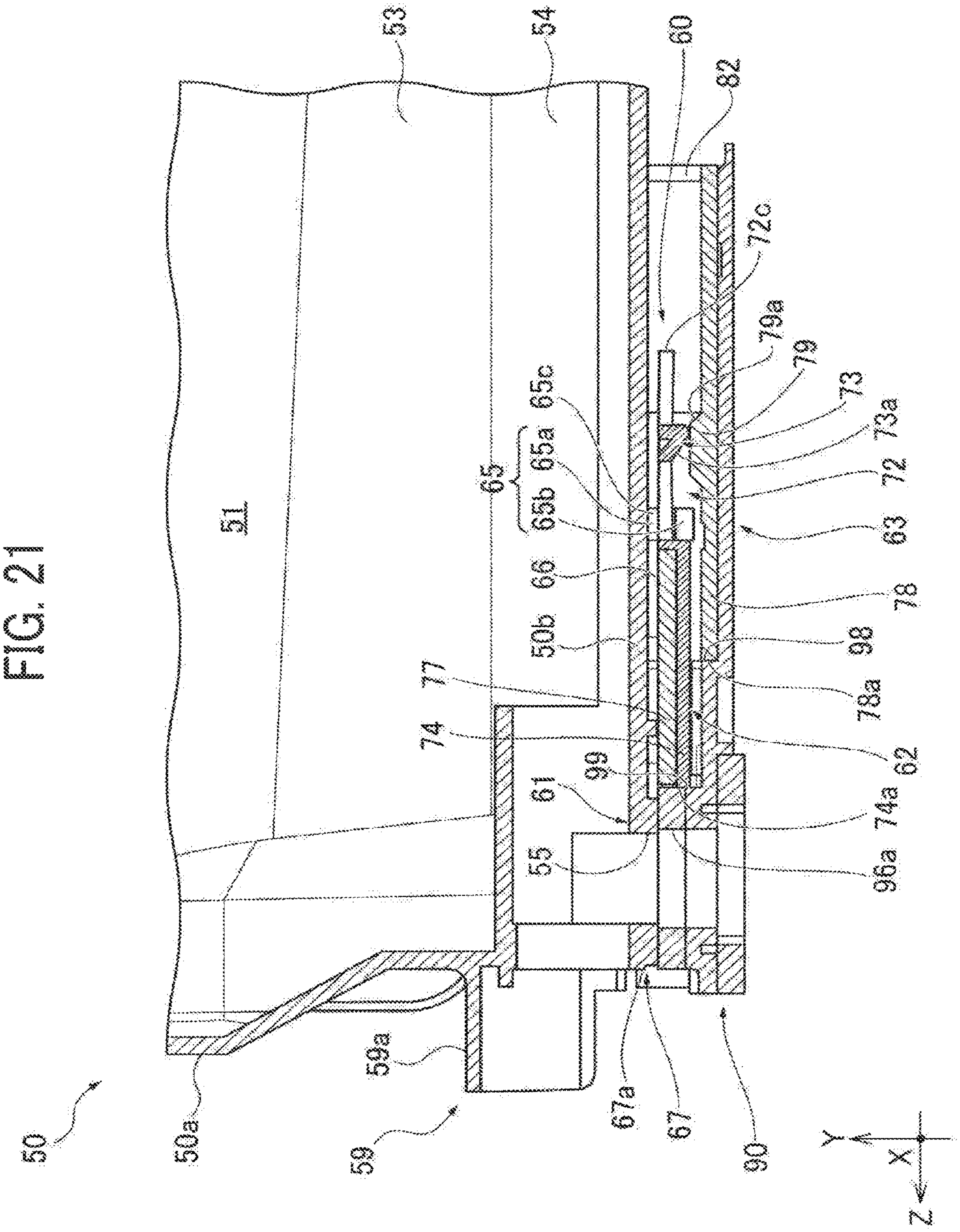
FIG. 21 is a cross-sectional view similar to that shown in FIG. 15 and illustrates the state shown in FIG. 20.

The body 72*b* of the retained piece 72 is elastic and capable of deforming in the direction Y when a force in the direction Y is applied thereto and reverting to the fixed posture when the force is released. In other words, the body 72*b* exerts an elastic force to counter the movement that causes the base end 72*a* (first shutter 62) to move in the direction Y. Additionally, the body 72*b* are designed to pass through the channel 65*c* (shown in FIG. 9) defined between the bottom wall 50*b* and the pressed portion 65*b* as shown in FIG. 21. When the body 72*b* shifts in the direction Y, the legs 72*c* are disengaged from the pressed portions 65*b* of the retaining projections 65. Then, the body 72*b* can pass through the channel 65*c*, which is referred to as a released posture of the body 72*b*.

The pressed projection 73 (shown in FIGS. 6A and 6B) is provided to the body 72*b* of the retained piece 72. The pressed projection 73 projects from a center or substantially center position of the body 72*b* toward the negative side in the direction Y (shown in FIG. 9), assuming that the body 72*b* is parallel to a plane X-Z. In the present embodiment, the H-shaped body 72*b* has a bar extending in the direction X (hereinafter "X-axis bar"), and an intermediate portion of the X-axis bar projects, forming the pressed projection 73 as shown in FIG. 6A. An end on the positive side in the direction Z of the pressed projection 73 is inclined to the negative side in the direction Z as the position in the direction Y moves to the negative side, thus forming an inclined face 73*a* (shown in FIG. 9). Accordingly, when a force in the direction Y is applied to the pressed projection 73, the body 72*b* being at the fixed posture is shifted in the direction Y to the released posture (shown in FIGS. 16, 17, and 21). Thus, the pressed projection 73 can serve as a pressed member to cancel retention of the first shutter 62 at the sealing position when being pressed in the direction Y.

The mount 74 is enclosed by the retained piece 72 (the base end 72*a* in particular) and the pair of side walls 71. The mount 74 is shaped like a thin planar rectangular parallelepiped and rectangular when viewed in the direction Y A shutter seal 77 shown in FIG. 9 is mounted in the mount 74. An end face 74*a* of the mount 74 on the positive side in the direction Z (hereinafter "front end face 74*a*") is flat, parallels the plane X-Y, and extends in the direction X. The shutter seal 77 is fitted in the mount 74 and fixed thereto. Being pressed against the shutter mount 61 around the outlet 55 formed in the bottom wall 50*b*, the shutter seal 77 seals the outlet 55 to prevent developer from moving in and out from the toner cartridge 50 (refer to FIGS. 16 and 17).

The pair of engaging portions 75 projects in the direction Y from a front end (the positive side in the direction Z) of the pair of side walls 71. Each engaging portion 75 is shaped like a planar rectangular parallelepiped and forms a hook face 75*a* on the negative side in the direction Z. The hook face 75*a* parallels the plane X-Y.

Each guide wall 76 is continuous with the engaging portion 75 and projects in the direction Y from an inner side of the side wall 71 in the lateral direction (direction X) in FIG. 6A. Each guide wall 76 is shaped like a planar rectangular parallelepiped and forms a guide face 76*a* (shown in FIG. 6B) parallel to the plane Y-Z. A guide projection 76*b* formed on each guide face 76*a* is designed to movably fit in the guide groove 64 (shown in FIG. 5) formed in the shutter mount 61 of the bottom wall 50*b*.

Referring to FIGS. 8 and 9, when the guide projection 76*b* is in the guide groove 64, a counterpart 64*a* (shown in FIG. 35) of walls defining the guide groove 64 can be sandwiched between the guide projection 76*b* and the shutter seal 77 being fit in the mount 74 as viewed in the direction Y. The second shutter 63 (shown in FIG. 4) is disposed to cover the first shutter 62.

Referring to FIGS. 7A to 7C, the second shutter 63 is planar entirely and includes a planar body 78, a pressing projection 79 for canceling retention of the first shutter, a pair of side walls 80, a pair of arms 81, and a pair of regulating projections 82. The planar body 78 is shaped like a thin plate parallel to the plane X-Z and, in the present embodiment, greater in dimension than the first shutter 62 as viewed in the direction Y (on the plane X-Z) as shown in FIG. 8. An end face 78*a* of the planar body 78 on the positive side in the direction Z (hereinafter "front end face 78*a*") is flat, parallels the plane X-Y, and extends in the direction X.

The pressing projection 79 is provided on the planar body 78. The pressing projection 79 projects in the direction Y from a center position or a position adjacent thereto of the planar body 78. The pressing projection 79 is trapezoidal on cross section parallel to the plane Y-Z with its upper side on the positive side in the direction Y as shown in FIG. 9. Accordingly, a side of the pressing projection 79 on the negative side in the direction Z is inclined (hereinafter "inclined face 79*a*") from the upper side to the negative side in the direction Y as the position moves to the negative side in the direction Z.

Figure 16:
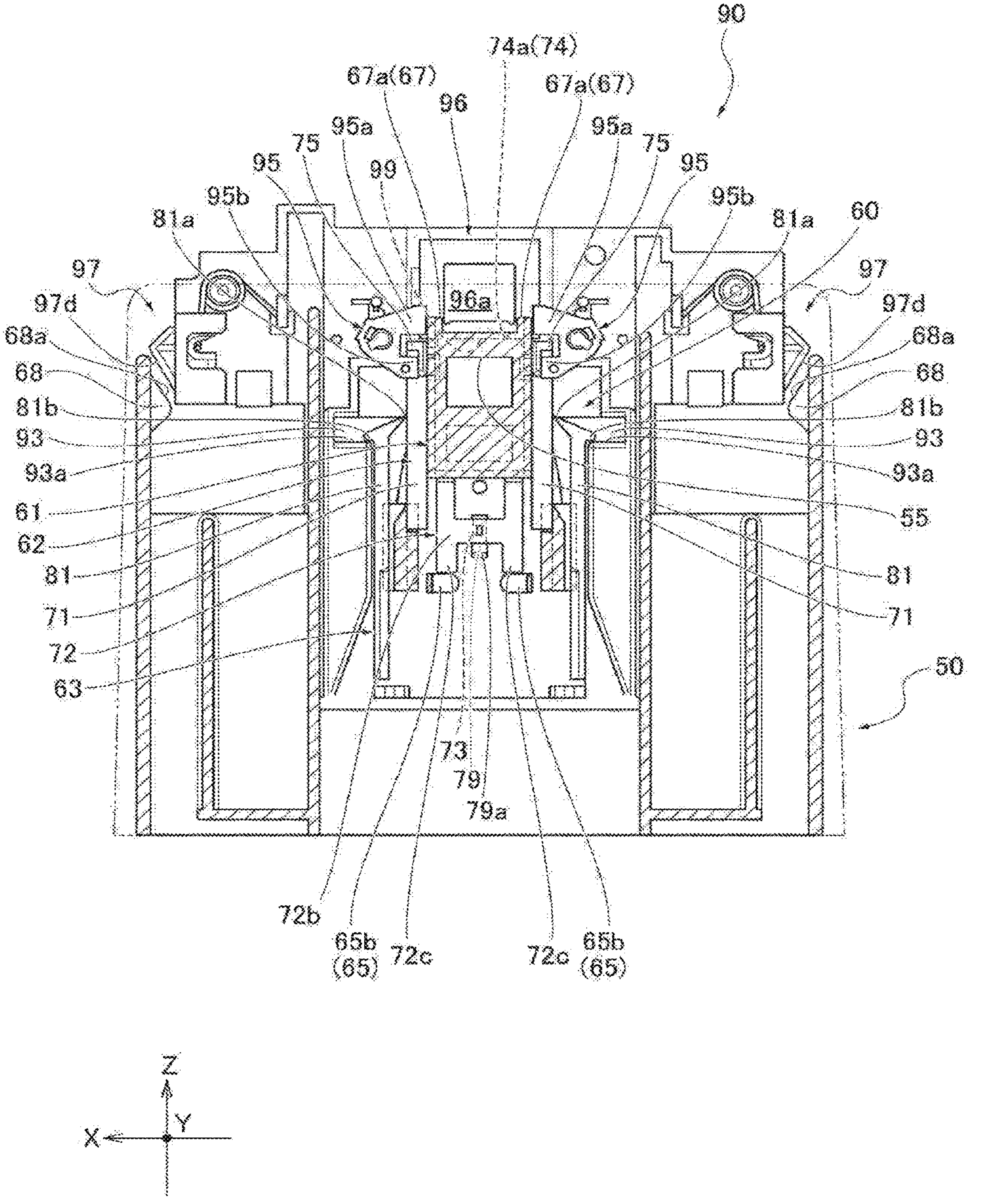
FIG. 16 is a cross-sectional view similar to FIG. 14 and illustrates the first shutter in contact with the first step of the cartridge mount.
Figure 17:
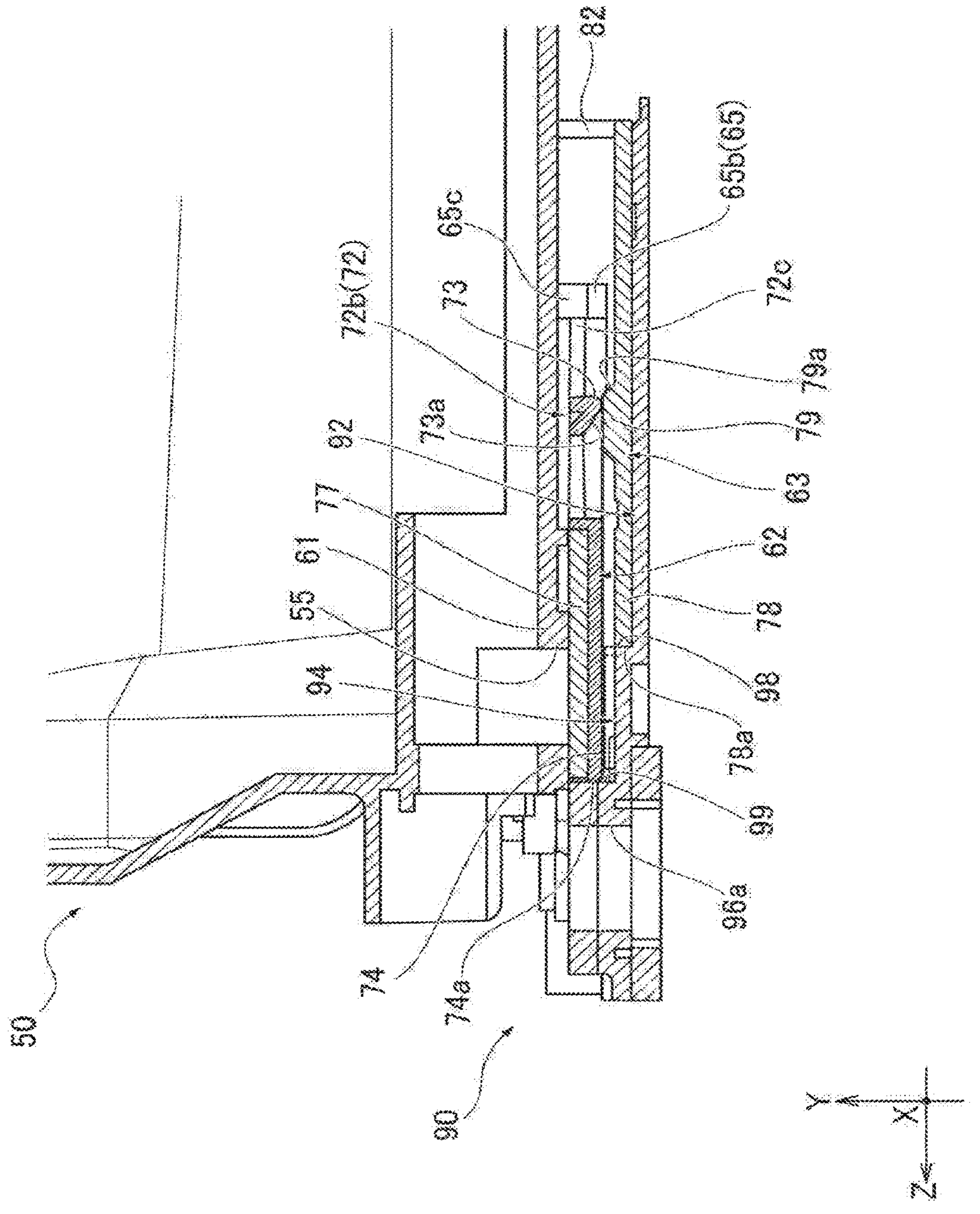
FIG. 17 is a cross-sectional view similar to that shown in FIG. 15 and illustrates the state shown in FIG. 16.

The height (length in the direction Y) of the pressing projection 79 is limited so that, when the second shutter 63 being mounted to the bottom wall 50*b* is moved in the direction Y to the position facing the pressed projection 73 of the retained piece 72 of the first shutter 62 being mounted to the bottom wall 50*b*, the pressing projection 79 can push the pressed projection 73 in the direction Y, thereby moving the body 72*b* of the retained piece 72 to the released posture (shown in FIGS. 16, 17, and 21). In other words, the size of the pressing projection 79 in the direction Y is designed such that the body 72*b* of the retained piece 72 can be moved to the released posture by the cooperation of the releasing projections 73 and 79.

The pair of side walls 80 projects in the direction Y from both ends of the planar body 78 in the direction X. An inner side in the direction X of each side wall 80 includes a receiving recess 80*a* and an inclined face 80*b*. The receiving recess 80*a* is formed by cutting away a projecting base of the side wall 80 from the planar body 78. The receiving recess 80*a* is recessed to the outer side in the lateral direction in FIG. 7B (direction X) and extends in the direction Z. The size (length in the direction Y) of the receiving recess 80*a* is designed to movably receive the planar portion 66*b* (shown in FIG. 5) of the support projections 66 provided to the bottom wall 50*b*. A front end in the direction Y of the side wall 80 is cut away, thereby forming the inclined face 80*b* inclined to the outer side in the lateral direction (direction X) as the position in the direction Y moves to the positive side.

Each arm 81 projects in the direction Z from an end (on the positive side in the direction Z) of the corresponding side wall 80. Each arm 81 is shaped like a rod extending to the positive side in the direction Z, across a clearance from the planar body 78, and curved to reduce the distance between the arms 81 as the position in the direction Z moves to the positive side. The clearance between the arm 81 and the planar body 78 is identical or similar to the height of the receiving recess 80*a* to movably receive the planar portion 66*b* (shown in FIG. 5) of the support projections 66 provided to the bottom wall 50*b*. The planar portion 66*b* of the support projections 66 is received in the clearance between the arm 81 and the planar body 78 and further in the receiving recess 80*a* adjacent to the clearance in the direction Z. With this configuration, the second shutter 63 can be mounted to the bottom wall 50*b* movably in the direction Z.

As the planar body 78 is greater than the first shutter 62 in the direction Y (on the plane X-Z), the first shutter 62 can be present inside the arms 81. In a state in which the first and second shutters 62 and 63 are properly mounted to the bottom wall 50*b* (refer to FIG. 8), the pair of arms 81 in the direction Y is at a position identical or similar to that of the pair of side walls 71 of the first shutter 62. Therefore, in the above described state, when the first shutter 62 moves in the direction Z relative to the second shutter 63, each arm 81 hits or interfaces with the side wall 71 of the first shutter 62 (refer to FIG. 16).

An end portion of each arm 81 on the positive side in the direction Z projects sharply inward in the direction X, forming edges 81*a* that face each other and are sharp as viewed in the direction Y. The distance between the edges 81*a* is shorter than a width (clearance between the side walls 71 in the direction X) of the first shutter 62. A hook piece

81*b* is provided adjacent to the edge 81*a*. The hook piece 81*b* projects outward in the direction X from the arm 81 (adjacent to the edge 81*a*), and a projecting end thereof (outer end in the direction X) is present on an identical plane as the outer face of the side wall 80 (at the position in the direction X identical to that of the projecting end). This state is referred to as an initial curved state of the arms 81.

The pair of arms 81 is elastic and capable of deforming in the direction X when a force in the direction X is applied thereto and reverting to the initial curved state when the force is released. In other words, the pair of arms 81 exerts an elastic force relative to the pair of side walls 80 (the second shutter 63) to counter the movement outward in the direction X. Therefore, in the above described state shown in FIG. 8, when the first shutter 62 moves in the direction Z relative to the second shutter 63, the edge 81*a* hits or interfaces with the side wall 71 of the first shutter 62, and the edge 81*a* deforms outward in the direction X, extending along the direction Z (refer to FIG. 16). Then, the hook piece 81*b* (in particular, its outer end in the direction X) of each arm 81 in shifted to the outer side, beyond the side wall 80 in the direction X.

The regulating projections 82 are positioned at an end of the planar body 78 on the negative side in the direction Z and on outer sides in the direction X. The regulating projections 82 project in the direction Y. Each regulating projection 82 is present on the negative side in the direction Z of the receiving recess 80*a* formed in the side wall 80 and can contact the planar portion 66*b* (shown in FIG. 5) of the support projection 66 received in the receiving recess 80*a*.

The first and second shutters 62 and 63 are mounted to the bottom wall 50*b* of the toner cartridge 50 as follows.

Initially, as shown in FIG. 8, the guide projections 76*b* of the pair of guide walls 76 are inserted into the pair of guide grooves 64 formed in the shutter mount 61 of the bottom wall 50*b*, and the first shutter 62, with the shutter seal 77 shown in FIG. 9 fitted in the mount 74, is mounted to the shutter mount 61. Then, the first shutter 62 is slidable in the direction Z relative to the bottom wall 50*b*, being guided by the pair of guide groove 64 and the guide projections 76*b* inserted therein.

When the first shutter 62 reaches the position where the shutter seal 77 faces the outlet 55 formed in the bottom wall 50*b* in the direction Z, the legs 72*c* of the body 72*b* of the retained piece 72 contact, in the direction Z, the respective pressed portions 65*b* of the retaining projections 65 provided to the bottom wall 50*b* since the body 72*b* of the retained piece 72 is shifted, relative to the base end 72*a*, to the negative side in the direction Y as the position moves to the negative side in the direction Z. Therefore, the first shutter 62 is prevented from moving, relative to the bottom wall 50*b* (the shutter mount 61 in particular), to the negative side in the direction Z from the position where the shutter seal 77 faces the outlet 55. At that time, the shutter seal 77 is pressed against the shutter mount 61 on the periphery of the outlet 55 and covers the outlet 55 to seal it as shown in FIG. 9. Thus, the first shutter 62 is at the sealing position.

Additionally, referring to FIG. 17, the body 72*b* of the retained piece 72 can be moved in the direction Y (closer to the bottom wall 50*b*) by pushing the pressed projection 73 of the retained piece 72 in the direction Y. This movement can release the contact between the legs 72*c* of the body 72*b* and the pressed portions 65*b* of the retaining projections 65 provided to the bottom wall 50*b*. Since the body 72*b* is designed to pass through the channel 65*c* (shown in FIG. 9) defined by the bottom wall 50*b* and the pressed portion 65*b*, the first shutter 62 can move from the sealing position to the negative side in the direction Z (refer to FIG. 21). In this configuration, the first shutter 62 can be released from the sealing position by moving the body 72*b* of the retained piece 72 in the direction Y (closer to the bottom wall 50*b*) until the legs 72*c* are disengaged from the pressed portions 65*b* of the retaining projections 65. Thus, referring to FIG. 21, the outlet 55 can be opened by moving the first shutter 62 to the negative side in the direction Z to the position where the shutter seal 77 is shifted from the outlet 55. Thus, the first shutter 62 is at the open position.

Subsequently, the inclined faces 80*b* (shown in FIG. 7B) of the side walls 80 of the second shutter 63 are disposed to face the planar portions 66*b* of the support projections 66 of the bottom wall 50*b* from the negative side in the direction Y, and the second shutter 63 is pushed in the direction Y closer to the bottom wall 50*b*. Thus, the second shutter 63 is mounted to the bottom wall 50*b* of the toner cartridge 50.

In this state, the planar portions 66*b* of the support projections 66 are received in the receiving recesses 80*a* of the side walls 80. Then, the second shutter 63 is slidable in the direction Z relative to the bottom wall 50*b*, being guided by the receiving recesses 80*a* and the planar portions 66*b* of the support projections 66 inserted therein.

The dimensions of the second shutter 63 (the planar body 78 in particular) are designed such that the first shutter 62 being at the sealing position is received between the side walls 80 and that the planar body 78 covers the first shutter 62 sandwiched between the arms 81 (refer to FIG. 4). Accordingly, the planar body 78 of the second shutter 63 can be present on the negative side in the direction Y of the pressed projection 73 of the retained piece 72 of the first shutter 62, thereby preventing the pressed projection 73 from appearing on the exterior of the toner cartridge 50 (refer to FIGS. 4 and 9). In this state, the second shutter 63 is at the shielding position.

When the second shutter 63 is moved from the shielding position to the negative side in the direction Z, the pressing projection 79 provided to the planar body 78 can face the pressed projection 73 of the first shutter 62 in the direction Y as shown in FIGS. 16 and 17. Relative configurations between the pressing projection 79 and the pressed projection 73 enable the pressing projection 79 to push the pressed projection 73 in the direction Y, moving the body 72*b* of the retained piece 72 to the released posture (refer to FIG. 17).

When the pressing projection 79 faces the pressed projection 73 of the first shutter 62 being at the sealing position, it is assumed that the second shutter 63 is at the releasing position, and this state is referred to as the releasing state of the second shutter 63 relative to the first shutter 62. The second shutter 63 can move, together with the first shutter 62, to the negative side in the direction Z while the releasing state relative to the first shutter 62 maintained. Therefore, the second shutter 63 can be deemed to be at the open position while the second shutter 63 keeps the releasing state to relative to the first shutter 62 being at the open position.

Referring to FIG. 9, the shutter mount 61 and the pair of releasing projections 67 projecting therefrom in the direction Z are present beneath the bottom wall 50*b*, and the first shutter 62 is present beneath them (on the negative side in the direction Y). Further, the second shutter 63 is present beneath the first shutter 62. In a front lower portion of the toner cartridge 50, beneath the screw junction section 59 in which the conveyance screw 56 (shown in FIG. 4) is provided is the end faces 67*a* of the releasing projections 67, beneath which is the front end face 74*a* of the mount 74 of the first shutter 62. Further, the front end face 78*a* of the planar body 78 of the second shutter 63 is present beneath the front end face 74*a*.

The toner cartridge 50 is mounted to the toner supply device 43, to which a cartridge mount 90 (container mount) is provided to fit the configuration of the shutter assembly 60.

Referring to FIGS. 10 and 11, the cartridge mount 90 includes a pair of guide grooves 91, a first recess 94, a second recess 92, a pair of retaining grooves 93, a pair of pivotable pawls 95, an inlet rim 96 enclosing a developer inlet 96*a*, and a pair of releasing members 97. The guide grooves 91 are provided in pair in the direction X, recessed in the direction Y, and extend in the direction Z. The guide grooves 91 are disposed to face and receive the guide walls 50*d* (shown in FIG. 4) of the toner cartridge 50 (refer to FIG. 14). The guide grooves 91 and other guiding configurations together determine the direction in which the toner cartridge 50 is mounted to the cartridge mount 90 (toner supply device 43).

Figure 14:
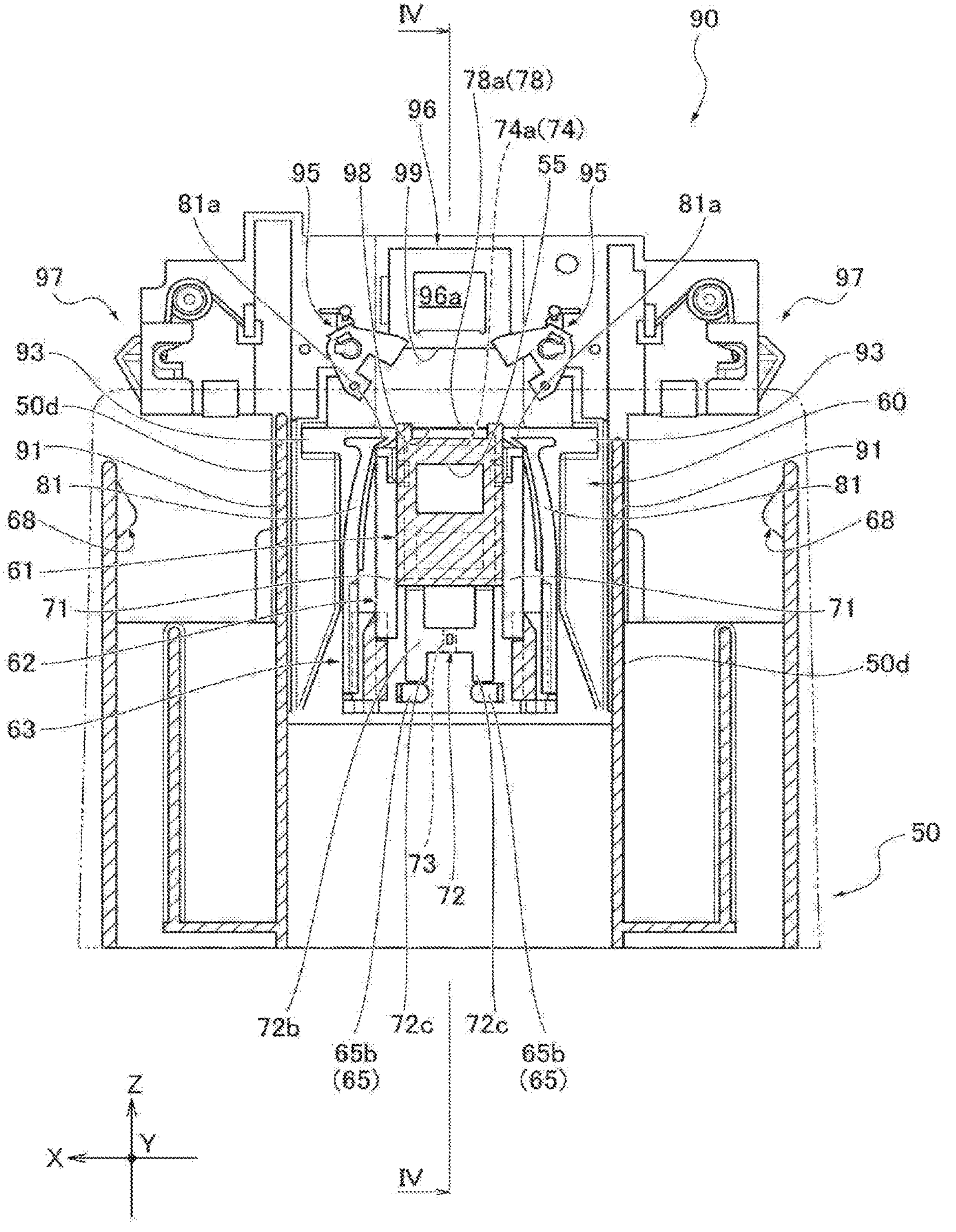
FIG. 14 illustrates the second shutter in contact with the second step, with the toner cartridge as viewed on the same cross section as that shown in FIG. 6 and the cartridge mount as viewed on the same cross section as that shown in FIG. 10.
Figure 15:
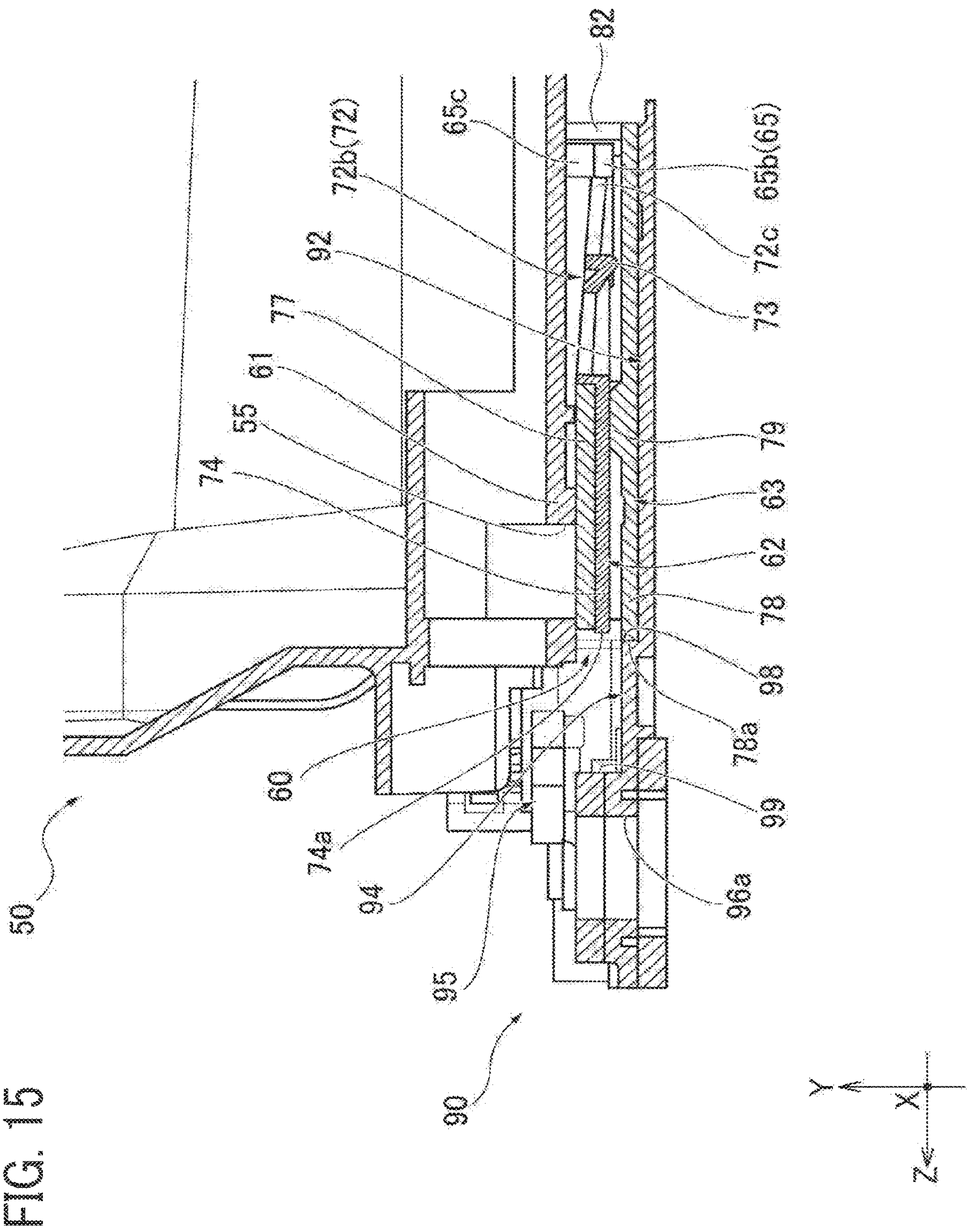
FIG. 15 is a cross-sectional view along line IV-IV shown in FIG. 14 and illustrates the toner cartridge mounted to the cartridge mount.

The second recess 92 is disposed between the guide grooves 91 to receive the second shutter 63 (refer to FIGS. 14 and 15). The second recess 92 can allow the shutter assembly 60 including the second shutter 63 to move in the direction Z together with the toner cartridge 50 when the toner cartridge 50 is moved in the direction Z relative to the cartridge mount 90. The second recess 92 in similar in size in the direction X to the second shutter 63 and receives the second shutter 63 whiling allowing movement in the direction Z.

The retaining grooves 93 are provided in pair in the direction X and positioned at an end of the second recess 92 on the positive side in the direction Z. Each retaining groove 93 is recessed from the second recess 92 outward in the direction X. The negative side of the retaining groove 93 in the direction Z is defined by a wall 93*a* parallel to the plane X-Y. Each retaining groove 93 is designed to accommodate the hook piece 81*b* (shown in FIG. 7A) of the arm 81 of the second shutter 63.

The first recess 94 is adjacent to the second recess 92 in the direction Z, on the positive side of the second recess 92 in the direction Y as shown in FIG. 11, to receive the first shutter 62 (refer to FIGS. 16 and 17). The first recess 94 can allow the first shutter 62 to move in the direction Z together with the toner cartridge 50 moving in the direction Z relative to the cartridge mount 90. The amount by which the first recess 94 is shifted in the direction Y (difference in height) from the second recess 92 is similar to the height of the second shutter 63, forming a second step 98 between the first recess 94 and the second recess 92. When the toner cartridge 50 moves in the direction Z relative to the cartridge mount 90, the second step 98 interferes with the second shutter 63 (in particular, the front end face 78*a*) in the direction Z, thereby inhibiting the second shutter 63 from moving in that direction together with the toner cartridge 50 (refer to FIGS. 16 and 17). This position is hereinafter referred to as “restriction position by the second step 98”. The first recess 94 in similar in size in the direction X to the first shutter 62 and receives the first shutter 62 movably in the direction Z.

The pawls 95 are adjacent to a positive end of the first recess 94 in the direction Z and provided in pair in the direction X, with the first recess 94 interposed therebetween. Each pawl 95 being viewed in the direction Y is U-shaped and has a first projection 95*a* on one end and a second projection 95*b* on the other end.

In each pawl 95, the first and second projections 95*a* and 95*b* extend in an identical direction with their end faces parallel to each other. The first projection 95*a* projects more than the second projection 95*b*. The difference in the projection amount between the first and second projections 95*a* and 95*b* is identical or similar to the displacement between the side face (perpendicular to direction X) of the shutter mount 61 and a back side of the engaging portion 75 (on the negative side in the direction Z of the hook face 75*a*) of the side wall 71 of the first shutter 62 (refer to FIGS. 8 and 16).

Additionally, referring to FIGS. 5, 6B, and 16, with the toner cartridge 50 being mounted to the toner supply device 43, each pawl 95 is disposed such that the end face of the first projection 95*a* can contact the side face of the shutter mount 61, and the second projection 95*b* can be present on the back of the engaging portion 75 (on the negative side in the direction Z of the hook face 75*a*) of the side wall 71 of the first shutter 62 being attached to the toner cartridge 50. Referring to FIG. 10, when each pawl 95 is at an initial pivot position, the first projection 95*a* can contact the end face 67*a* of the releasing projections 67 of the shutter mount 61 in the direction Z as the toner cartridge 50 is mounted to the toner supply device 43.

Each pawl 95 can pivot around a shaft 95*c* in the direction indicated by arrow A2 (hereinafter “direction A2”) shown in FIG. 10 with the range of rotation determined by a restriction element. The pawl 95 is urged in the direction A2 by an elastic member. Accordingly, when no force is applied thereto, the pawl 95 is at the initial pivot position shown in FIG. 10. Being pushed against the force exerted by the elastic member, the pawl 95 can rotate in the direction opposite the direction A2.

The inlet rim 96 enclosing the developer inlet 96*a* is adjacent to the first recess 94 in the direction Z and on the positive side of the first recess 94 in the direction Y as shown in FIG. 11. The developer inlet 96*a* serves as an inlet in the toner supply device 43 for receiving developer from the outlet 55 of the toner cartridge 50. The developer inlet 96*a* communicates with the temporary reservoir 44 shown in FIG. 3. The amount by which the inlet rim 96 is shifted in the direction Y (difference in height) from the first recess 94 is similar to the height of the first shutter 62, forming a first step 99 between the first recess 94 and the inlet rim 96.

When the toner cartridge 50 moves in the direction Z relative to the cartridge mount 90, the first step 99 interferes with the first shutter 62 (in particular, the front end face 74*a* of the mount 74) in the direction Z, thereby inhibiting the first shutter 62 from moving in that direction together with the toner cartridge 50. This position is hereinafter referred to as “restriction position by the first step 99”. In the installation direction Z, the second step 98 is upstream from the first step 99 with an interval provided between them.

Referring to FIG. 21, the upper end face (on the positive side in the direction Y) of the inlet rim 96 can contact the lower end face (on the negative side in the direction Y), in which the outlet 55 is formed, of the shutter mount 61 when the toner cartridge 50 is properly mounted to the toner supply device 43. At that time, the outlet 55 faces the developer inlet 96*a* and is connected thereto in the direction Y.

The releasing members 97 are provided in pair at both ends of the cartridge mount 90 in the direction X. Each releasing member 97 includes a claw 97*a* and an elastic bias portion 97*b*. Each claw 97*a* is movable in the direction X relative to the cartridge mount 90 within a range limited by a restriction configuration. The claw 97*a* can project outward in the direction X to the position shown in FIG. 10 (hereinafter “initial projected position”). The elastic bias portion 97*b* applies a force outward in the direction X to the corresponding claw 97*a*. When no force is applied thereto, the claw 97*a* is at the initial projected position shown in FIG. 10, with its end projecting beyond the cartridge mount 90. When the claw 97*a* is pushed inward in the direction X against the elastic bias force, the end of the claw 97*a* can be positioned inside the cartridge mount 90.

Referring to FIG. 10, when viewed in the direction Y, the claw 97*a* has a triangular edge formed by an inclined front side 97*c* on the positive side and an inclined rear side 97*d* on the negative side in the direction Z. As the toner cartridge 50 is moved in the direction Z relative to the cartridge mount 90, the edge of the claw 97*a* formed by the inclined front side 97*c* and the inclined rear side 97*d* can interfere in the direction Z with the retention releasing piece 68 shown in FIG. 5 (in particular, the inclined front side 68*a* and the inclined rear side 68*b*) provided to the side wall 50*c* (refer to FIGS. 19 and 20).

Descriptions are given below of operations of the shutter assembly 60 and the cartridge mount 90 when the toner cartridge 50 is mounted to the toner supply device 43 with reference to FIGS. 12A to 22.

Figure 12A:
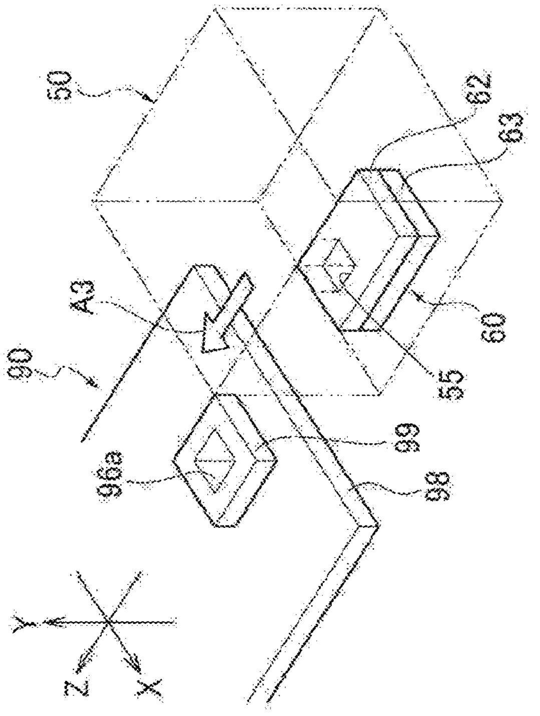
FIGS. 12A through 12D are schematic perspective views that illustrate relative movements of the shutter assembly and the cartridge mount as the toner cartridge moves.
Figure 12B:
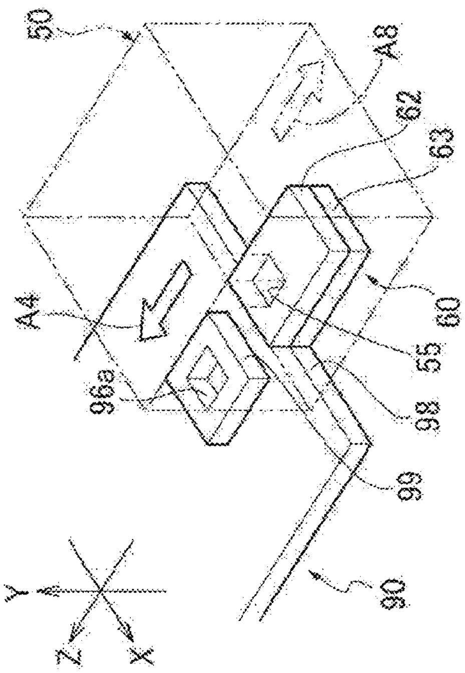
Figure 12C:
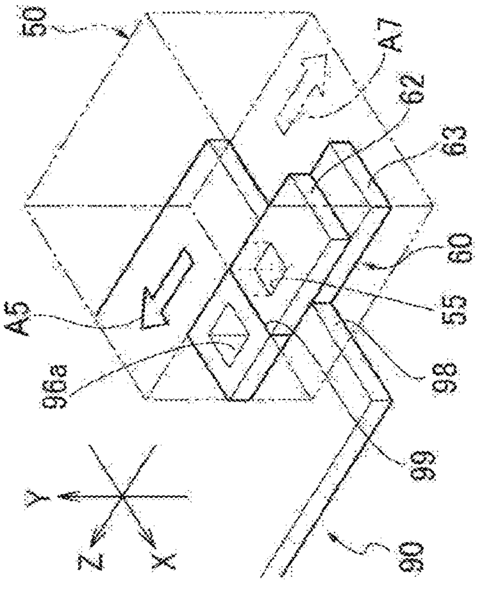

FIGS. 12A through 12D are schematic perspective views that illustrate relative movements of the shutter assembly 60 and the cartridge mount 90 as the toner cartridge 50 moves. Specifically, the toner cartridge 50 faces the cartridge mount 90 in the installation direction Z in FIG. 12A, and the second shutter 63 contacts the second step 98 in FIG. 12B. In FIG. 12C, the first shutter 62 contacts the first step 99, and, in FIG. 12D, the outlet 55 is connected to the developer inlet 96*a*.

Figure 13A:
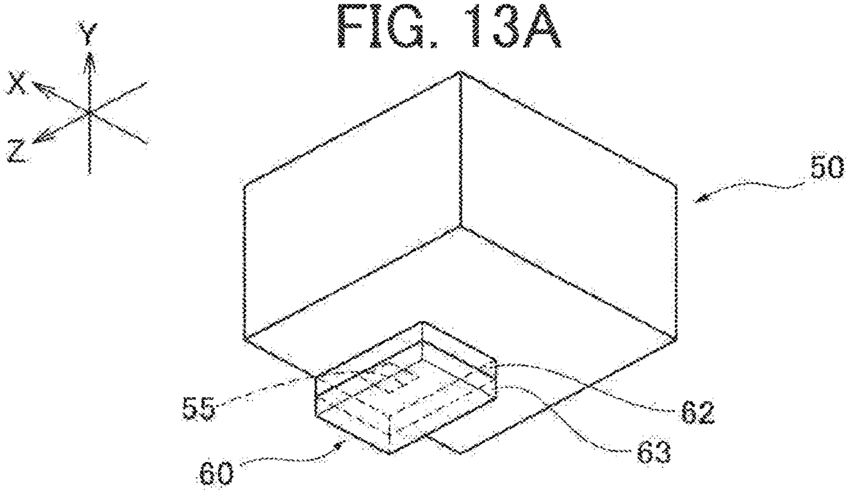
FIGS. 13A through 13C are perspective views illustrating how the shutter assembly operates as the toner cartridge moves.
Figure 13B:
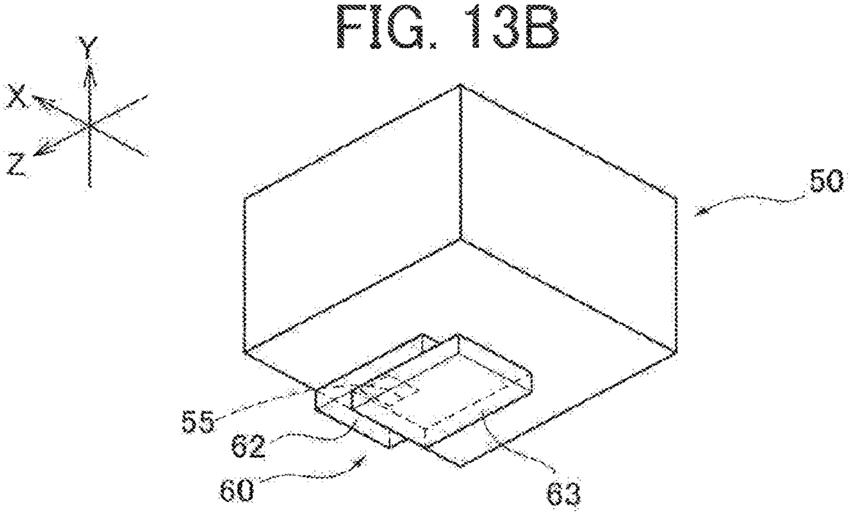
Figure 13C:
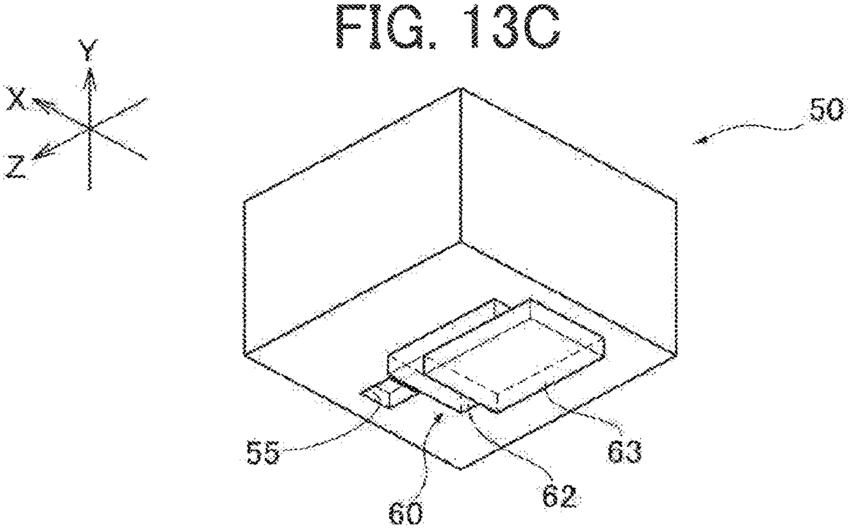

FIGS. 13A through 13C are perspective views illustrating how the shutter assembly 60 operates as the toner cartridge 50 moves. Specifically, FIG. 13A illustrates the first shutter 62 being at the sealing position and the second shutter 63 being at the shielding position. FIG. 13B illustrates the first shutter 62 being at the sealing position and the second shutter 63 being in the releasing state. In FIG. 13C, both of the first shutter 62 and the second shutter 63 are at the open positions.

FIG. 14 illustrates installation of the toner cartridge 50 to the cartridge mount 90. The toner cartridge 50 shown in FIG. 14 is on the same cross section as that shown in FIG. 6, and the cartridge mount 90 shown in FIG. 14 is on the same cross section as that shown in FIG. 10. In FIG. 14, the second shutter 63 of the toner cartridge 50 is being in contact with the second step 98 of the cartridge mount 90.

Figure 18:
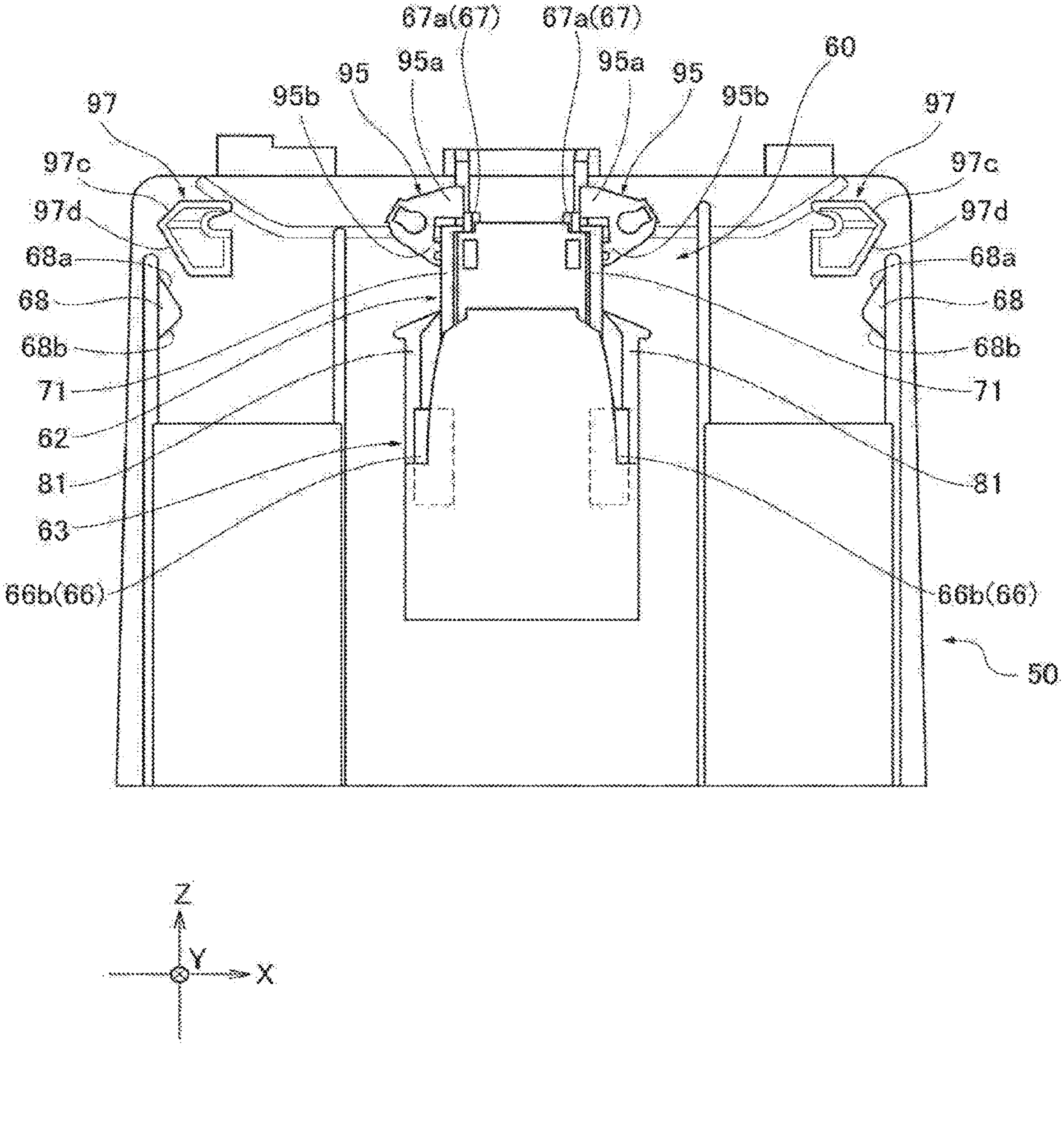
FIG. 18 illustrates the toner cartridge together with pawls and releasing members of the shutter assembly, as viewed from the negative side in the direction Y.

FIG. 15 is a cross-sectional view along line IV-IV shown in FIG. 14 and illustrates the toner cartridge 50 mounted to the cartridge mount 90. FIG. 16 is a cross-sectional view similar to FIG. 14 and illustrates the first shutter 62 being in contact with the first step 99 of the cartridge mount 90. FIG. 17 is a cross-sectional view similar to FIG. 15 and illustrates a state similar to that shown in FIG. 16. FIG. 18 illustrates a state similar to that shown in FIGS. 16 and 17, and illustrates the toner cartridge 50, together with the pawls 95 and the releasing members 97 of the shutter assembly 60, as viewed from the negative side in the direction Y.

Figure 19:
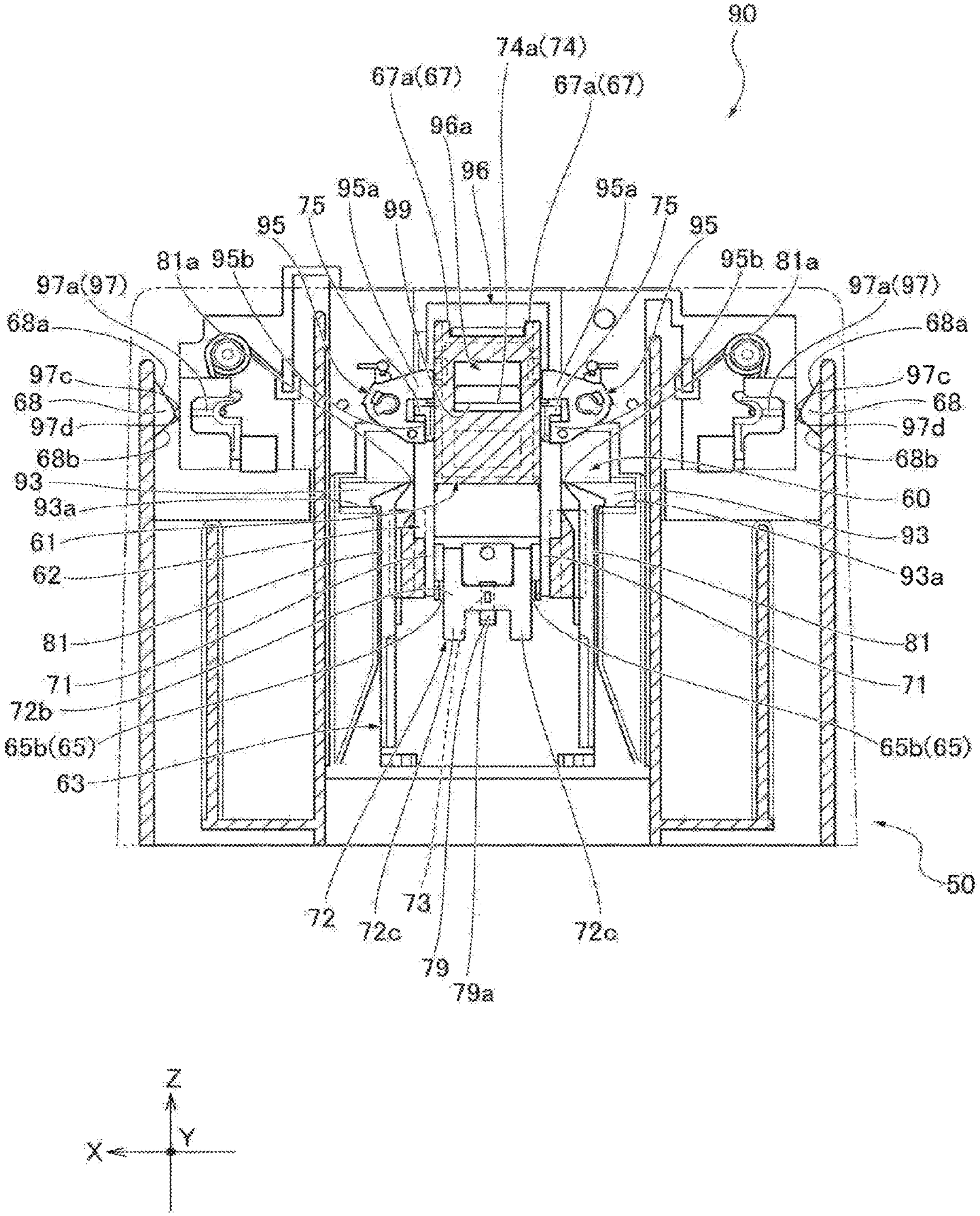
FIG. 19 illustrates the release pieces of the toner cartridge pushing the releasing members of the cartridge mount inside the cartridge mount on a cross section similar to that shown in FIG. 14.
Figure 20:
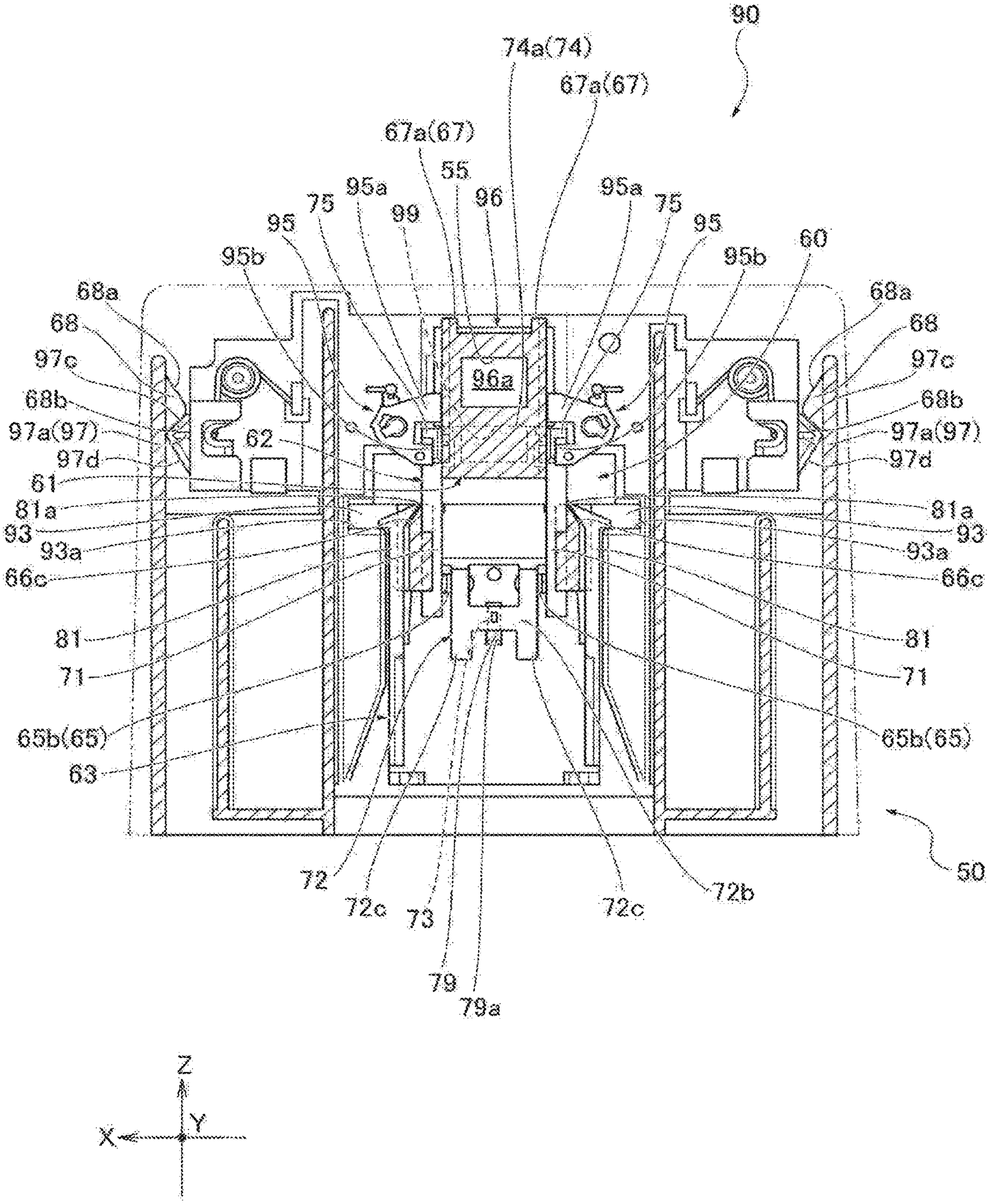
FIG. 20 illustrates an outlet of the toner cartridge connected to a supply opening of the toner supply device on a cross section similar to that shown in FIG. 14.
Figure 22:
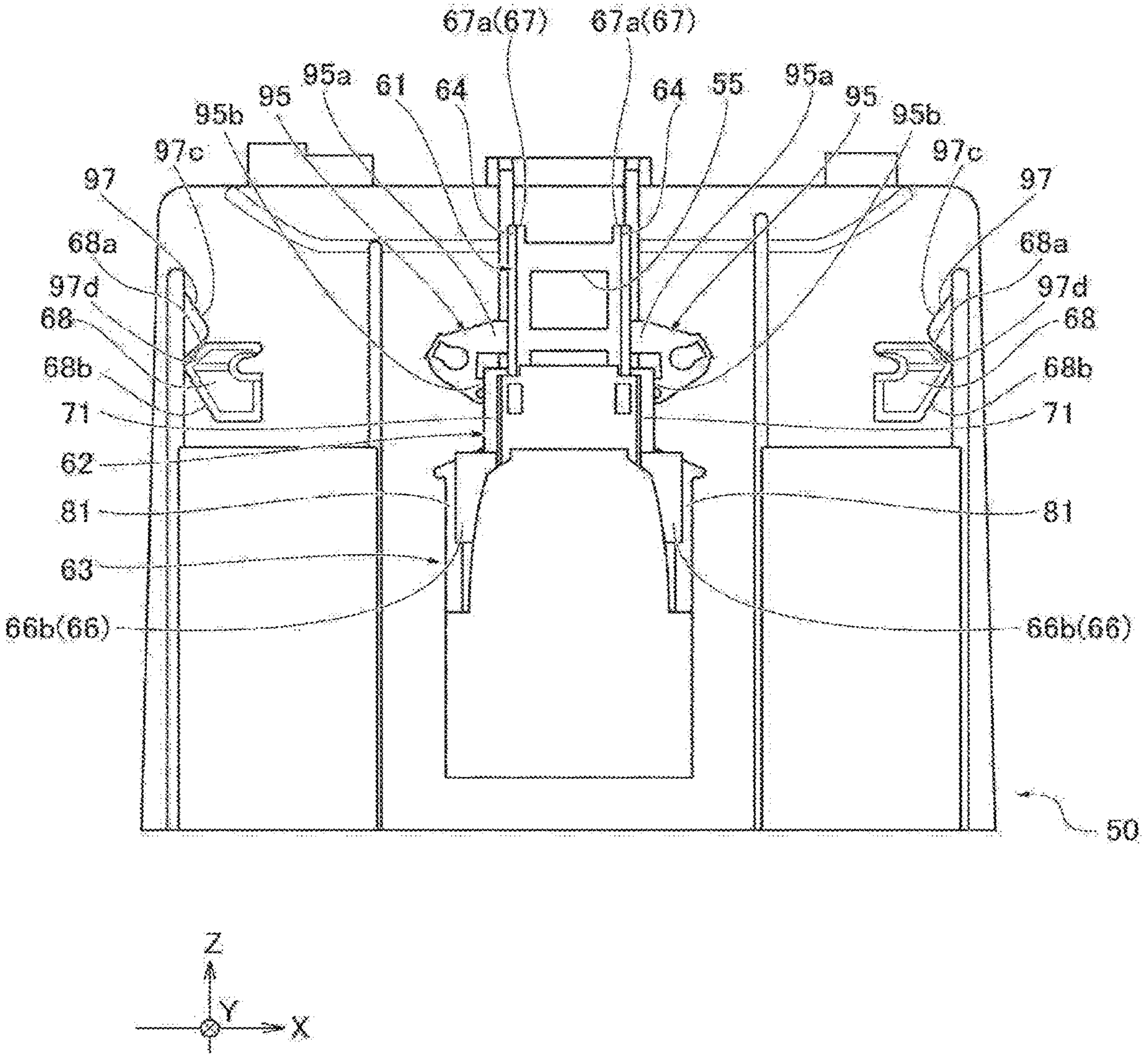
FIG. 22 is a cross-sectional view similar to that shown in FIG. 18 and illustrates the state shown in FIGS. 20 and 21.

FIG. 19 illustrates the retention releasing piece 68 of the toner cartridge 50 pushing the releasing member 97 (the claw 97*a*) of the cartridge mount 90 inside the cartridge mount 90 on a cross section similar to that shown in FIG. 14. FIG. 20 illustrates the outlet 55 of the toner cartridge 50 connected to the developer inlet 96*a* of the toner supply device 43 on a cross section similar to that shown in FIG. 14. FIG. 21 is a cross-sectional view similar to that shown in FIG. 15 and illustrates the state shown in FIG. 20. FIG. 22 is a cross-sectional view similar to that shown in FIG. 18 and illustrates the state shown in FIGS. 20 and 21.

It is to be noted that, in FIGS. 12A through 12D, the shutter assembly 60 is represented by the first and second shutters 62 and 63 and the outlet 55, and the cartridge mount 90 is represented by the first and second steps 98 and 99 and the developer inlet 96*a* for simplicity. Similarly, in FIGS. 13A through 13C, the shutter assembly 60 is represented by the first and second shutters 62 and 63 and the outlet 55 for simplicity.

Initially, the toner cartridge 50 is moved in the installation direction Z to the cartridge mount 90 as indicated by arrow A3 shown in FIG. 12A. At that time, the pair of guide walls 50*d* (shown in FIG. 5) of the toner cartridge 50 is inserted into the pair of guide grooves 91 of the cartridge mount 90, with other guide configurations fit with the counterparts, thereby restricting the movement of the toner cartridge 50 relative to the cartridge mount 90 in the installation direction Z (refer to FIG. 14). The first shutter 62 is at the sealing position in this state. Accordingly, referring to FIGS. 12A, 13A, 14, and 15, the shutter seal 77 is pressed against the shutter mount 61 on the periphery of the outlet 55, sealing the outlet 55.

Additionally, the second shutter 63 is at the shielding position, covering the first shutter 62 including the pressed projection 73 (refer to FIGS. 4, 14, and 15). Since the legs 72*c* of the body 72*b* of the retained piece 72 of the first shutter 62 contact, in the direction Z, the respective pressed portions 65*b* of the retaining projections 65 provided to the bottom wall 50*b* (refer to FIGS. 8, 9, and 14), the first shutter 62 is prevented from moving relative to the shutter mount 61 (the toner cartridge 50) in the direction opposite the installation direction Z. Subsequently, in the second shutter 63, the arms 81 (the edges 81*a* in particular) are present on the positive side in the installation direction Z of the front ends of the side walls 71 of the first shutter 62. As the arms 81 contact the front ends of the side walls 71, the second shutter 63 is prevented from moving relative to the shutter mount 61 in the direction opposite the installation direction Z.

Subsequently, as the toner cartridge 50 is moved in the installation direction Z as indicated by arrow A4 shown in FIG. 12B, the second shutter 63 enters the second recess 92 of the cartridge mount 90, and the planar body 78 (the front end face 78*a*) of the second shutter 63 contacts the second step 98 of the cartridge mount 90 (refer to FIGS. 12B, 14, and 15). Therefore, the second shutter 63 is restricted from moving in the installation direction Z relative to the cartridge mount 90.

Subsequently, as the toner cartridge 50 is moved in the installation direction Z, the first shutter 62 enters the first recess 94 of the cartridge mount 90, which allows the first shutter 62 to move in the installation direction Z together with the toner cartridge 50. Then, the second shutter 63 remains at the restriction position by the second step 98 (refer to FIGS. 12C, 13B, 16, and 17). That is, the second shutter 63 moves to the negative side in the direction Z from the shielding position while the first shutter 62 is retained at the sealing position as shown in FIG. 13B.

Then, referring to FIG. 16, the edges 81*a* of the arms 81 of the second shutter 63 contact the side walls 71 of the first shutter 62, and the arms 81 deform, expanding in the installation direction Z and shifting the edges 81*a* outward in the direction X. Accordingly, the hook piece 81*b* of each arm 81 projects outside the side wall 80 in the direction X and enters the retaining groove 93 leading to the second recess 92.

Subsequently, as the toner cartridge 50 is moved in the installation direction Z as indicated arrow A5 shown in FIG. 12C, the first shutter 62 (in particular, the front end face 74*a*) contacts the first step 99 of the cartridge mount 90 and is restricted from moving in the installation direction Z relative to the cartridge mount 90.

In this state, as the first and second shutters 62 and 63 move relatively in the installation direction Z, the second shutter 63 is in the releasing state relative to the first shutter 62 where the pressing projection 79 faces the pressed projection 73 of the first shutter 62 (refer to FIGS. 16 and 17). As the pressing projection 79 pushes the pressed projection 73 in the direction Y, the body 72*b* of the retained piece 72 is shifted to the released posture (refer to FIG. 17).

It is to be noted that, although the pressed projection 73 contacts the pressing projection 79 as the first shutter 62 moves relative to the second shutter 63 in the installation direction Z, the inclined face 73*a* of the pressed projection 73 on the positive side in the direction Z and the inclined face 79*a* of the pressing projection 79 on the negative side in the direction Z can prevent them from getting stuck on each other. With this configuration, the legs 72*c* of the retained piece 72 of the first shutter 62 can be disengaged from the pressed portions 65*b* of the retaining projections 65 provided to the bottom wall 50*b* (refer to FIGS. 14 and 15). Then, the body 72*b* faces the channel 65*c* in the installation direction Z and can move to the negative side in the direction Z relative to the shutter mount 61 of the toner cartridge 50.

Additionally, in this state, as the shutter mount 61 of the toner cartridge 50 moves in the installation direction Z relative to the cartridge mount 90, the releasing projection 67 (the end face 67*a*) of the shutter mount 61 contacts and pushes the first projection 95*a* of each pawl 95 of the cartridge mount 90 in the installation direction Z, causing the pawl 95 to pivot from the initial pivot position (shown in FIG. 10) on the shaft 95*c* (refer to FIGS. 16 and 18). Accordingly, referring to FIG. 16, the end face of the first projection 95*a* of each pawl 95 is mated with the side face of the shutter mount 61, and the second projection 95*b* thereof is positioned on the back of the engaging portion 75 (on the negative side in the direction Z of the hook face 75*a*) of the side wall 71 of the first shutter 62.

Figure 12D:
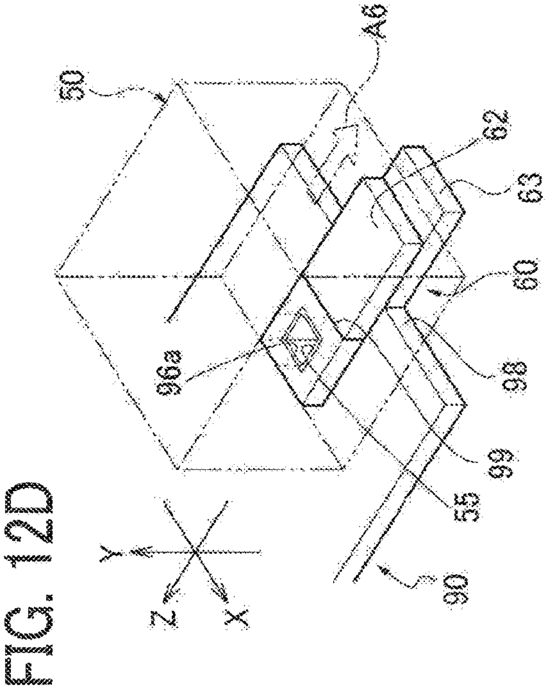

Subsequently, as the toner cartridge 50 moves in the installation direction Z as indicated by arrow A5 in FIG. 12C, the shutter mount 61 of the toner cartridge 50 is positioned above the inlet rim 96 with the first shutter 62 remaining at the restriction position by the first step 99 and the second shutter 63 remaining at the restriction position by the second step 98 (refer to FIGS. 12D, 13C, and 19). In other words, the first and second shutters 62 and 63 move to the negative side in the direction Z with the second shutter 63 kept in the releasing state relative to the first shutter 62 (refer to FIG. 13C). At that time, referring to FIG. 19, the inclined front side 68*a* of the retention releasing piece 68 provided to the side wall 50*c* contacts the inclined rear side 97*d* of the claw 97*a* of the cartridge mount 90, and the retention releasing piece 68 moves further in the installation direction Z, thereby pushing in the claw 97*a* inside the cartridge mount 90.

As the toner cartridge 50 is further moved in the installation direction Z, the pressure contact state between the shutter seal 77 of the first shutter 62 and the shutter mount 61 around the outlet 55 is released, and the outlet 55 of the shutter mount 61 is connected to the developer inlet 96*a* enclosed by the inlet rim 96 with the lower end face of the shutter mount 61 in planar contact with the upper end face of the inlet rim 96 (refer to FIGS. 13C and 20 through 22). Thus, the first shutter 62 opens the outlet 55, and the second shutter 63 is at the open position maintaining the releasing state relative to the first shutter 62.

At that time, referring to FIG. 20, the inner face of each arm 81 in the direction X, at the position adjacent to the edge 81*a*, is mated with the inclined wall 66*c* of the base end 66*a* of the support projections 66. Additionally, the retention releasing pieces 68 of the toner cartridge 50 move in the installation direction Z to a position not to interfere with the claws 97*a*, with the edge of each retention releasing piece 68 (ridge between the front side 68*a* and the rear side 68*b*) overstriding the edge of the claw 97*a* (ridge between the front side 97*c* and the rear side 97*d*) of the cartridge mount 90 (refer to FIGS. 20 and 22). Thus, the inclined rear side 68*b* of the retention releasing piece 68 faces the inclined front side 97*c* of the claw 97*a*, fixing the position of the toner cartridge 50 relative to the cartridge mount 90 releasably.

Referring to FIGS. 20 and 21, in the state in which the outlet 55 is connected to the developer inlet 96*a*, the second projection 95*b* of each pawl 95 is on the back of the engaging portion 75 (in particular, on the negative side in the direction Z of the hook face 75*a* shown in FIG. 6A) of the side wall 71 of the first shutter 62 being at the open position, retained at the restriction position by the first step 99. Additionally, in this state, the second shutter 63 is at the open position and retained at the restriction position by the second step 98 with the hook piece 81*b* (shown in FIG. 7A) of each arm 81 thereof inserted in the retaining groove 93 (refer to FIG. 20).

Thus, installation of the toner cartridge 50 to the cartridge mount 90 is completed. In this state, the toner supply device 43 can lead developer discharged from the outlet 55 to the temporary reservoir 44 inside the toner supply device 43 through the developer inlet 96*a* (refer to FIG. 3). Then, developer is supplied from the toner cartridge 50 to the development device 23 shown in FIG. 3.

Figure 24:
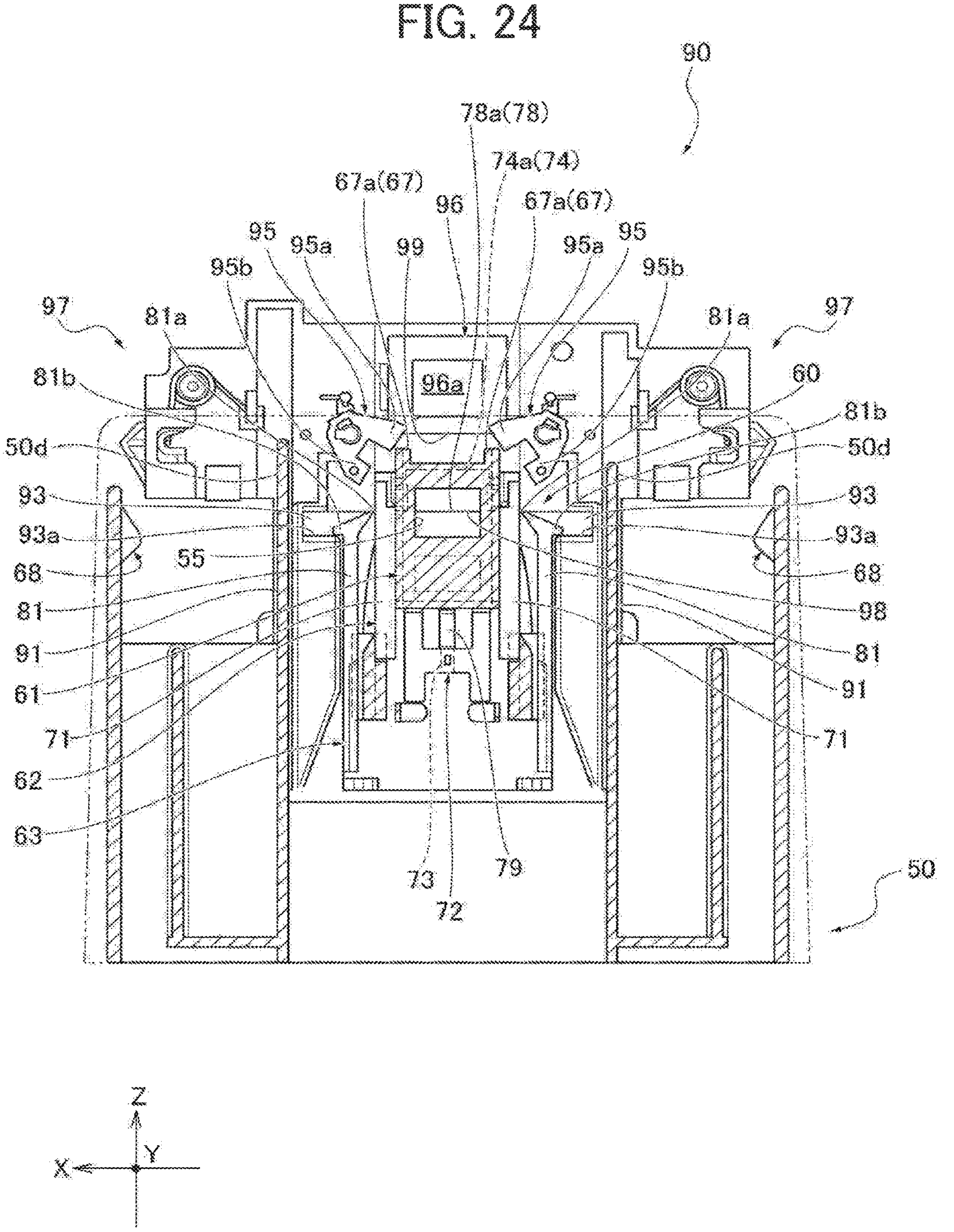
FIG. 24 is a cross-sectional view similar to that shown in FIG. 23 and illustrates a state in which the first shutter is released from the pawls as the toner cartridge moves in the direction opposite the installation direction.
Figure 25:
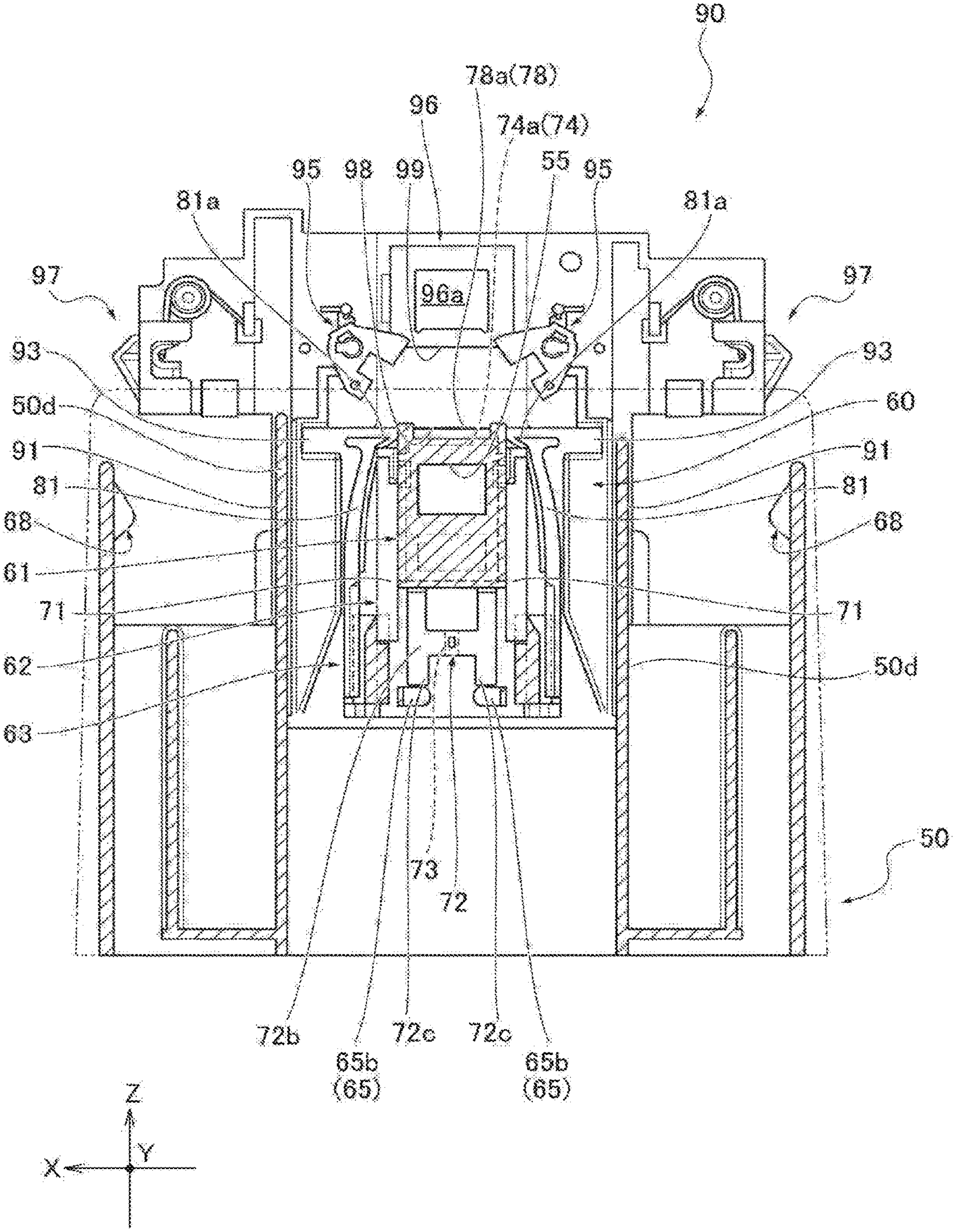
FIG. 25 is a cross-sectional view similar to that shown in FIG. 23 and illustrates a state in which the second shutter is released from retention by the hook pieces and retaining grooves.

Descriptions are given below of operations of the shutter assembly 60 and the cartridge mount 90 when the toner cartridge 50 is removed from the toner supply device 43 with reference to FIGS. 23 to 25 in addition to FIGS. 12A through 13C.

Figure 23:
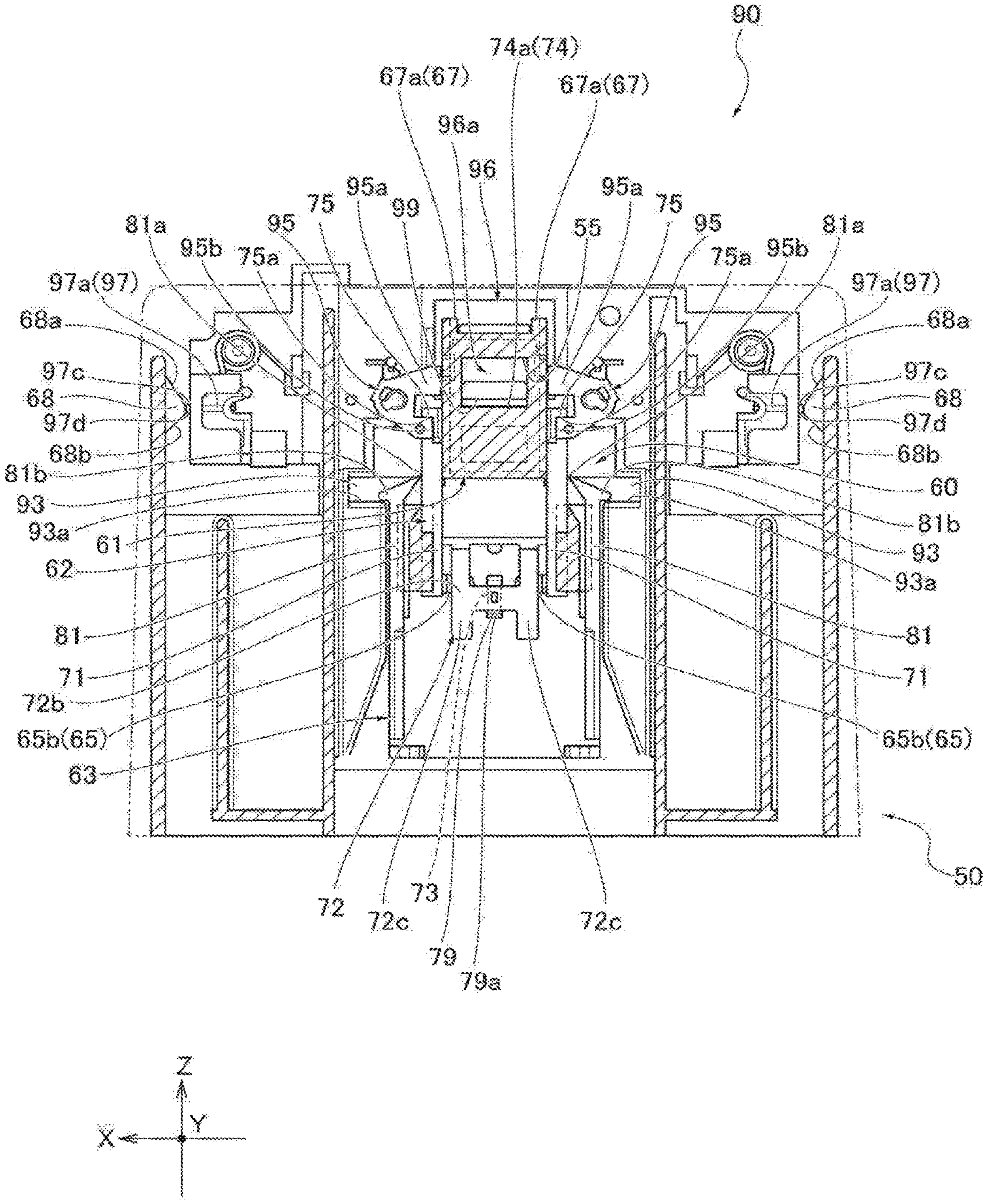
FIG. 23 is a cross-sectional view similar to FIGS. 8 and 10 and illustrates a state in which the toner cartridge is released from the releasing members as the toner cartridge moves relative to the cartridge mount in the direction opposite the installation direction.

FIG. 23 illustrates a state in which the toner cartridge 50 is released from the releasing member 97 as the toner cartridge 50 moves relative to the cartridge mount 90 in the direction opposite the installation direction Z. The toner cartridge 50 shown in FIG. 23 is on the same cross section as FIG. 8, and the cartridge mount 90 shown in FIG. 23 is on the same cross section as FIG. 10. FIG. 24 is a cross-sectional view similar to that shown in FIG. 23 and illustrates a state in which the first shutter 62 is released from the pawls 95 during removal of the toner cartridge 50. FIG. 25 is a cross-sectional view similar to that shown in FIG. 23 and illustrates a state in which the second shutter 63 is released from retention by the hook pieces 81*b* and the retaining grooves 93.

In removal of the toner cartridge 50 from the cartridge mount 90, the toner cartridge 50 is moved to the negative side in the direction Z, which is also referred to as "removal direction".

Initially, the toner cartridge 50 is moved in the removal direction opposite the direction Z relative to the cartridge mount 90 as indicated by arrow A6 shown in FIG. 12A. Then, referring to FIG. 23, the inclined rear side 68*b* of the retention releasing piece 68 provided to the side wall 50*c* contacts the inclined front side 97*c* of the claw 97*a* of the cartridge mount 90, and the retention releasing piece 68 moves further in this state, thereby pushing in the claw 97*a* inside the cartridge mount 90. As the toner cartridge 50 moves further in the removal direction opposite the direction Z, the retention releasing pieces 68 move in the removal direction to the position not to interfere with the claws 97*a*, with the edge of each retention releasing piece 68 overstriding the edge of the claw 97*a* of the cartridge mount 90. Thus, the retention by the release pieces 68 and the releasing members 97 is canceled (refer to FIG. 24).

Further, as the toner cartridge 50 moves in the removal direction opposite the direction Z, the shutter mount 61 moves in that direction, and the outlet 55 is shifted from the supply opening 96*a* of the cartridge mount 90 in the direction Y (refer to FIG. 23). At that time, since the second projection 95*b* of each pawl 95 of the cartridge mount 90 is inserted on the back side of each engaging portion 75 of the first shutter 62, the second projection 95*b* contacts the hook face 75*a* of the engaging portion 75 in the direction Z, thereby inhibiting the first shutter 62 from moving in the removal direction relative to the cartridge mount 90.

Additionally, since the hook piece 81*b* of each arm 81 of the second shutter 63 is in the retaining groove 93 of the cartridge mount 90, the hook piece 81*b* contacts the wall 93*a* of the retaining groove 93 in the direction Z, thereby inhibiting the second shutter 63 from moving in the removal direction relative to the cartridge mount 90. Thus, the first shutter 62 retained by the first step 99 and the second shutter 63 retained by the second step 98 are inhibited from moving in the removal direction (refer to FIGS. 12C and 12D). In other words, in the toner cartridge 50, the first and second shutters 62 and 63 move in the installation direction Z, from the position shown in FIG. 13C to the position shown in FIG. 13B, with the second shutter 63 retained in the releasing state relative to the first shutter 62.

Subsequently, when the toner cartridge 50 reaches a position where the first shutter 62 is at the sealing position with the shutter seal 77 (shown in FIG. 17) pressing against the periphery of the outlet 55 in the toner cartridge 50, the outlet 55 is sealed (refer to FIGS. 12C, 13B, and 24). Then, due to the positions of the pawls 95 and the first step 99 of the cartridge mount 90 relative to the shutter mount 61, the releasing projections 67 (the end faces 67*a* in particular) of the shutter mount 61 are positioned on the negative side in the direction Z of the first projections 95*a* of the pawls 95 of the cartridge mount 90 (refer to FIG. 24).

Since the shutter mount 61 (the releasing projections 67 in particular) no longer pushes the first projections 95*a* of the pawls 95 in the direction Z, the pawls 95 pivot to the initial pivot position. With this operation, the second projection 95*b* of each pawl 95 is disengaged from the back side of the engaging portion 75 of the first shutter 62, thereby allowing the first shutter 62 to move in the removal direction relative to the cartridge mount 90. At that time, the second shutter 63 is still retained at the restriction position by the second step 98 (refer to FIG. 24).

As described above, in the pawl 95, the end face of the first projection 95*a* is mated with the side face of the shutter mount 61 to set the second projection 95*b* on the back of the engaging portion 75 of the side wall 71 of the first shutter 62. Further, the releasing projection 67 of the shutter mount 61 can be moved to the negative side in the direction Z of the first projection 95*a* of the pawl 95 when the toner cartridge 50 is moved in the removal direction until the first shutter 62 reaches the sealing position from the position restricted by the first step 99.

With this configuration, until the first shutter 62 reaches the sealing position, the pawls 95 are prevented from pivoting to the initial pivot position by the side faces of the shutter mount 61 being kept in contact with the first projections 95*a* of the pawls 95. Accordingly, until the first shutter 62 is set at the sealing position in the toner cartridge 50, the pawls 95 keep the first shutter 62 at the position restricted by the first step 99. In other words, the first shutter 62 is prevented from being released from the position restricted by the first step 99 before the first shutter 62 is set at the sealing position. With this configuration, during removal of the toner cartridge 50 from the cartridge mount 90, shielding of the outlet 55 by the first shutter 62 and the shutter seal 77 can be secured.

Subsequently, as the toner cartridge 50 is moved from the position shown in FIG. 12C to the position shown in FIG. 12B as indicated by arrow A7 in FIG. 12C in the removal direction, the first shutter 62 moves in the removal direction together with the toner cartridge 50, and the second shutter 63 remains at the position restricted by the second step 98. That is, the second shutter 63 moves in the direction Z (from the position shown in FIG. 13B to the position shown in FIG. 13A) while the first shutter 62 remains at the sealing position. This relative movement between the first and second shutters 62 and 63 in the direction Z dissolves the releasing state of the second shutter 63 relative to the first shutter 62, in which the pressing projection 79 faces the pressed projection 73 of the first shutter 62 (refer to FIG. 24), and the body 72*b* of the retained piece 72 reverts to the fixed posture shown in FIG. 15 with the elastic force.

In this state, the legs 72*c* of the retained piece 72 contact the pressed portions 65*b* of the retaining projection 65 provided to the bottom wall 50*b* in the direction Z (refer to FIGS. 8, 9, 14, and 24). Accordingly, the first shutter 62 is at the sealing position to seal the outlet 55 with the shutter seal 77 and restricted from moving in the removal direction relative to the toner cartridge 50 by the legs 72*c* of the body 72*b* of the retained piece 72 in contact with the pressed portions 65*b* of the retaining projections 65 on the bottom wall 50*b* in the direction Z.

Subsequently, referring to FIG. 25, as the toner cartridge 50 moves in the removal direction opposite the direction Z, the first shutter 62 is interposed between the arms 81 of the second shutter 63, disengaging the edges 81*a* of the arms 81 from the side walls 71 of the first shutter 62. Accordingly, referring to FIG. 25, the edge 81*a* of each arm 81 can move inward in the direction X, and the arm 81 is shifted to the initial curved state, disengaging the hook piece 81*b* from the retaining groove 93 of the cartridge mount 90. Thus, the second shutter 63 can move in the removal direction relative to the cartridge mount 90. At that time, the second shutter 63 is at the shielding position, and the planar body 78 of the second shutter 63 is present on the negative side in the direction Y of the pressed projection 73 of the first shutter 62, preventing the pressed projection 73 from appearing outside the toner cartridge 50 (refer to FIGS. 12B, 13A, and 25).

Subsequently, the toner cartridge 50 is disengaged from the cartridge mount 90 by moving in the removal direction as indicated by arrow A8 shown in FIG. 12B. At that time, the first shutter 62 is at the sealing position, and the shutter seal 77 is pressed against the shutter mount 61 on the periphery of the outlet 55, sealing the outlet 55 (refer to FIGS. 12A, 13A, 15, and 25). Additionally, the second shutter 63 is at the shielding position, covering the first shutter 62 including the pressed projection 73 (refer to FIGS. 4, 15, and 25). Thus, referring to FIG. 4, the outlet 55 is closed by the shutter assembly 60, which is a state similar to the state before the toner cartridge 50 is mounted to the cartridge mount 90 (the toner supply device 43). Thus, removal of the toner cartridge 50 is completed.

In the toner cartridge 50 (50Y. 50M. 50C or 50BK) serving as the powder container according to the present embodiment, when the first shutter 62 is at the sealing position to close the outlet 55, the pressed projection 73 of the first shutter 62 is shielded by the second shutter 63 to prevent access to the pressed projection 73. Accordingly, the pressed projection 73 can be prevented from being pushed unintentionally. This configuration can prevent the first shutter 62 from being moved from the sealing position to the open position and the outlet 55 from being opened unintentionally.

Additionally, in the toner cartridge 50, as the second shutter 63 is moved from the shielding position to the releasing position, the pressing projection 79 of the second shutter 63 pushes the pressed projection 73 of the first shutter 62 to release the first shutter 62 retained at the sealing position. Thus, opening and closing of the outlet 55 by the shutter assembly 60 is not degraded.

Additionally, since the second shutter 63 can cover the entire first shutter 62 at the sealing position, including the pressed projection 73, in closing of the outlet 55 by the first shutter 62, users can be free from developer even if developer adheres to the first shutter 62, thus enhancing the usability.

The planar second shutter 63 is not easily moved from the shielding position to the releasing state relative to the first shutter 62, thus inhibiting unintended opening of the outlet 55 more effectively.

The arms 81 (the edges 81*a* in particular) of the second shutter 63 are present on the positive side in the installation direction Z of the front ends of the side walls 71 of the first shutter 62, and the arms 81 contact the front ends of the side walls 71, thereby inhibiting the second shutter 63 from moving relative to the shutter mount 61 in the direction opposite the installation direction Z. Therefore, the second shutter 63 is not easily moved from the shielding position to the releasing state relative to the first shutter 62, thus inhibiting unintended opening of the outlet 55 more effectively.

As the first shutter 62 moves in the installation direction Z relative to the second shutter 63, the edge 81*a* of each arm 81 of the second shutter 63 contacts the side wall 71 of the first shutter 62, thus deforming the arms 81 so that the hook pieces 81*b* of the arms 81 are positioned outside the side wall 80 of the second shutter 63 in the direction X. Accordingly, the movement of the second shutter 63 from the shielding position to the releasing position can prevent the second shutter 63 from moving to the negative side in the direction Z relative to the cartridge mount 90.

The shutter assembly 60 can be simplified because the pair of arms 81 of the second shutter 63 can be deformed and recovered using the first shutter 62 (the side walls 71 in particular).

The direction in which the first shutter 62 is movable is identical or parallel to the direction in which the second shutter 63 is movable, and the movable direction of the first and second shutters 62 and 63 is identical or parallel to the installation direction Z of the toner cartridge 50. Accordingly, the first and second shutters 62 and 63 can be moved by moving the toner cartridge 50 in the installation direction Z.

In the lower portion of the front end face 50*a* of the toner cartridge 50, the screw junction section 59 in which the conveyance screw 56 (shown in FIG. 4) is provided, the end faces 67*a* of the releasing projections 67, the front end face 74*a* of the mount 74 of the first shutter 62, and the front end face 78*a* of the planar body 78 of the second shutter 63 are positioned in that order in the vertical direction in FIG. 9. Therefore, with the different height faces (the first step 99 and the second step 98) perpendicular to the installation direction Z, the first and second shutters 62 and 63 can be moved by the movement of the toner cartridge 50 in the installation direction Z.

In movement of the first shutter 62 in the installation direction Z relative to the second shutter 63, the pressed projection 73 of the first shutter 62 and pressing projection 79 of the second shutter 63 can be prevented from getting stuck on each other since the inclined face 73*a* is provided at the front end (positive side in the direction Z) of the pressed projection 73 and the inclined face 79*a* is provided at the rear end (negative side in the direction Z) of the pressing projection 79.

Since the inclined face 80*b* is provided at the front end of each side wall 80 of the second shutter 63, the second shutter 63 can be mounted to the bottom wall 50*b* of the toner cartridge 50 by placing the inclined face 80*b* to face the planar portions 66*b* of the support projections 66 of the bottom wall 50*b* from the negative side in the direction Y and pushing the second shutter 63 in the direction Y.

When the shutter assembly 60 opens the outlet 55, in each arm 81, the inner face in the direction X adjacent to the edge 81*a* is mated with the inclined wall 66*c* of the base end 66*a* of the support projections 66. Accordingly, while the hook pieces 81*b* are retained in the retaining grooves 93, the arms 81 can be prevented from remaining in the stretched state, thus securing recover of the arms 81 to the initial curved state.

In this state, mating of the inner face adjacent to the edge 81*a* of each arm 81 with the inclined wall 66*c* of the base end 66*a* of the support projections 66 can secure retention of the hook pieces 81*b* in the retaining grooves 93.

The arms 81 of the second shutter 63 can restrict the second shutter 63 from moving to the releasing position from the shielding position and prevent the second shutter 63 from moving to the negative side in the direction Z (removal direction) relative to the cartridge mount 90. Thus, the second shutter 63 can be simplified.

The shutter assembly 60 can be more effective in the box-shaped toner cartridge 50 since it is supposed that the bottom wall 50*b* is supported from under in transport of the toner cartridge 50.

The toner supply device 43 serving as the powder supply device according to the present embodiment includes the cartridge mount 90 in which the second step 98 is created by the second recess 92 to receive the second shutter 63 and the first recess 94 to receive the first shutter 62 such that the second step 98 contacts the second shutter 63 in the installation direction Z of the toner cartridge 50. With this configuration, the second shutter 63 can be moved from the shielding position to the releasing position by moving the toner cartridge 50 in the installation direction Z.

In the toner supply device 43, when the first shutter 62 enters the first recess 94, the first shutter 62 can move in the direction Z relative to the second shutter 63 at the restriction position by the second step 98, and the arms 81 of the second shutter 63 can be deformed by the first shutter 62, thereby shifting the hook pieces 81*b* to the positions outside the side walls 80 in the direction X. Thus, the hook pieces 81*b* can enter the retaining grooves 93 formed in the cartridge mount 90. Therefore, the second shutter 63 being restricted by the second step 98 can be prevented from moving to the negative side in the direction Z.

In the cartridge mount 90 of the toner supply device 43, the first step 99 is created by the first recess 94 to receive the first shutter 62 and the inlet rim 96 such that the first step 99 contacts the first shutter 62 in the installation direction Z. With this configuration, the first shutter 62 can be moved from the sealing position to the open position by moving the toner cartridge 50 in the installation direction Z.

In the toner supply device 43, when the first shutter 62 reaches the first step 99, the second shutter 63 at the restriction position by the second step 98 is shifted from the shielding position to the releasing position relative to the first shutter 62, enabling the first shutter 62 to move the negative side in the direction Z relative to the toner cartridge 50. Accordingly, while the toner cartridge 50 moves in the installation direction Z, the first shutter 62 can remain at the position restricted by the first step 99.

When the first shutter 62 reaches the first step 99, additionally, the releasing projection 67 of the shutter mount 61 of the toner cartridge 50 pushes the first projection 95*a* of the pawl 95 of the cartridge mount 90 in the installation direction Z, causing the pawl 95 to pivot to dispose the second projection 95*b* on the back of the engaging portion 75 (negative side in the direction Z of the hook 75*a*) of the side wall 71 of the first shutter 62. Therefore, the first shutter 62 at the restriction position by the first step 99 can be prevented from moving to the negative side in the direction Z.

In the toner supply device 43, the first shutter 62 is prevented from moving to the negative side in the direction Z by the pair of releasing projections 67 of the shutter mount 61 of the toner cartridge 50 and the pair of pawls 95. Accordingly, in removal of the toner cartridge 50, by shifting the outlet 55 formed in the shutter mount 61 to the position sealed by the first shutter 62 being restricted by the first step 99, the first shutter 62 can be moved to the negative side in the direction Z relative to the position before installation of the toner cartridge 50.

In the toner supply device 43, the hook pieces 81*b* of the arms 81 and the retaining grooves 93 (the walls 93*a*) prevent the second shutter 63 from moving to the negative side in the direction Z, and the first shutter 62 being inside the second shutter 63 can allow the second shutter 63 to move from the restriction position by the second step 98 to the negative side in the direction Z. Accordingly, the second shutter 63 can be set at the shielding position (that is, the state before installation) by moving the toner cartridge 50 in the removal direction relative to the cartridge mount 90.

In the cartridge mount 90 of the toner supply device 43, the first step 99 is positioned upstream and across a certain distance from the second step 98 in the installation direction. Accordingly, moving the toner cartridge 50 in the installation direction Z relative to the cartridge mount 90 can sequentially shift the second shutter 63 from the shielding position to the releasing position, causing the first shutter 62 to shift to the negative side in the direction Z relative to the toner cartridge 50, and shift the first shutter 62 from the sealing position to the open position. Thus, the outlet 55 can be opened.

With this arrangement of the first step 99 and the second step 98, in removal of the toner cartridge 50, moving the toner cartridge 50 in the removal direction can sequentially shift the first shutter 62 from the open position to the sealing position, thereby closing the outlet 55, and shift the second shutter 63 from the releasing position to the shielding position, thereby covering the first shutter 62 including the pressed projection 73.

Therefore, in the first embodiment, unintended opening of the outlet 55 can be inhibited.

Second Embodiment

Reference to FIGS. 26 through 45, descriptions are given below of a toner cartridge 502 according to a second embodiment and an image forming apparatus 102 including a toner supply device 43 provided with a cartridge mount 902 to receive the toner cartridge 502, which are different in configuration from the toner cartridge 50, the image forming apparatus 10, and the cartridge mount 90 according to the first embodiment.

It is to be noted that elements of the toner cartridge 502, the image forming apparatus 102, and the cartridge mount 902 that are identical or similar to those of the first embodiment are given identical reference numerals or similar reference characters, and the descriptions thereof are omitted.

Figure 26:
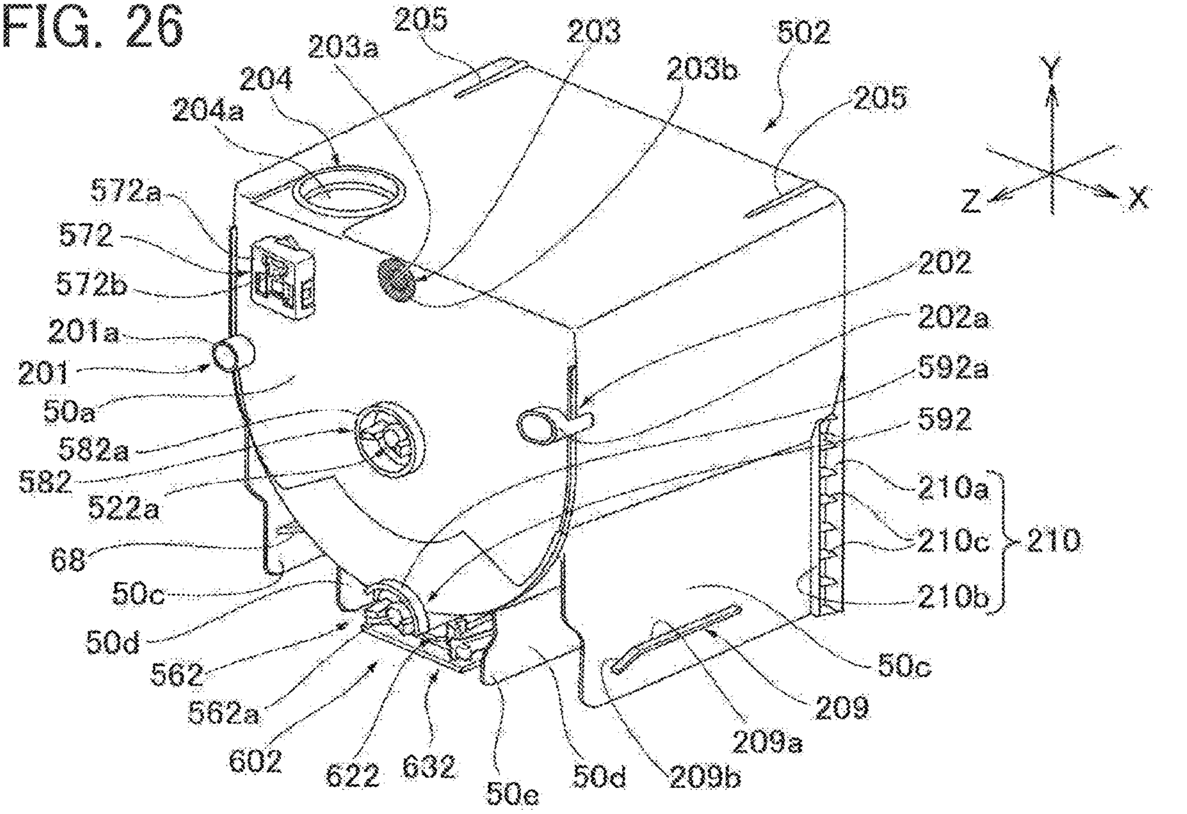
FIG. 26 is a perspective view of a toner cartridge according to a second embodiment, as viewed from above and a front side.
Figure 27:
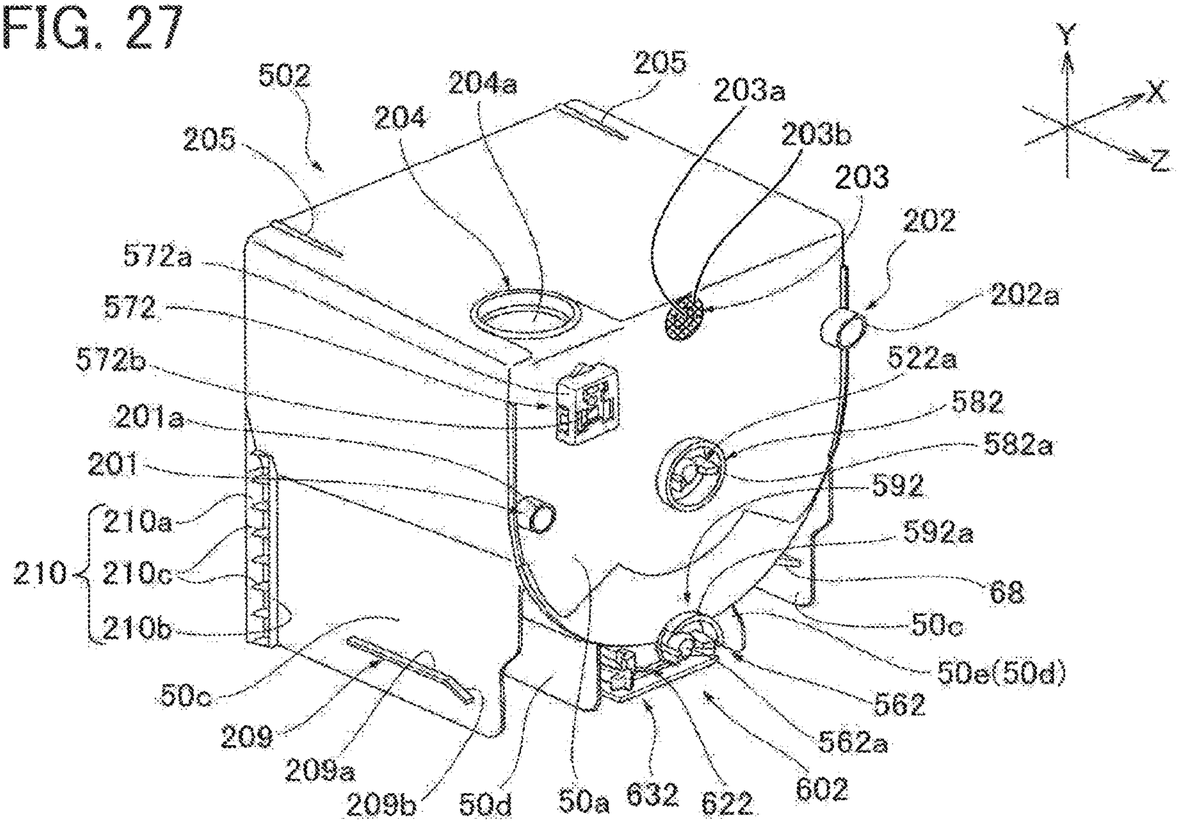
FIG. 27 is another perspective view of the toner cartridge shown in FIG. 26, as viewed from above and a different side.
Figure 28:
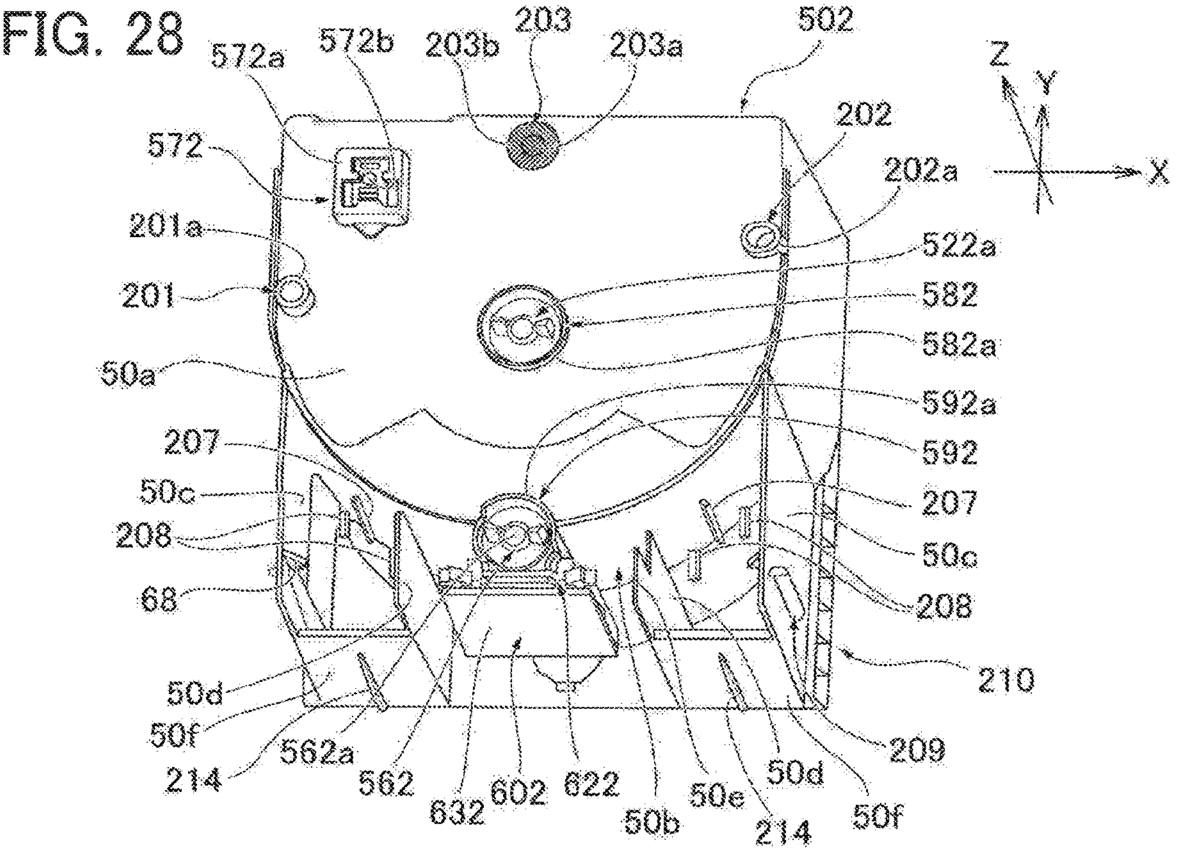
FIG. 28 is a perspective view of the toner cartridge shown in FIG. 26, as viewed from beneath and the front side.
Figure 29:
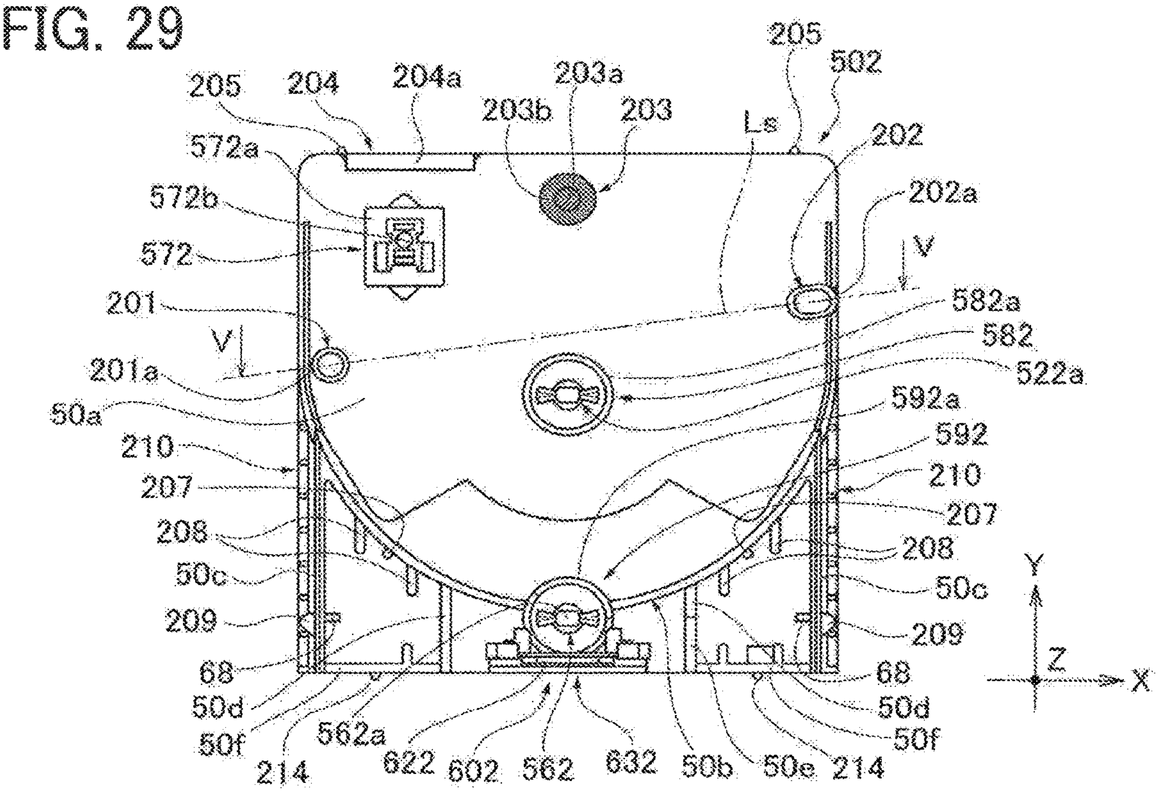
FIG. 29 is a front view of the toner cartridge according to the second embodiment.
Figure 30:
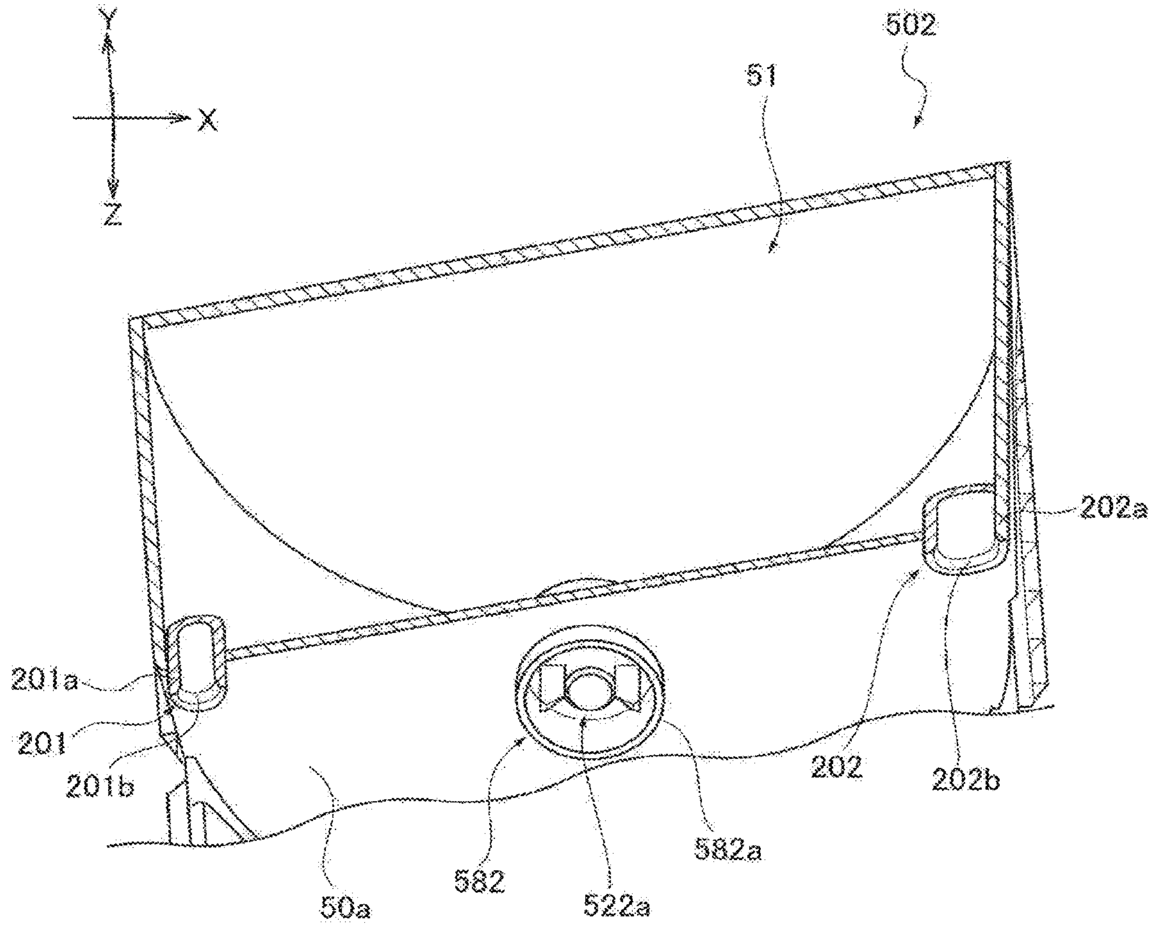
FIG. 30 is a perspective view of the toner cartridge as viewed from above and the front side, partly cut away along line V-V shown in FIG. 29.
Figure 31A:
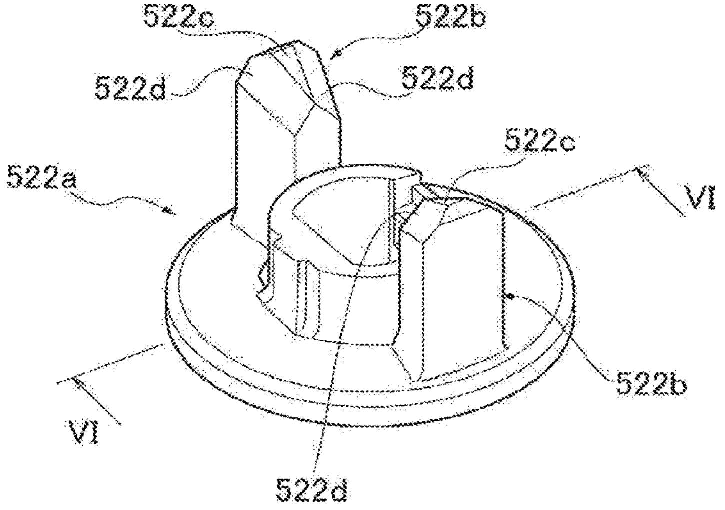
FIG. 31A is a perspective view of a connected portion of an agitator as viewed front the front side.
Figure 31B:
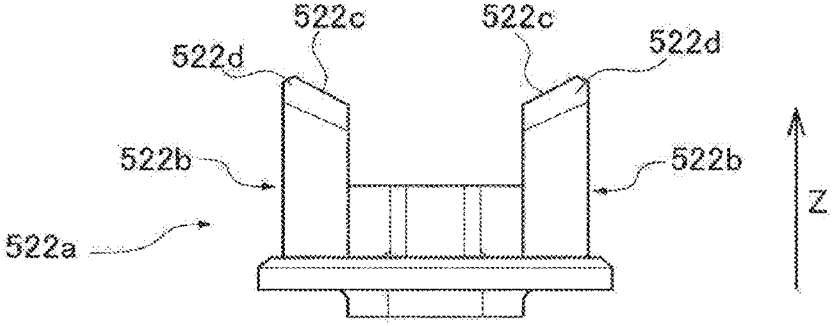
FIG. 31B is a side view of the connected portion in a direction perpendicular to the direction Z.
Figure 31C:
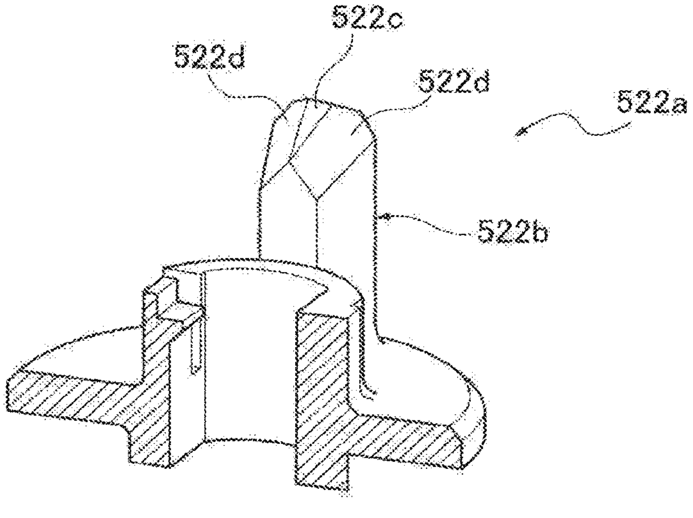
FIG. 31C is a cross-sectional view along line VI-VI shown in FIG. 31A.

FIG. 26 is a perspective view of the toner cartridge 502 according to the second embodiment, as viewed from above and a front side (on the positive side in the direction Z). FIG. 27 is another perspective view of the toner cartridge 502, as viewed from above and a different side. FIG. 28 is a perspective view of the toner cartridge 502 as viewed from beneath and the front side. FIG. 29 is a front view of the toner cartridge 502. FIG. 30 is a perspective view of the toner cartridge 502 as viewed from above and the front side, partly cut away along line V-V shown in FIG. 29. FIG. 31A is a perspective view of a connected portion 522*a* of the agitator 52 as viewed front the front side, FIG. 31B is a side view of the connected portion 522*a* in a direction perpendicular to the direction Z, and FIG. 31C is a cross-sectional view along line VI-VI shown in FIG. 31A.

Figure 32A:
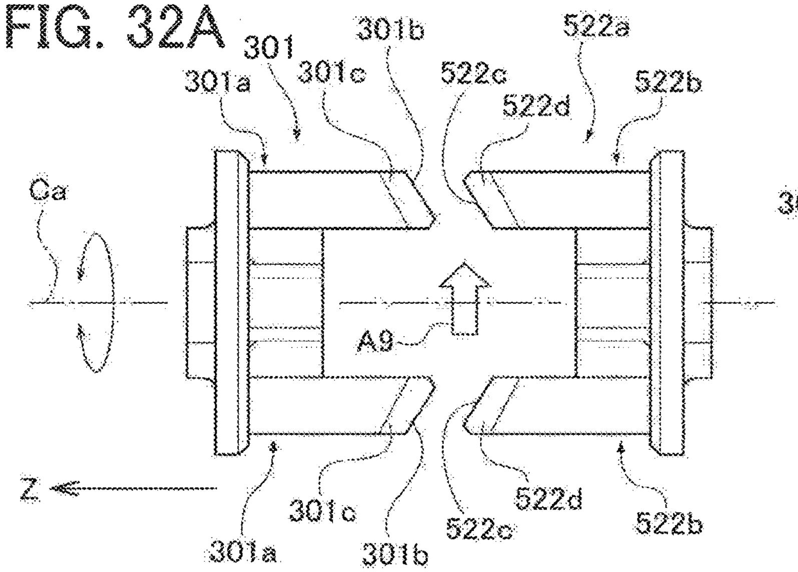
FIG. 32A is a schematic view of an agitator drive coupling provided to the toner supply device and the connected portion of the agitator in the direction perpendicular to the direction Z.
Figure 32B:
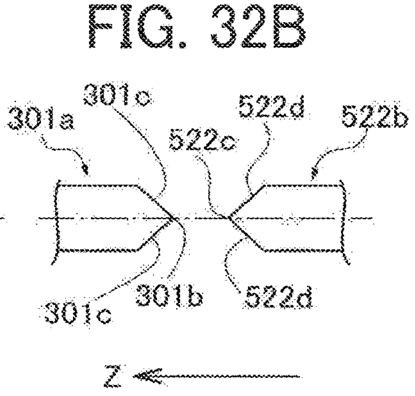
FIG. 32B is a schematic view of a projection of the agitator drive coupling and a projection of the connected portion as viewed in the direction indicated by arrow A9 shown in FIG. 32A.
Figure 32C:
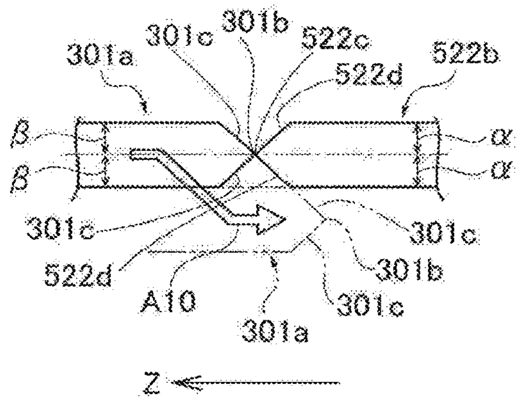
FIG. 32C illustrates the relative movement thereof due to a pair of inclined faces of the projection and a pair of inclined faces of the projection.
Figure 32D:
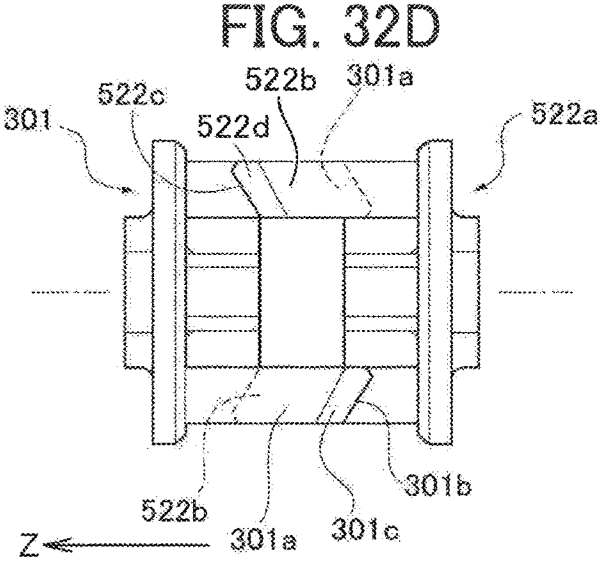
FIG. 32D illustrates the connected portion connected to the agitator drive coupling.
Figure 32E:
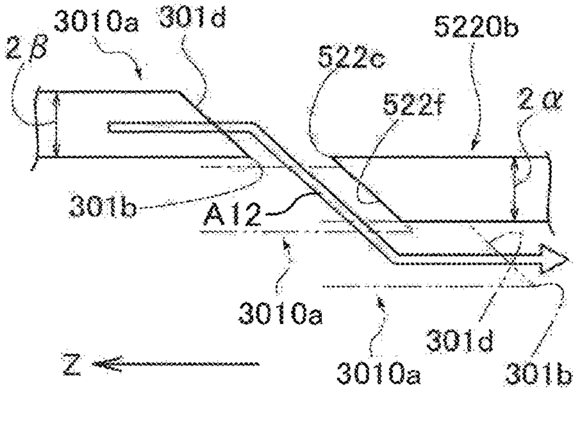
FIG. 32E illustrates the relative movement thereof in a configuration in which an inclined face is provided to a projecting end of the projection and an inclined face is provided to a projecting end of the projection.

FIG. 32A is a schematic view of the agitator drive coupling 301 provided to the toner supply device 43 and the connected portion 522*a* of the agitator 52 in the direction perpendicular to the direction Z. FIG. 32B is a schematic view of a projection 301*a* of the agitator drive coupling 301 and a projection 522*b* of the connected portion 522*a* as viewed in the direction indicated by arrow A9 shown in FIG. 32A. FIG. 32C illustrates the relative movement thereof due to a pair of inclined faces 301*c* of the projection 301*a* and a pair of inclined faces 522*d* of the projection 522*b*. FIG. 32D illustrates the connected portion 522*a* being connected to the agitator drive coupling 301. FIG. 32E illustrates the relative movement thereof in a configuration in which an inclined face 522*f* is provided to a projecting end 522*c* of the projection 522*b* and an inclined face 301*d* is provided to a projecting end 301*b* of the projection 301*a*.

Figure 33:
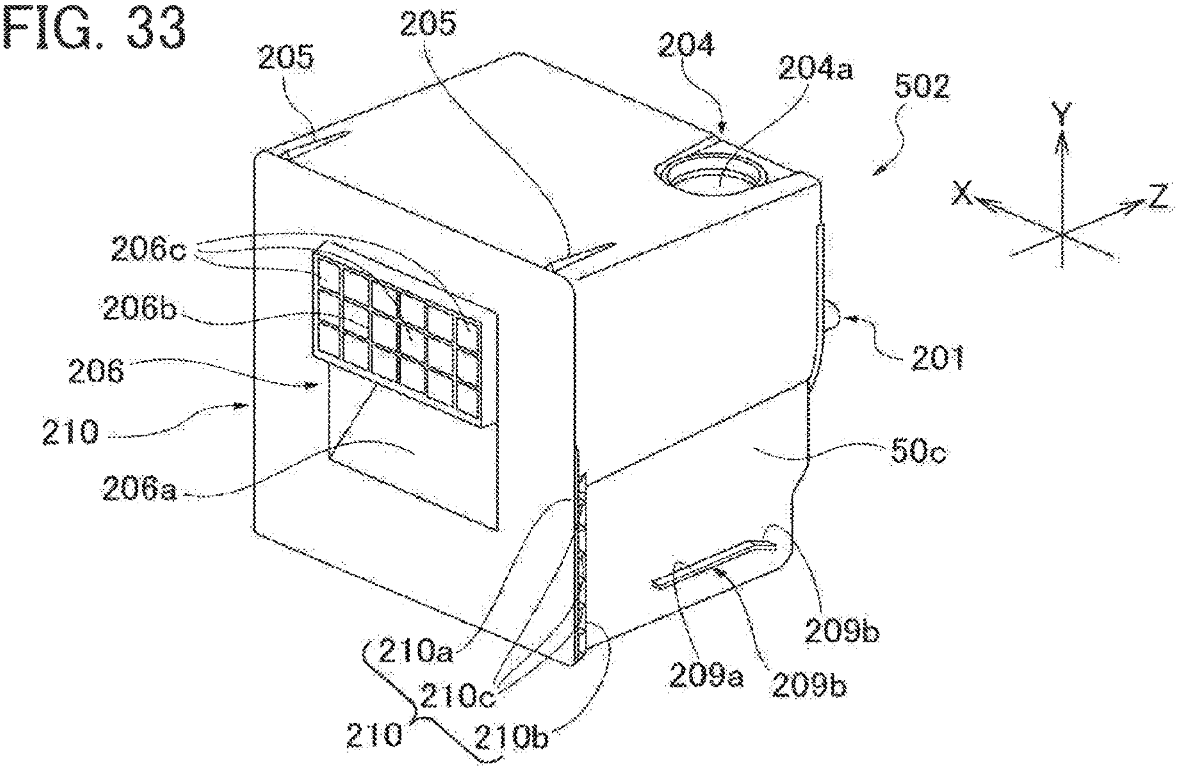
FIG. 33 is a perspective view of the toner cartridge as viewed from above and the rear side.
Figure 34:
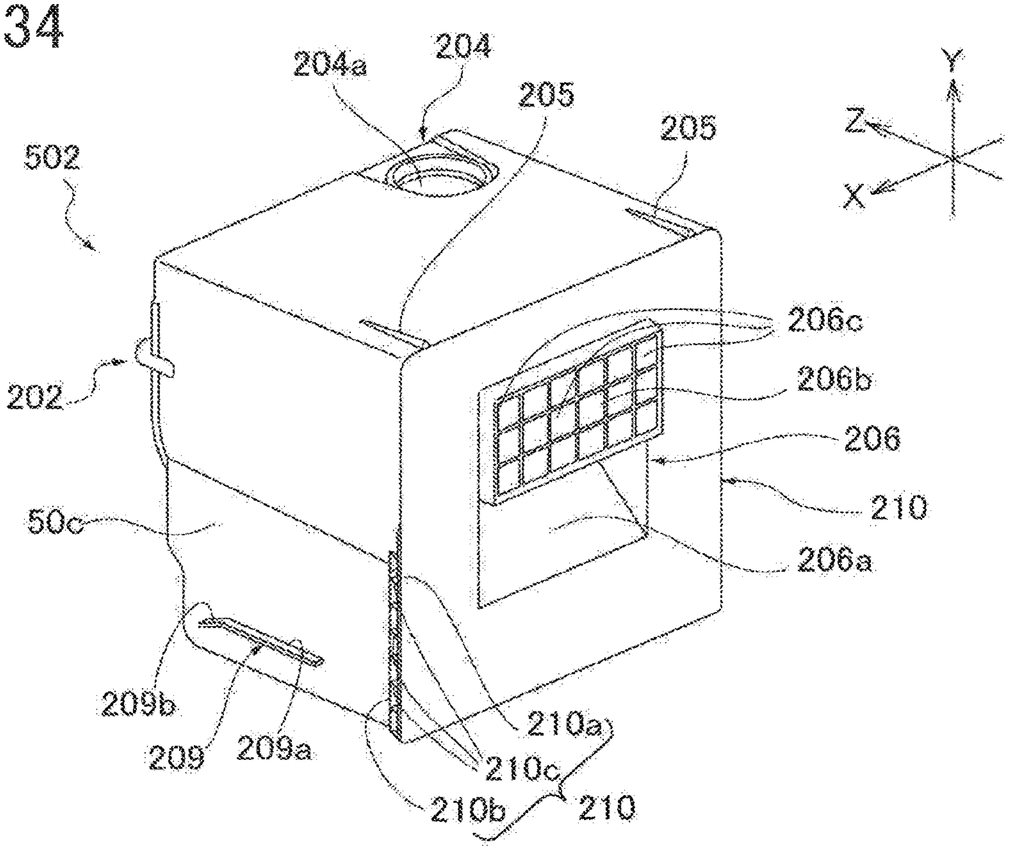
FIG. 34 is another perspective view of the toner cartridge, as viewed from above and the rear side, differently from FIG. 33.
Figure 35:
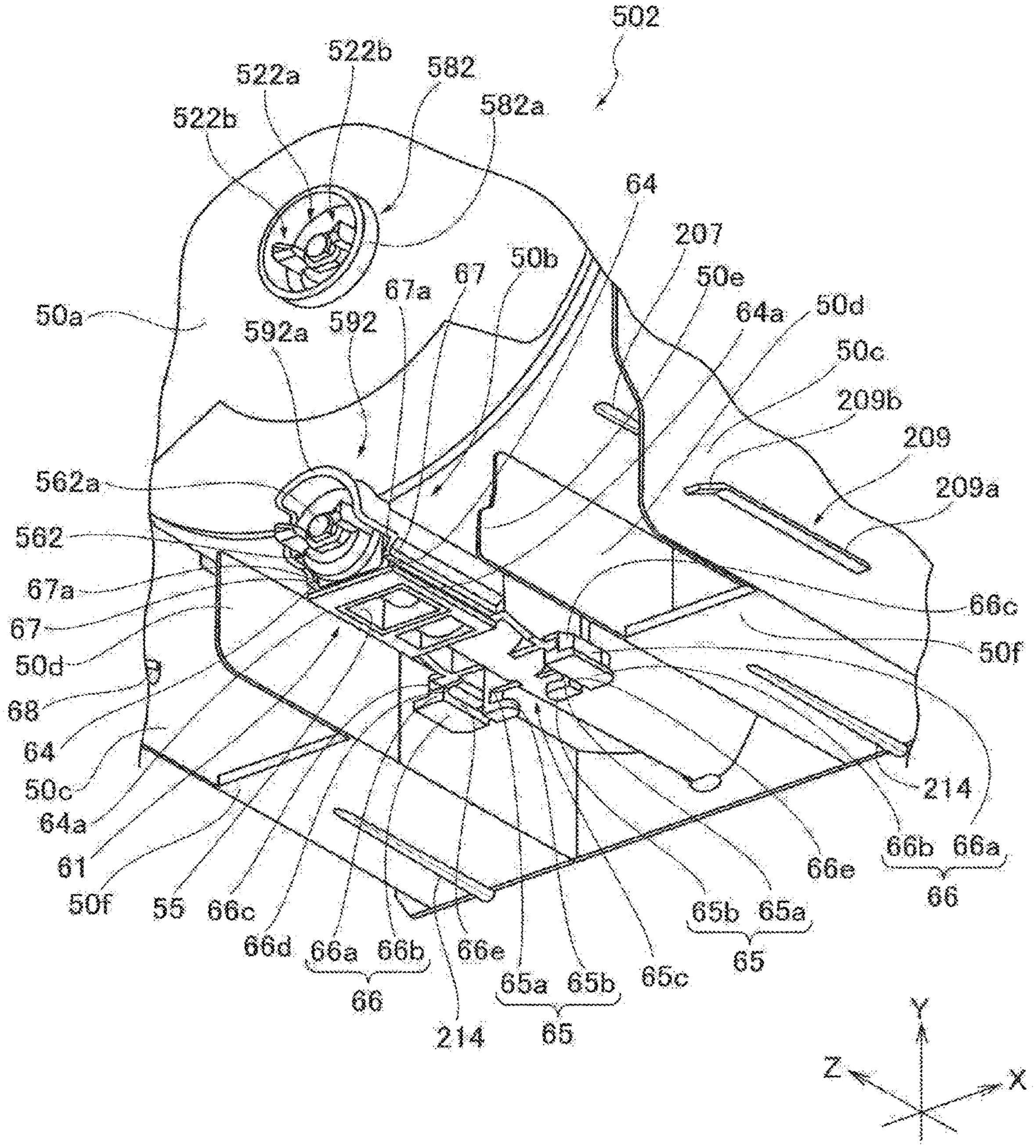
FIG. 35 is an enlarged perspective view illustrating a part of the bottom of the toner cartridge.
Figure 36:
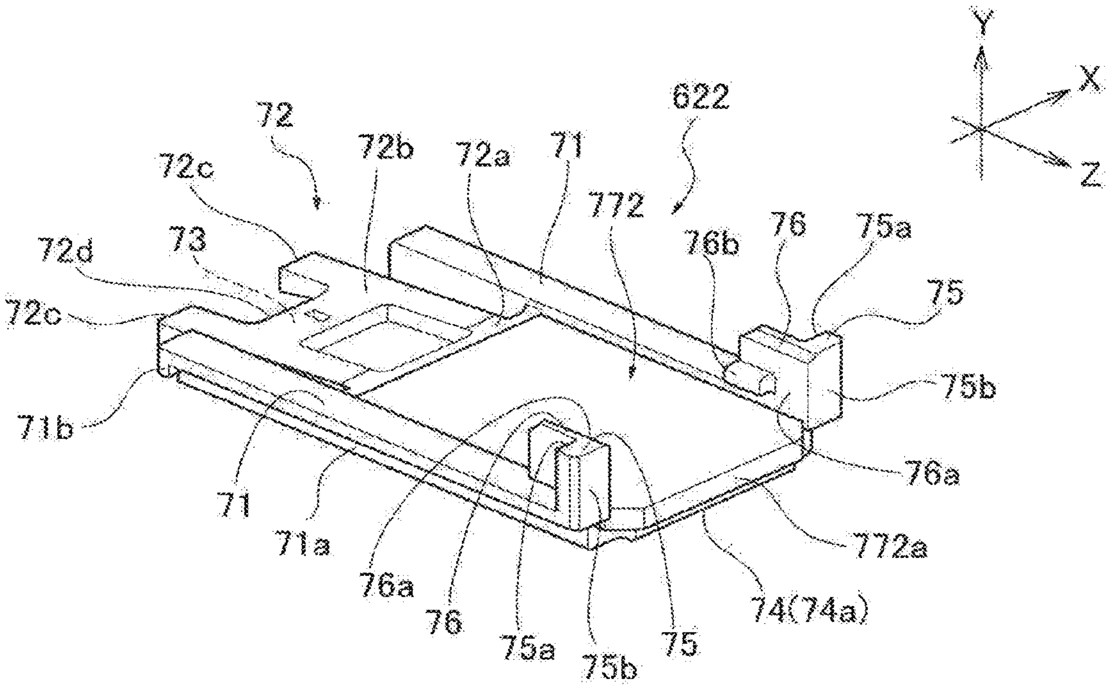
FIG. 36 is a perspective view of a first shutter of a shutter assembly according to the second embodiment.
Figure 37B:
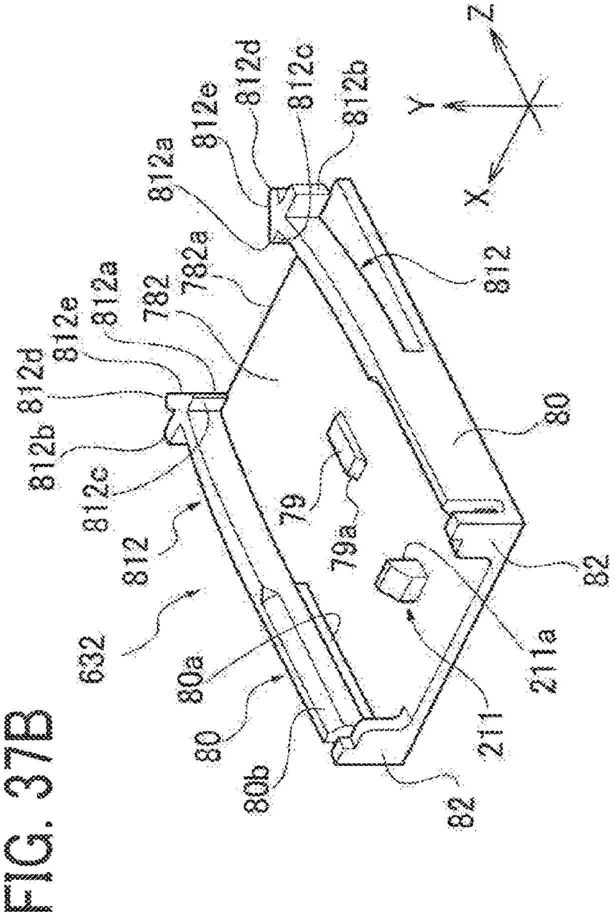
FIG. 37B is a perspective view of the second shutter as viewed from the top side and the trailing side in the installation direction Z.
Figure 37C:
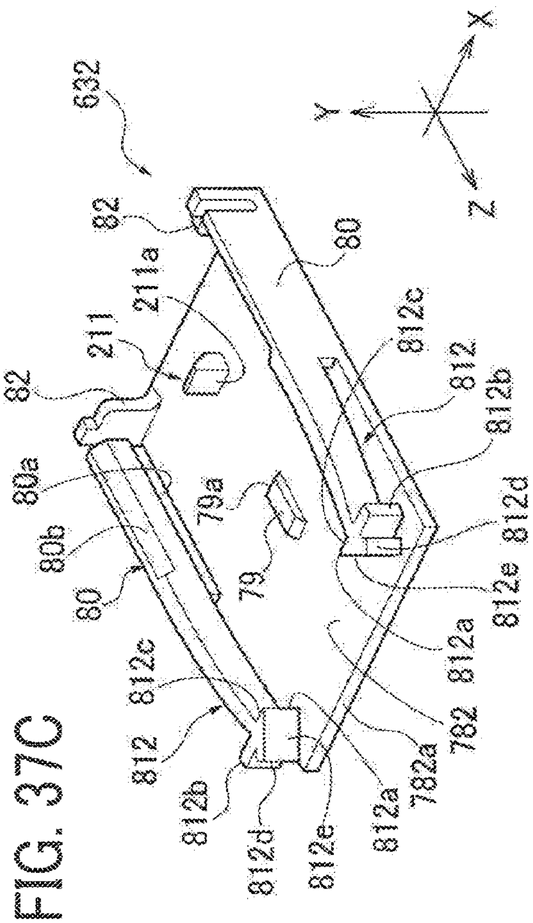
FIG. 37C is a perspective view of the second shutter as viewed from the top side and the front side in the direction Z.
Figure 37A:
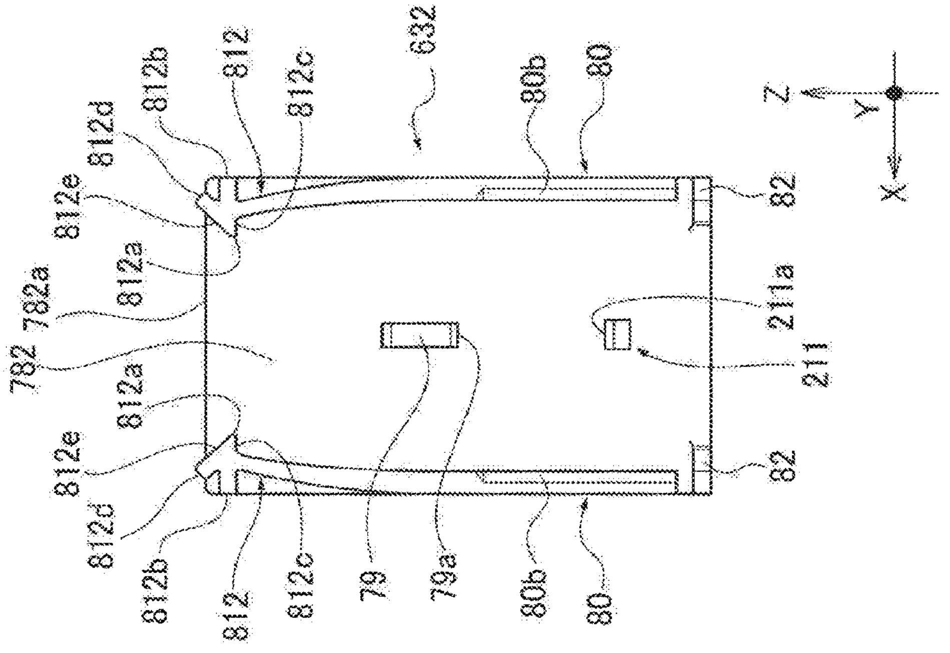
FIG. 37A is a front view of a second shutter according to the second embodiment as viewed from the top side.

FIG. 33 is a perspective view of the toner cartridge 502 as viewed from above and the rear side. FIG. 34 is another perspective view of the toner cartridge 502, as viewed from above and the rear side, differently from FIG. 33. FIG. 35 is an enlarged perspective view that illustrates the bottom of the toner cartridge 502 partly. FIG. 36 is a perspective view of a first shutter 622 of a shutter assembly 602 provided to the toner cartridge 502. FIG. 37A is a front view of a second shutter 632 of the shutter assembly 602 as viewed from the top side, FIG. 37B is a perspective view of the second shutter 632 as viewed from the top side and the trailing side in the installation direction Z, and FIG. 37C is a perspective view of the second shutter 632 as viewed from the top side and the front side in the direction Z.

Figure 38:
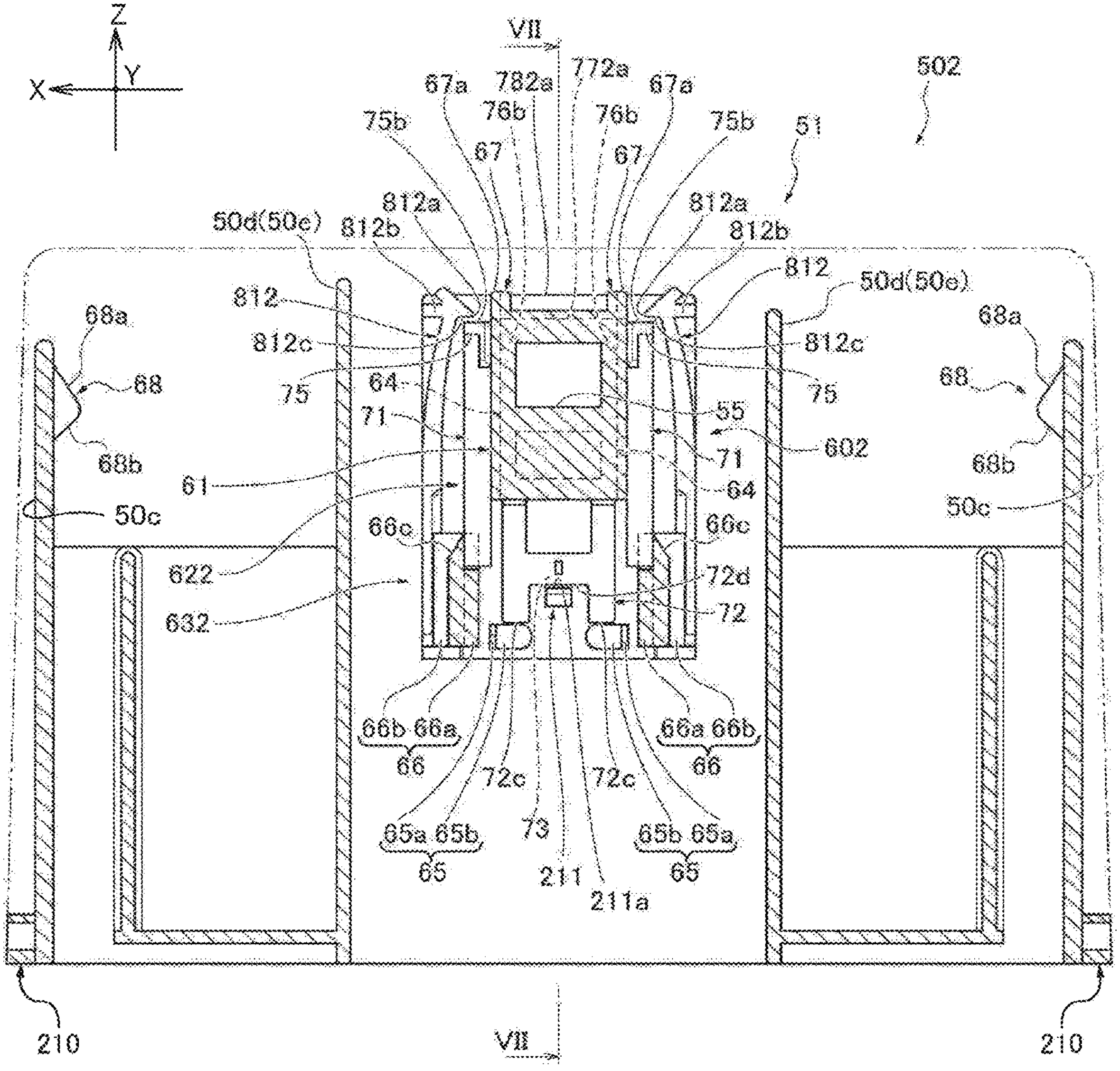
FIG. 38 is a view similar to FIG. 8 and illustrates the shutter assembly constructed of the first and second shutters mounted to the bottom face of the toner cartridge.
Figure 39:
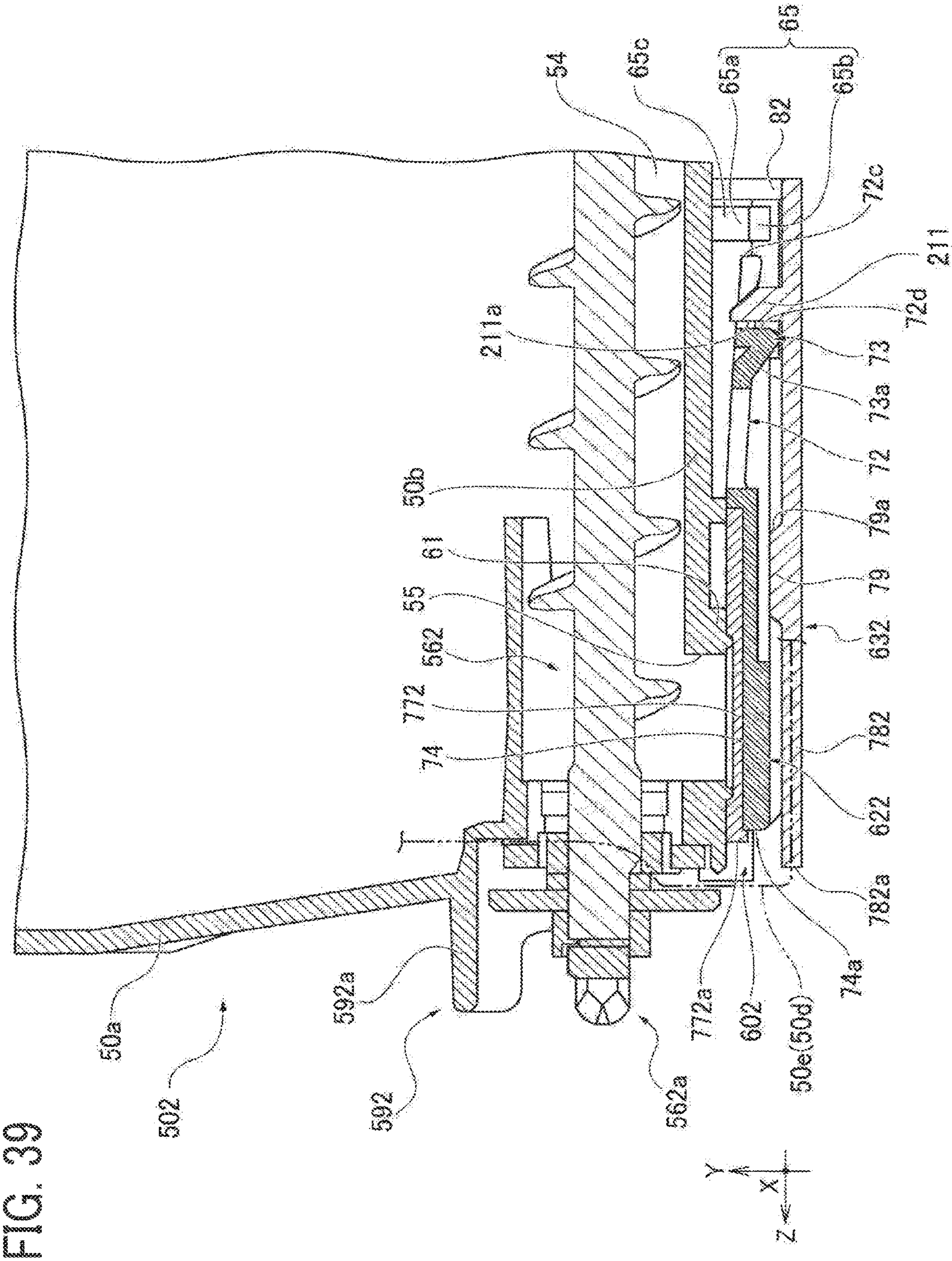
FIG. 39 is a cross-sectional view of the toner cartridge along line VII-VII (along the plane Y-Z) in FIG. 38.
Figure 40:
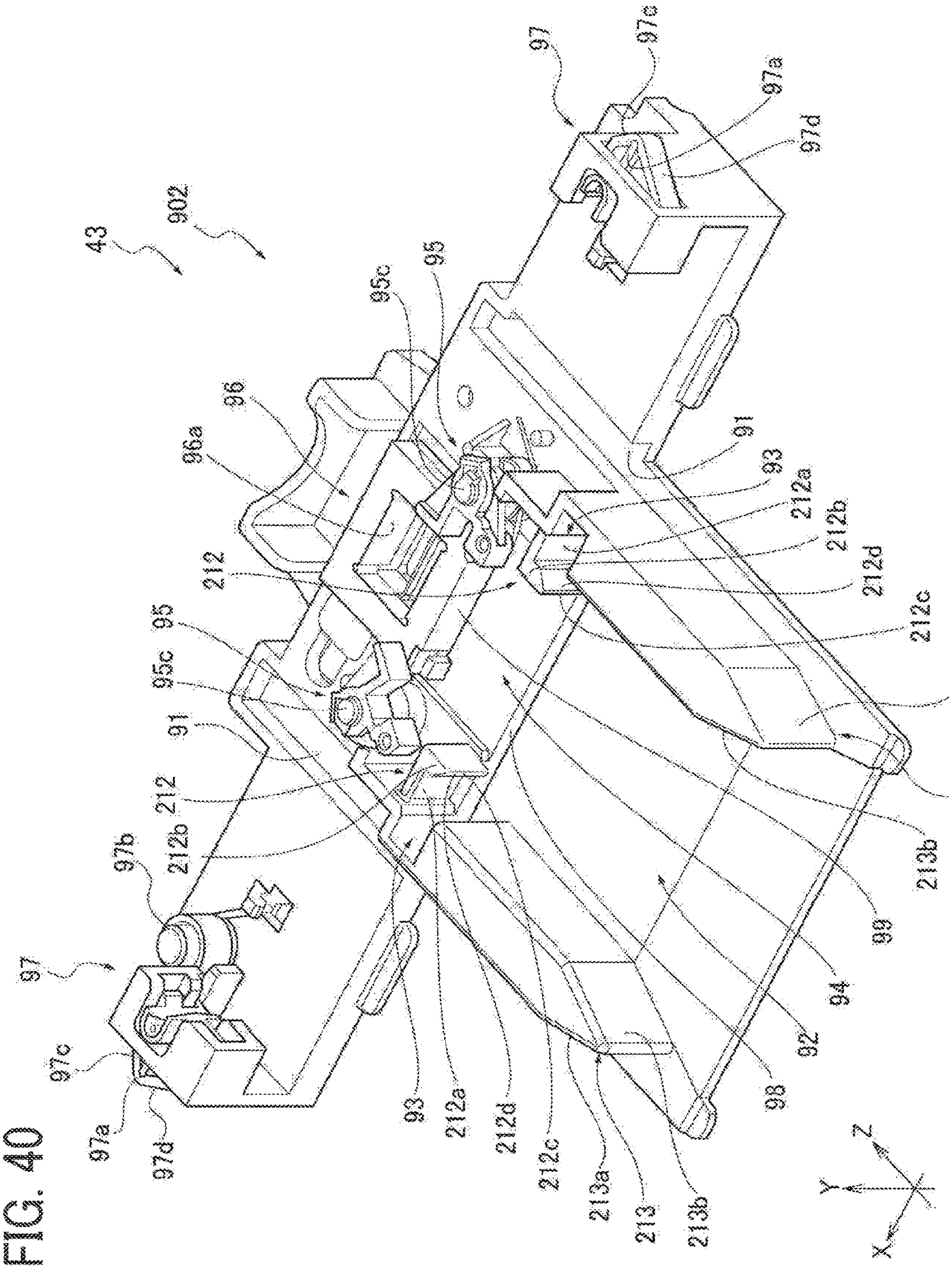
FIG. 40 is a perspective view of the cartridge mount of the toner supply device according to the second embodiment.
Figure 41:
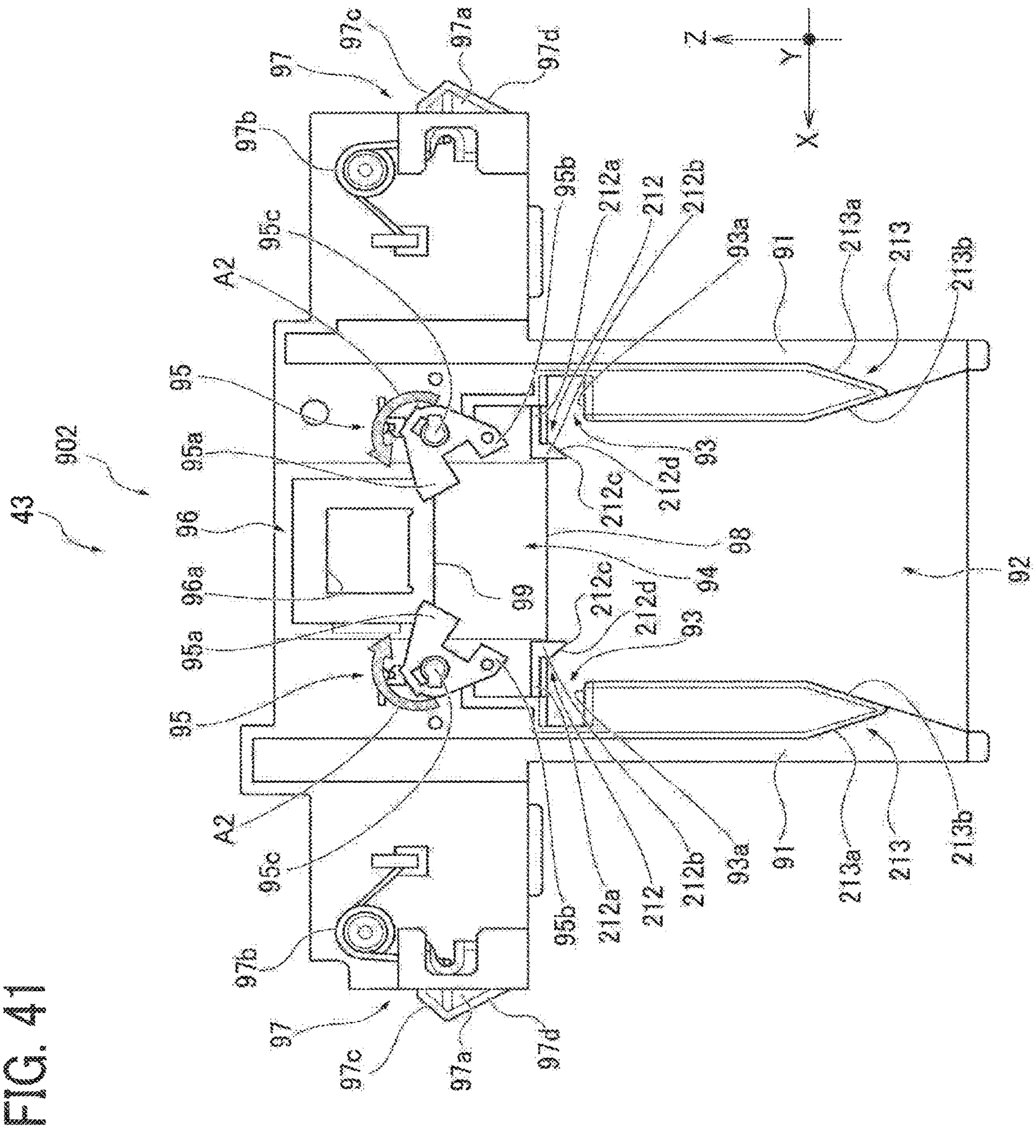
FIG. 41 is a front view of the cartridge mount as viewed from the top (positive side in the direction Y)
Figure 42:
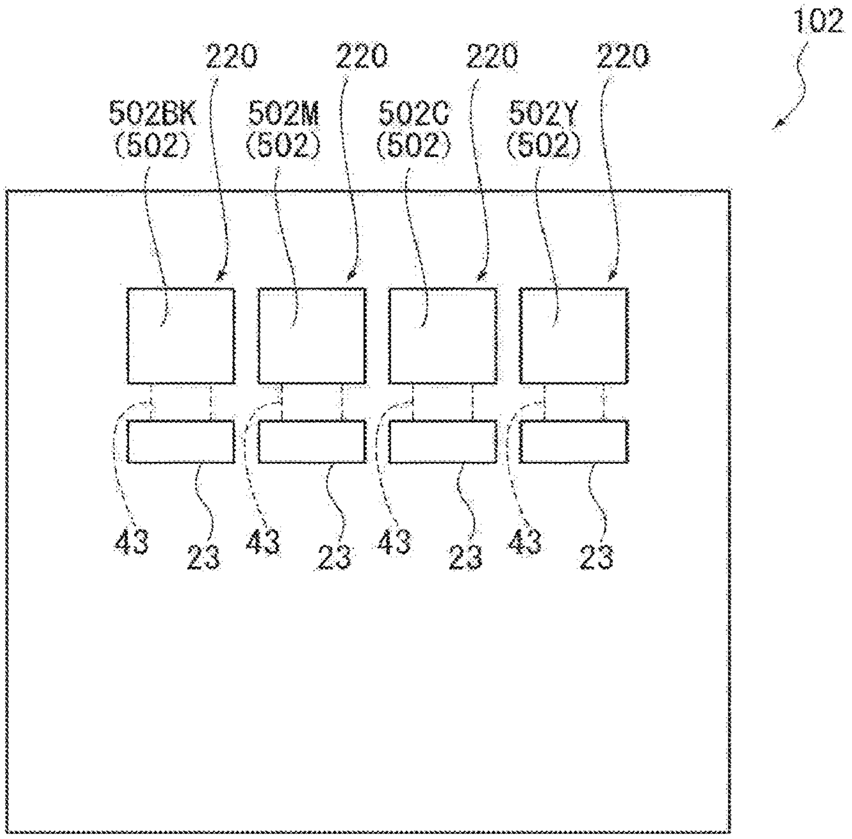
FIG. 42 is a schematic diagram illustrating a configuration of an image forming apparatus according to the second embodiment.
Figure 43A:
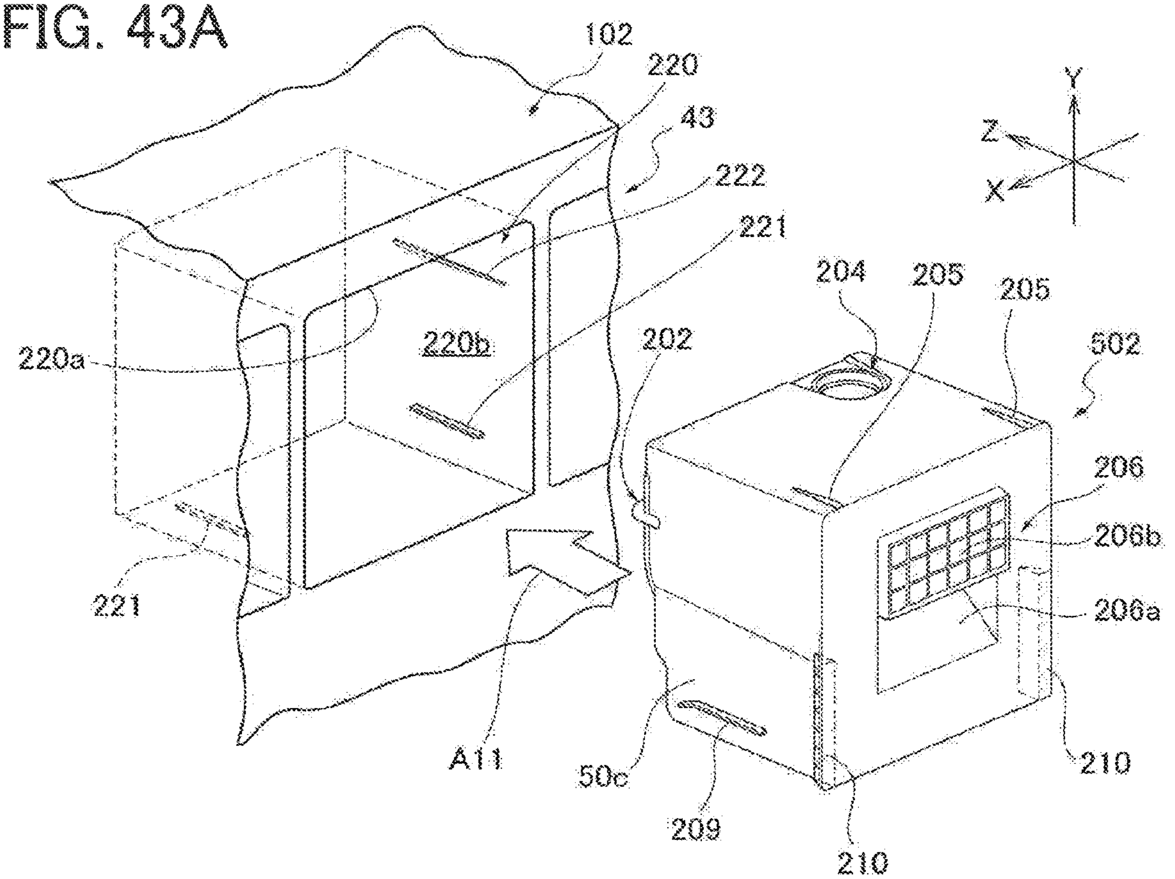
FIG. 43A is a perspective view illustrating installation of the toner cartridge into a cartridge frame in the image forming apparatus shown in FIG. 42.
Figure 43B:
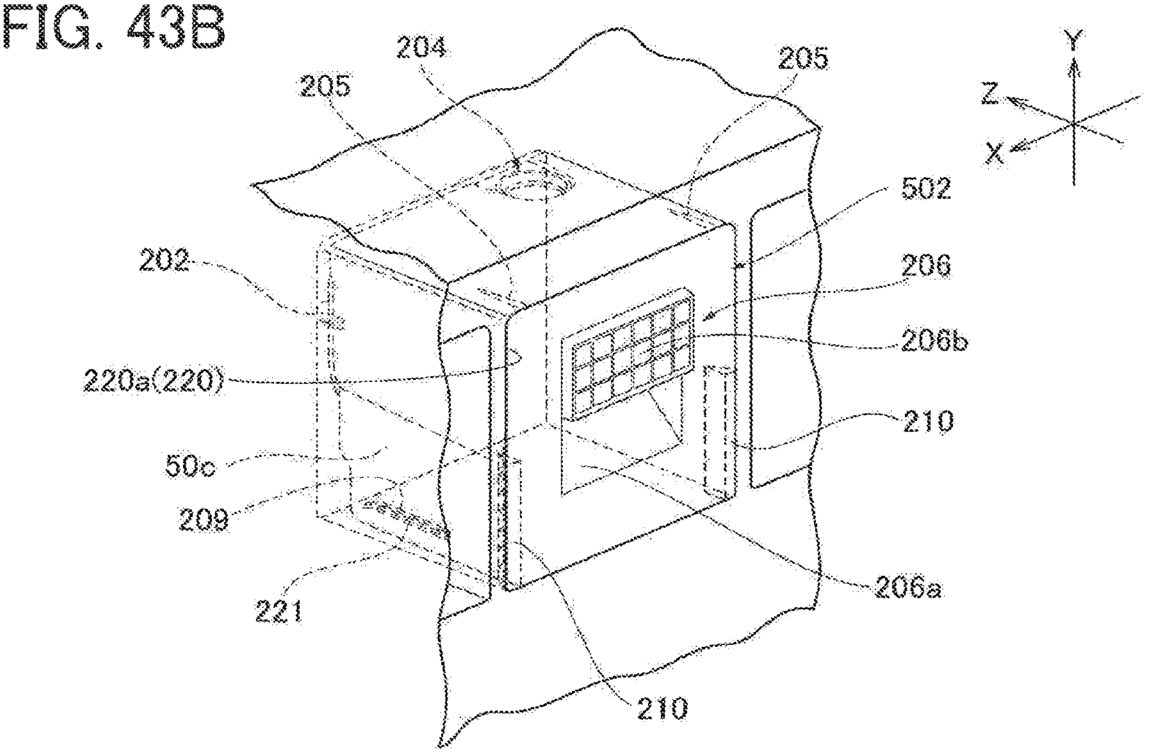
FIG. 43B illustrates the toner cartridge in the cartridge mount.
Figure 44:
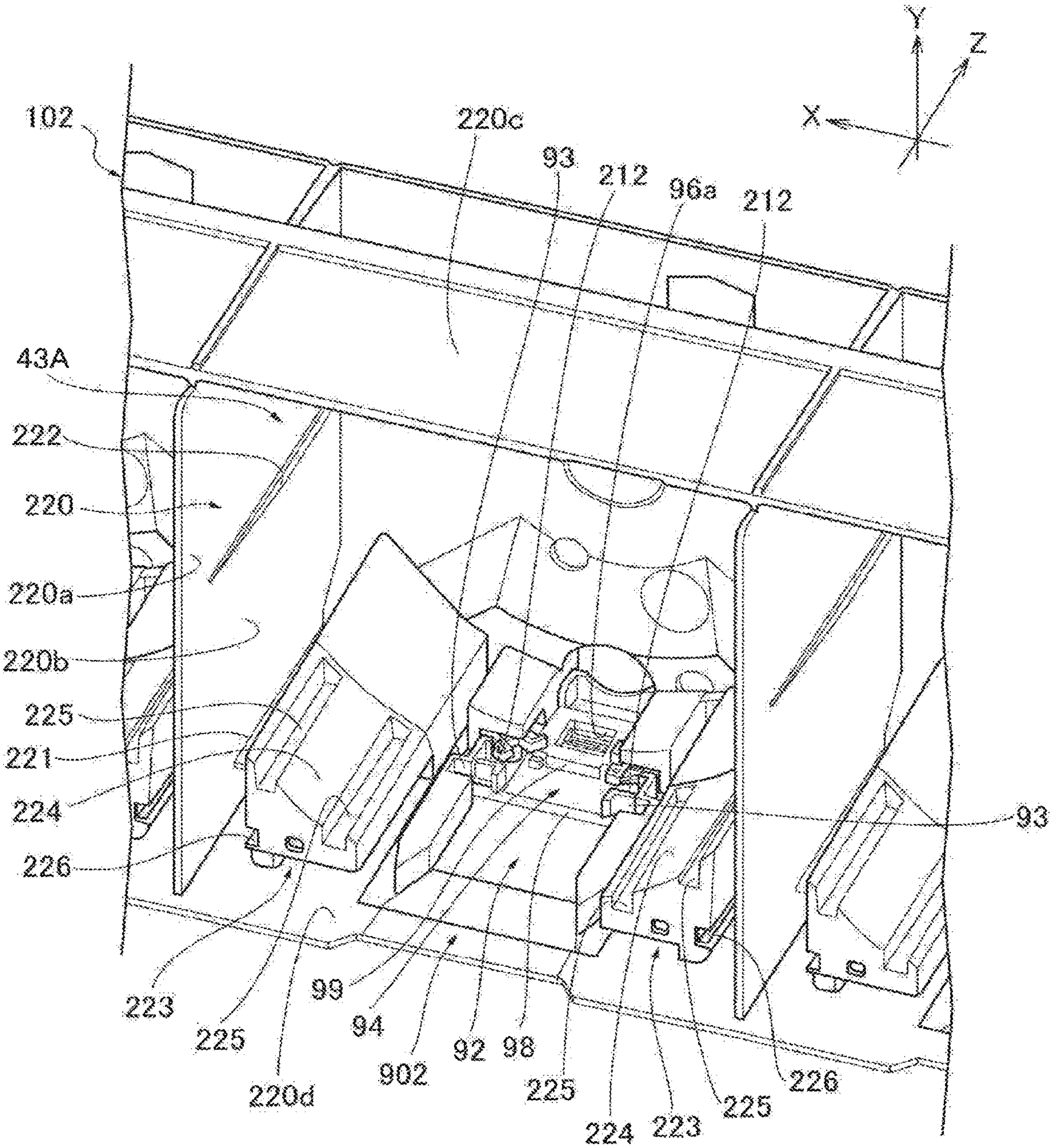
FIG. 44 is a perspective view of the cartridge frame of the image forming apparatus shown in FIG. 42.
Figure 45A:
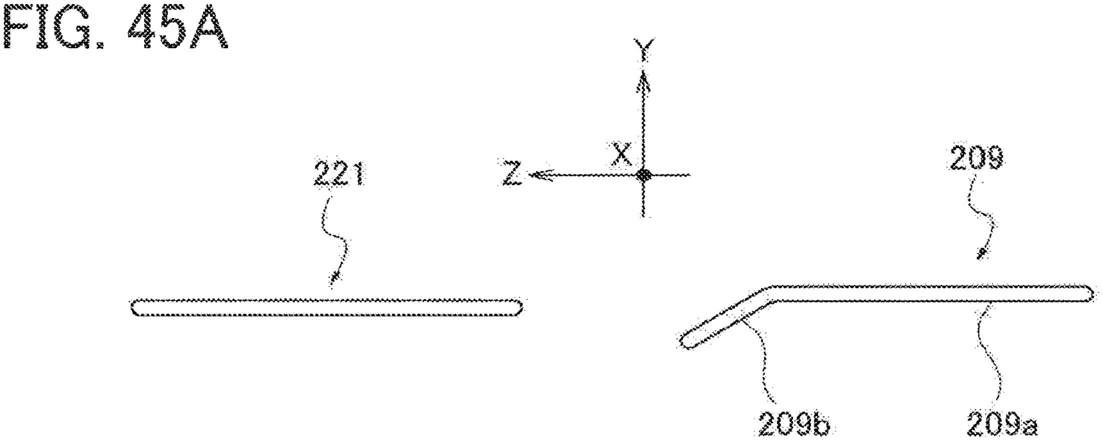
FIG. 45A illustrates a state in which a rail on a side wall of the toner cartridge faces a rail provided in the cartridge frame.
Figure 45B:
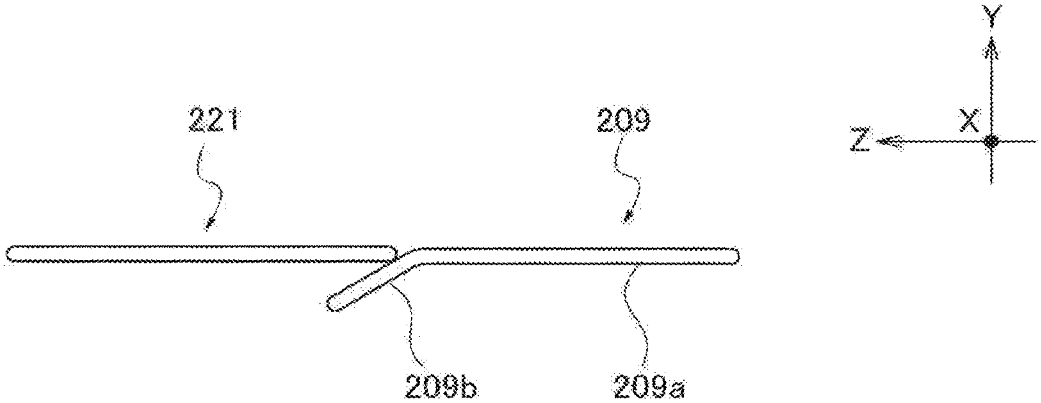
FIG. 45B illustrates the rails in contact with each other.
Figure 45C:
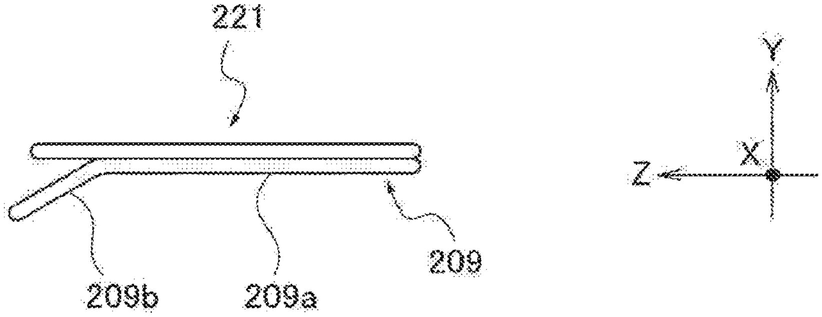
FIG. 45C illustrates the rails overlapping with each other in the direction Y.

FIG. 38 is a view similar to FIG. 8 and illustrates the shutter assembly 602 constructed of the first and second shutters 622 and 632 mounted to the bottom face of the developer chamber 51 of the toner cartridge 502. FIG. 39 is a cross-sectional view of the toner cartridge 502 along line VII-VII (along the plane Y-Z) in FIG. 38. FIG. 40 is a perspective view of the cartridge mount 902 of the toner supply device 43. FIG. 41 is a front view of the cartridge mount 90 as viewed from the top (positive side in the direction Y). FIG. 42 is a schematic view illustrating a configuration of the image forming apparatus 102. FIG. 43A is a perspective view illustrating installation of the toner cartridge 502 in the cartridge frame 220 of the image forming apparatus 102, and FIG. 43B illustrates the toner cartridge 502 in the cartridge frame 220. FIG. 44 is a perspective view of the cartridge frame 220 (cartridge mount 902) of the image forming apparatus 102. FIGS. 45A, 45B, and 45C illustrate actions of a rail 209 on the side wall 50*c* of the toner cartridge 502 and a rail 221 provided in the cartridge frame 220. Specifically, the rail 209 faces the rail 221 in the direction Z in FIG. 45A, and the rail 209 contacts the rail 221 in FIG. 45B. In FIG. 45C, the rail 209 and the rail 221 overlap in the direction Y.

In is to be noted that, in FIG. 30, configurations inside the developer chamber 51 of the toner cartridge 502 and configuration of the agitator 52 except the connected portion 522*a* are omitted. In FIG. 42, the development devices 23, the toner supply device 43, the cartridge frames 220, and the toner cartridges 502 installed therein are simplified, and other components are omitted. In FIGS. 43A and 43B, elements of the cartridge frame 220 and the cartridge mount 902 are emphasized and simplified, which are not necessarily conform to product configurations or other figures. It is to be noted that, in FIG. 44, reference character 220*c* represents an upper wall of the cartridge frame 220, and 220*c* represents a lower wall of the cartridge frame 220.

As shown in FIGS. 26 to 29, the toner cartridge 502 is box-shaped and includes the developer chamber 51 (shown in FIG. 30) similarly to the first embodiment. On the front end face 50*a* of the toner cartridge 502 (in particular, the developer chamber 51), first and second positioning recesses 201 and 202 and an air opening 203 are formed in addition to an electronic board 572 and a connection opening 582.

The electronic board 572 is similar to the electronic board 57 according to the first embodiment, and its exterior is covered with a cover 572*a*. The electronic board 572 can move along the plane X-Y inside the cover 572*a*. A positioning hole 572*b* is formed at a center position of the electronic board 572. Into the positioning hole 572*b*, a positioning protrusion provided to the cartridge frame 220 (shown in FIG. 44) of the toner supply device 43 can be inserted in the installation direction Z. The positioning protrusion is designed to fit the positioning hole 572*b* in the direction along the plane X-Y.

When the positioning protrusion provided on the cartridge frame 220 fits in the positioning hole 572*b*, the electronic board 572 is set at a predetermined position relative to a communication board provided to the cartridge frame 220 (the toner supply device 43) such that a proper contact state is secured between a contact terminal of the electronic board 572 and a contact terminal of the communication board. The proper contact state herein means that communication, that is, data transmission, between the communication board and the electronic board 572 via the contact terminals thereof can be secured. Thus, with the positioning protrusion fitted in the positioning hole 572*b* of the electronic board 572, the electronic board 572 can transmit and receive data to and from the image forming apparatus 102 (shown in FIG. 42) via the communication board of the toner supply device 43.

In the toner supply device 43, the positioning protrusion is positioned relative to a first positioning protrusion fitted in the first positioning recess 201, and the electronic board 572 can be set at the predetermined position when the toner cartridge 502 is mounted to the toner supply device 43 properly. That is, the position of the electronic board 572 (the positioning hole 572*b* in particular) relative to the toner cartridge 502 (the front end face 50*a* in particular) is determined with reference to the first positioning recess 201.

The electronic board 572 and the communication board according to the present embodiment may be incorporated in the toner cartridge 50 and the toner supply device 43 according to the first embodiment instead of the electronic board 57 and the antenna board. Similarly, the electronic board 57 and the antenna board according to the first embodiment may be incorporated in the toner cartridge 502 and the toner supply device 43 according to the second embodiment instead of the electronic board 572 and the communication board.

The connection opening 582 is similar to the connection opening 58 in the first embodiment and formed to expose the connected portion 522*a* of the agitator 52 from the front side (positive side in the direction Z) of the developer chamber 51. The connected portion 522*a* is described later in further detail. The connection opening 582 from which the connected portion 522*a* is exposed is rimmed with a protection wall 582*a*. The protection wall 582*a* projects from the front end face 50*a* of the toner cartridge 502 (the developer chamber 51 in particular) in the direction Z to surround the connected portion 522*a* from the side perpendicular to the installation direction Z. Thus, the protection wall 582*a* can inhibit access from the side perpendicular to the direction Z to the connected portion 522*a*, protecting the connected portion 522*a*.

The position of the connection opening 582 (or the connected portion 522*a* of the agitator 52 disposed therein) relative to the toner cartridge 502 (front end face 50*a*) is determined with reference to the first positioning recess 201. The configuration and effects of the protection wall 582*a* at the connection opening 582 can adapt to the connection opening 58 (shown in FIG. 4) in the first embodiment.

The first positioning recess 201 is surrounded by a first hollow cylinder 201*a* extending in the direction Z, provided on the front side of the toner cartridge 502 as shown in FIG. 30. The first hollow cylinder 201*a* projects from the front end face 50*a* outward and inward the developer chamber 51 in the direction Z. Thus, the first hollow cylinder 201*a* defines, as the first positioning recess 201, a cylindrical space that extends in the installation direction Z and is circular in cross section perpendicular to the direction Z as shown in FIGS. 29 and 30.

The first hollow cylinder 201*a* is continuous with the inner face of the developer chamber 51 (that is, the toner cartridge 502). Specifically, the portion of the first hollow cylinder 201*a* inside the developer chamber 51, entirely as viewed in the direction Z, is continuous with the inner face of the developer chamber 51. The first hollow cylinder 201*a* includes an inclined face 201*b* at the positive end in the direction Z. The inclined face 201*b* is inclined such that the inner diameter of the space inside the first hollow cylinder 201*a* increases as the position in the direction Z moves to the positive side.

Into the first positioning recess 201, a first positioning protrusion provided to the cartridge frame 220 (shown in FIG. 44) of the toner supply device 43 can be inserted in the installation direction Z. The first positioning protrusion is cylindrical, long in the direction Z, and designed to confirm to the first positioning recess 201 in the direction along the plane X-Y. With the first positioning protrusion fitted in the first positioning recess 201, the direction X defined in the toner cartridge 502 can be aligned with the direction Z defined inside the cartridge frame 220. The inclined face 201*b* of the first positioning recess 201 can facilitate insertion of the first positioning protrusion into the first positioning recess 201.

The second positioning recess 202 is surrounded by a second hollow cylinder 202*a* extending in the direction Z, provided on the front side of the toner cartridge 502. The second hollow cylinder 202*a* is positioned on the opposite side of the first hollow cylinder 201*a* in the lateral direction in FIG. 28 (direction X). The second hollow cylinder 202*a* projects from the front end face 50*a* outward and inward the developer chamber 51 in the direction Z.

Referring to FIG. 29, reference character Ls represents a segment Ls that connects a center of the second hollow cylinder 202*a* and a center of the first hollow cylinder 201*a* on a cross section perpendicular to the direction Z. The second hollow cylinder 202*a* is long in the direction of segment Ls, semicircular at both ends in the direction of segment Ls, extending in that direction. That is, the second positioning recess 202 is a slot extending in that direction on the cross section perpendicular to the direction Z.

The second hollow cylinder 202*a* is continuous with the inner face of the developer chamber 51 on the side opposite the first hollow cylinder 201*a* in the lateral direction in FIG. 29. Specifically, the portion of the second hollow cylinder 202*a* inside the developer chamber 51, entirely as viewed in the direction Z, is continuous with the inner face of the developer chamber 51. The second hollow cylinder 202*a* includes an inclined face 202*b* at the positive end in the direction Z. The inclined face 202*b* is inclined such that the inner diameter of the space inside the second hollow cylinder 202*a* increases as the position in the direction Z moves to the positive side.

Into the second positioning recess 202, a second positioning protrusion provided to the cartridge frame 220 (shown in FIG. 44) of the toner supply device 43 can be inserted in the installation direction Z. The second positioning protrusion is cylindrical, long in the direction Z, and designed to confirm to the second positioning recess 202 in the direction along the plane X-Y and perpendicular to the direction of segment Ls shown in FIG. 29. In other words, the second positioning protrusion can move in the direction of segment Ls inside the second positioning recess 202.

With this configuration, the second positioning recess 202 can receive the second positioning protrusion, absorbing differences between the distance between the first and second positioning recesses 201 and 202 and the distance between the first and the second positioning protrusions of the cartridge frame 220. Accordingly, with the first positioning protrusion fitted in the first positioning recess 201 and the second positioning protrusion fitted in the second positioning recess 202, the toner cartridge 502 can be set at a proper posture relative to the cartridge frame 220 of the toner supply device 43. The inclined face 202*b* of the second positioning recess 202 can facilitate insertion of the second positioning protrusion into the second positioning recess 202.

Configurations of the first and second positioning recesses 201 and 202 can adapt to the toner cartridge 50 according to the first embodiment. It is to be noted that the configurations of the first and second positioning recesses 201 and 202 are not limited to those of the second embodiment as long as the toner cartridge 502 can be set at a proper posture relative to the cartridge frame 220. For example, the relative positions thereof can be different from those described above, or the second positioning recess 202 is not necessarily shaped like a slot.

Referring to FIGS. 26 through 29, the ventilation section 203 is disposed on the front side of the toner cartridge 502, adjacent to the upper end (on the positive side in the direction Y). The ventilation section 203 includes an air vent 203*a* penetrating the front end face 50*a* of the toner cartridge 502, and a filter 203*b* provided at the front end of the ventilation section 203 (positive side in the direction Z). The air vent 203*a* is disposed not to be covered with or buried in developer when the developer chamber 51 contains a sufficient amount of developer (such as at the shipment). The air vent 203*a* is thus positioned assuming that the positive side of the toner cartridge 502 in the direction Y is on the top in the vertical direction. The filter 203*b* blocks passage of developer from the developer chamber 51 and allows passage of air. Thus, the ventilation section 203 can prevent leakage of developer from the developer chamber 51, supply external air to the developer chamber 51, and exhaust air therefrom. It is to be noted that the position of the air vent 203*a* is not limited to the above-described position as long as air vent 203*a* is above the level of developer sufficiently contained. For example, the air vent 203*a* can be formed in the upper face of the toner cartridge 502.

Similarly to the first embodiment, the discharge channel 54 (shown in FIGS. 3 and 9) is formed in the bottom portion of the developer chamber 51. The discharge channel 54 is continuous with a screw junction section 592 that is open on the front side. Similarly to the first embodiment, a connected portion 562*a* of the conveyance screw 56, rotatably provided in the discharge channel 54, is exposed on the front side of the developer chamber 51, and the connected portion 56*a* is shielded by a canopy 59*a* from above. A left end of the canopy 592*a* in FIG. 28 is cut away. Thus, the canopy 592*a* can inhibit access to the connected portion 562*a* of the conveyance screw 56 from the side perpendicular to the direction Z and right side in FIG. 28, protecting the connected portion 562*a*. The position of the opening 592 (or the connected portion 562*a* of the conveyance screw 56 disposed therein) relative to the toner cartridge 502 (front end face 50*a*) is determined with reference to the first positioning recess 201. Since the end portion of the canopy 592*a* is cut away, a gear train of the drive unit (such as the agitator drive coupling 301) provided to the cartridge frame 220 can be adjacent to the connected portion 562*a* of the conveyance screw 56 when the toner cartridge 502 is mounted in the cartridge frame 220. In other words, the cutaway of the canopy 592*a* can enhance flexibility in layout of the drive unit in the cartridge frame 220.

In the second embodiment, the connected portion 562*a* has a configuration similar to that of the connected portion 522*a* of the agitator 52. Thus, configuration and operation of only the connected portion 522*a* are described, and those of the connected portion 562*a* are omitted. Referring to FIGS. 31A through 32E, the connected portion 522*a* has the pair of projections 522*b*. The projections 522*b* are in pair relative to the axis of the agitator 52. The projecting ends 522*c* (on the positive side in the direction Z) of the projections 522*b* are inclined to the negative side in the direction Z as the projecting ends 522*c* approach each other. The inclined faces 522*d* are provided to the projecting end 522*c* as a pair in the circumferential direction that centers about the axis of the agitator 52. The inclined face 522*d* is inclined to the negative side in the direction Z as the position in the projecting end 522*c* moves outward in the circumferential direction.

Referring to FIG. 32D, the connected portion 522*a* is connected to the agitator drive coupling 301 provided to the cartridge frame 220 (shown in FIG. 44) of the toner supply device 43. The agitator drive coupling 301 has a configuration similar to that of the screw drive coupling to which the connected portion 562*a* of the conveyance screw 56 is connected. Similarly to the connected portion 522*a*, the agitator drive coupling 301 includes the pair of projections 301*a* symmetrical relative to a center axis Ca (axis of the agitator 52) of the agitator drive coupling 301. The agitator drive coupling 301 can rotate around the center axis inside the cartridge frame 220 as the pair of projections 301*a* receives a drive force from the drive unit. Additionally, play of the agitator drive coupling 301 in the direction of rotation around the center axis Ca in the cartridge frame 220 is allowed when the agitator drive coupling 301 is given no drive force. Therefore the agitator drive coupling 301 (the projections 301*a*) can rotate slightly in response to an external force.

The projecting ends 301*b* of the projections 301*a* are inclined to the negative side in the direction Z as the projecting ends 301*a* approach each other. When the axis of the agitator 52 is aligned with the center axis Ca and the agitator drive coupling 301 faces the connected portion 522*a*, the projecting ends 301*b* of the projections 301*a* are parallel to the projecting ends 522*c* of the projections 522*b* in the direction of the center axis Ca as shown in FIG. 32A. As the agitator drive coupling 301 approaches the connected portion 522*a* from the position shown in FIG. 32A, the projecting ends 301*b* contact the projecting ends 522*c*, and the pair of projecting ends 301*b* and the pair of projecting ends 522*c* cause a force for guiding the projections 301*a* are guided inside the projections 522*b*. This configuration can keep the agitator drive coupling 301 and the connected portion 522*a* of the agitator 52 free from a force to disturb the alignment between the center axis Ca and the axis of the connected portion 522*a* even when the projection 301*a* (the projecting end 301*b*) contacts the projection 522*b* (the projecting end 522*c*) as described above.

Referring to FIG. 32B, the inclined faces 301*c* are provided to the projecting end 301*b* as a pair in the circumferential direction that centers about the axis of the center axis Ca. Each inclined face 301*c* is inclined to the positive side in the direction Z as the position in the projecting end 301*b* moves outward in the circumferential direction. In the second embodiment, the inclined face 301*c* is identical or similar in inclination to the inclined face 522*d* at the projecting end 522*c* of the projection 522*b*.

With this configuration, when the center axis Ca is aligned with the axis of the agitator 52 and the projecting ends 301*b* of the agitator drive coupling 301 contact the projecting ends 522*c* of the connected portion 522*a* as shown in FIG. 32C, the inclined face 301*c* at the projecting end 301*b* on one side in the circumferential direction (i.e., rotational direction) contacts the inclined face 522*d* at the projecting end 522*c* on the other side.

As described above, the agitator drive coupling 301 can rotate around the center axis Ca when no drive force is given thereto. Therefore, as the projecting end 301*b* approaches the projecting end 522*c* further, the agitator drive coupling 301 can approaches the connected portion 522*a* while rotating as indicated by arrow A10 in FIG. 32C, guided by the inclined face 301*c* and the inclined face 522*d*. Thus, the agitator drive coupling 301 and the connected portion 522*a* can be prevented from the state in which the projecting end 301*b* interferes with the projecting end 522*c*.

Then, referring to FIG. 32D, in the circumferential direction around the center axis Ca, the relative positions of the agitator drive coupling 301 and the connected portion 522*a* are such that the projections 301*a* alternate with the projections 522*b*. When the agitator drive coupling 301 of the cartridge frame 220 is driven in this state, the projection 301*a* pushes the corresponding projection 522*b* in the direction of rotation, and thus the agitator 52 of the toner cartridge 502 rotates. Thus, in the state in which the projections 301*a* alternate with the projections 522*b* in the circumferential direction, the agitator drive coupling 301 is connected to the connected portion 522*a* of the agitator 52.

Referring to FIGS. 26, 27, 33, and 34, a loading section 204 and a pair of clamping pieces 205 are formed on the upper face (on the positive side in the direction Y) of the toner cartridge 502. In the loading section 204, a cap 204*a* is provided to cover an inlet that penetrates the upper wall, defining the upper face of the toner cartridge 502, and communicates with the developer chamber 51. Developer is poured through the inlet of the loading section 204 into the developer chamber 51. The cap 204*a* can prevent leakage of developer from the inlet.

The clamping pieces 205 are provided in pair adjacent to the rear side (on the negative side in the direction Z) and adjacent to the outer sides in the direction X (lateral side in FIG. 29), on the upper face of the toner cartridge 502. The pair of clamping pieces 205 projects from the upper face of the toner cartridge 502 in the direction Y, and the projecting amount progressively increases toward the negative side in the direction Z.

Additionally, as shown in FIGS. 33 and 34, a handle 206 is provided on the rear side (negative side in the direction Z) of the toner cartridge 502. A center portion of the rear wall defining the rear face of the toner cartridge 502 is recessed in the direction Z, forming a recess 206*a* of the handle 206, and a handle wall 206*b* covers the recess 206*a*. The handle wall 206*b* is provided with a grid-shaped rib 206*c* to secure rigidity. The handle 206 makes it easier for users to hold the toner cartridge 502 by gripping the handle wall 206*b* with his or her hand inserted in the recess 206*a*.

Referring to FIG. 35, the shutter mount 61, shaped like a rectangular parallelepiped, is provided to the periphery of the outlet 55, projecting from the lower wall 50*b* in the direction Y. Similarly to the first embodiment, the first and second shutters 622 and 632 are provided to the shutter mount 61 slidably in the direction Z, thus together forming the shutter assembly 602 (refer to FIG. 38). The end faces of the shutter mount 61 in the direction X are recessed inward in the direction X, forming the pair of guide grooves 64 that extends in the direction Z. The pair of guide grooves 64 creates a pair of side pieces 64*a* (shown in FIG. 35) projecting outward in the direction X. In other words, the pair of side pieces 64*a* defines the pair of guide grooves 64 in the shutter mount 61.

On the lower wall 50*b*, similarly to the first embodiment, the pair of retaining projections 65, the pair of support projections 66, and the pair of releasing projections 67 are provided. Referring to FIGS. 28 and 29, further contact plates 207 and discrimination projections 208 are provided to the lower wall 50*b*. Similarly to the first embodiment, each retaining projection 65 includes the base end 65*a* and the pressed portion 65*b*, and the channel 65*c* is defined between the lower wall 50*b* and the pressed portions 65*b*.

Similarly, each support projection 66 includes the base end 66*a* and the planar portion 66*b*, and the inclined wall 66*c* is formed at the end of the base end 66*a*. The end of the planar portion 66*b* on the positive side in the direction Z partly projects to the positive side in the direction Y, forming a stopper 66*d*. The releasing projections 67 are at the positive end of the shutter mount 61 in the direction Z, projecting in the direction Z, and the end faces 67*a* on the positive side in the direction Z are present on an identical plane in parallel to the plane X-Y. The releasing projections 67 are positioned above the pair of guide grooves 64.

As shown in FIGS. 28 and 29, the contact plates 207 project from the lower wall 50*b* in a direction perpendicular to the curved face of the lower wall 50*b*. The contact plates 207 are strip shaped and extend in the direction Z. The contact plates 207 are designed to slide on a holding face 224 as shown in FIG. 44) of the cartridge frame 220 of the toner supply device 43. The height (or projecting amount) and position of the contact plates 207 are designed prevent contact between the lower wall 50*b* and the holding face 224 while the contact plates 207 is in contact with the holding face 224.

The discrimination projections 208 are planar and project downward from the lower wall 50*b* (to the negative side in the direction Y). The discrimination projections 208 are provided to prevent the toner cartridge 502 from being mounted to the cartridge frame 220 for the color different from the color of developer (i.e., toner) contained in that toner cartridge 502. The discrimination projections 208 are different in number and arrangement depending on the color of developer contained therein.

In the configuration shown in FIG. 29, the number of the discrimination projections 208 is two on either lateral side, that is, four in total. The discrimination projections 208 match, in number and arrangement, discrimination grooves 225 (shown in FIG. 44) formed in accordance with the color of developer in the cartridge frame 220. Thus, the discrimination projections 208 and the discrimination grooves 225 together prevent the toner cartridge 502 from being mounted to the cartridge frame 220 (the cartridge mount 902) of wrong color while allowing the toner cartridge 502 to be mounted to the cartridge frame 220 of the color of developer contained in that toner cartridge 502.

In the lateral direction, the discrimination projections 208 are disposed on both sides of the shutter mount 61 and enclosed by the side walls 50*c*, the guide walls 50*d*, and bottom walls 50*f* (shown in FIGS. 28 and 29). Specifically, on the plane X-Y (in FIG. 29), the lower wall 50*b*, the side walls 50*c*, the guide walls 50*d*, and the bottom walls 50*f* are present on the upper side, lateral outsides, lateral insides, and lower side of the discrimination projections 208, respectively. The rear wall defining the rear face (back end) of the toner cartridge 502 is provided at the rear end of the lower wall 50*b* (on the negative side in the direction Z).

With this configuration, the access to the discrimination projections 208 from other sides than the front side is blocked, securing protection of the discrimination projections 208. This configuration can secure the effects of the discrimination projections 208 preventing installation error of the toner cartridge 502 while allowing installation of the toner cartridge 502 in the cartridge frame 220 of the color of developer contained in that toner cartridge 502.

Additionally, referring to FIGS. 26 and 27, the pair of rails 209 is provided to the side wall 50*c* to which the retention releasing piece 68 is provided similarly to the first embodiment. Each rail 209 is shaped like a plate projecting from the side wall 50*c* outward in the lateral direction (direction X) and includes a rail body 209*a* and an inclined entry assist 209*b*. The rail body 209*a* extends in the direction Z and along the side wall 50*c*. The inclined entry assist 209*b* is continuous with the front end of the rail body 209*a* in the direction Z and inclined to the negative side in the direction Y as the position moves to the positive side in the direction Z.

Additionally, a raised rear section 210 is provided at the rear end of each side wall 50*c* (on the negative side in the direction Z). The raised rear section 210 includes a rear end extension 210*a*, a vertical rib 210*b*, and multiple horizontal ribs 210*c*. Referring to FIGS. 33 and 34, the rear end extension 210*a* is planar and projects outward in the direction X so that the rear end of the toner cartridge 502 is shaped square or substantially square although the developer chamber 51 progressively decreases in size toward the bottom (outward). The rear end extension 210*a* is designed to fit in an opening 220*a* (shown in FIGS. 43A and 43B) of the cartridge frame 220 to fill or substantially fill in clearance, together with the rear end of the toner cartridge 502.

The vertical rib 210*b* is positioned on the front side of the rear end extension 210*a*, in parallel to the rear end extension 210*a*, and shaped like a plate projecting outward in the direction X from the side wall 50*c*. The multiple horizontal ribs 210*c* extend between the rear end extension 210*a* and the vertical rib 210*b*. With this configuration, the weight and the material of the raised rear section 210 can be limited while securing the rigidity of the rear end extension 210*a* by the vertical rib 210*b* and the horizontal ribs 210*c*.

The toner cartridge 502 further includes the pair of guide walls 50*d* similarly to the first embodiment. Additionally, the front end (positive end in the direction Z) of the guide walls 50*d* on the right in FIG. 35 is partly projects in the direction Z, forming a shutter protector 50*e*. Referring to FIG. 39, the shutter protector 50*e* projects beyond the first and second shutters 622 and 632 in the direction Z when the first and second shutters 622 and 632 are slidably mounted to the shutter mount 61. If an unintended object is present on the positive side in the installation direction Z while the toner cartridge 502 is inserted in that direction, the shutter protector 50*e* can contact the object before the first and second shutters 622 and 632, thereby preventing the first and second shutters 622 and 632 from being pushed to the negative side in the direction Z relatively. Thus, the first and second shutters 622 and 632 can be protected. The configuration and effects of the shutter protector 50*e* can adapt to the guide walls 50*d* in the first embodiment.

In the toner cartridge 502 according to the second embodiment, as shown in FIGS. 28, 29, and 35, the bottom walls 50*f* are provided at the lower end (on the negative side in the direction Y), on both sides of the shutter mount 61 in the direction X. On the negative side in the direction Z, each bottom wall 50*f* extends between the side wall 50*c* and the guide wall 50*d* in the direction X, connecting them together. A bottom support piece 214 is provided to each bottom wall 50*f*. The bottom support pieces 214 are provided in pair adjacent to the rear side (on the negative side in the direction Z) and adjacent to the outer sides in the direction X, on the respective bottom walls 50*f* The pair of bottom support pieces 214 projects from the bottom walls 50*f* to the negative side in the direction Y, and the projecting amount progressively increases toward the negative side in the direction Z. The first shutter 622 is mounted to the lower wall 50*b* to which the above-described elements are provided.

As shown in FIG. 36, similarly to the first shutter 62 of the first embodiment, the first shutter 622 is planar entirely and includes the pair of side walls 71, the retained piece 72, the pressed projection 73 pressed to cancel retention, the mount 74, the pair of engaging portions 75, and the pair of guide walls 76. The cutout 71*a* is formed in each side wall 71. The length of the cutout 71*a* is such that the front end of the side wall 71 is open whereas the rear end of the side wall 71 is not open. Accordingly, at the rear end of the side wall 71, a projection 71*b* for disengagement prevention projects to the negative side in the direction Y relative to the cutout 71*a*. This configuration can be similar in the first shutter 62 in the first embodiment.

Similarly to the first embodiment, the retained piece 72 includes the base end 72*a* and the body 72*b*, and the legs 72*c* are provided to the projecting end of the body 72*b*. The body 72*b* includes the pressed projection 73 to cancel retention of the first shutter 622 at the sealing position when being pressed in the direction Y.

The mount 74 is surrounded by the retained piece 72 and the pair of side walls 71, and a shutter seal 772 is provided in the mount 74. The shutter seal 772 is fitted in the mount 74 and fixed thereto. Being pressed against the shutter mount 61 around the outlet 55 formed in the lower wall 50*b*, the shutter seal 772 seals the outlet 55 to prevent developer from moving in and out from the toner cartridge 502 (refer to FIG. 39). An end 772*a* of the shutter seal 772 projects beyond the front end face 74*a* of the mount 74 in the direction Z. The shutter seal 772 in the second embodiment is constructed of an elastic material such as sponge. Being pressed by the shutter mount 61, the shutter seal 772 closely adheres to the periphery of the outlet 55 due to elastic deformation, sealing the outlet 55.

Each engaging portion 75 has configurations similar to those in the first embodiment and forms the hook face 75*a* parallel to the plane X-Y, on the negative side in the direction Z. Additionally, each engaging portion 75 forms a contact face 75*b* parallel to the plane X-Y, on the positive side in the direction Z. The configuration of the contact face 75*b* is similar in the first shutter 62 according to the first embodiment.

The guide walls 76 have configurations similar to those in the first embodiment and form the guide faces 76*a* parallel to the plane Y-Z, and the guide projection 76*b* formed on each guide face 76*a* is designed to movably fit in the guide groove 64 (shown in FIG. 35) formed in the shutter mount 61 of the lower wall 50*b*. Referring to FIG. 35, when the guide projection 76*b* is in the guide groove 64, the counterpart 64*a* (shown in FIG. 35) of walls defining the guide groove 64 can be sandwiched between the guide projection 76*b* and the shutter seal 772 being fit in the mount 74 in the direction Y.

As shown in FIG. 37, the second shutter 632 to cover the first shutter 622 has configurations similar to those of the second shutter 63 and includes a planar body 782, the pressing projection 79 for canceling retention of the first shutter 622, the side walls 80, the arms 812, and the regulating projections 82. The second shutter 632 further includes an auxiliary projection 211. The planar body 782 is shaped like a thin plate parallel to the plane X-Z and rectangular as a whole in the direction Y (on the plane X-Z). The front end face 782*a* of the planar body 78*s* on the positive side in the direction Z is flat, parallels the plane X-Y, and extends in the direction X.

The pressing projection 79 is provided on the planar body 782. The pressing projection 79 has configurations similar to those in the first embodiment and includes the inclined face 79*a* at the negative end in the direction Z. The planar body 782 further includes the pair of side walls 80. Similarly to the first embodiment, each side wall 80 includes the receiving recess 80*a* and the inclined face 80*b*.

Each arm 812 projects in the direction Z from the positive end in the direction Z of the corresponding side wall 80 similarly to the arms 81 in the first embodiment. Each arm 812 is shaped like a rod extending to the positive side in the direction Z, across a clearance from the planar body 782, and curved to reduce the distance between the arms 812 as the position moves in the direction Z. The arms 812 can movably receive the planar portion 66*b* (shown in FIG. 35) of the support projections 66 provided to the lower wall 50*b*. The planar portion 66*b* of the support projection 66 is received in the clearance between the arm 812 and the planar body 782 and further in the receiving recess 80*a* adjacent to the clearance in the direction Z.

Thus, the second shutter 632 can be mounted to the lower wall 50*b* movably. The first shutter 622 can be present between the arms 812. In a state in which the first and second shutters 622 and 632 are properly mounted to the lower wall 50*b* (refer to FIG. 38), the arms 812 interfere with the side walls 71 of the first shutter 622 as the first shutter 622 moves in the direction Z relative to the second shutter 632 (refer to FIG. 47).

The positive end portion of each arm 812 in the direction Z projects inward in the direction X, forming an edge 812*a* that is sharp as viewed in the direction Y. The distance between the edges 812*a* facing each other is shorter than a width (clearance between the side walls 71 in the direction X) of the first shutter 622. A hook piece 812*b* is provided adjacent to the edge 812*a*. The hook piece 812*b* projects outward in the direction X from the arm 812 (adjacent to the edge 812*a*), and a projecting end thereof (outer end in the direction X) is present on an identical plane as the outer face of the side wall 80 (at the position in the direction X identical to that of the projecting end). This state is referred to as an initial curved state of the arms 812. Similarly to the arms 81 of the first embodiment, the arms 812 are elastic and can deform in the direction X when a force in the direction X is applied thereto and revert to the initial curved state when the force is released.

In the initial curved state, a flat face 812*c* provided on the negative side of the edge 812*a* in the direction Z parallels to the plane X-Y. Therefore, in the state shown in FIG. 38, movement of the first shutter 622 in the direction Z relative to the second shutter 632 is inhibited since the flat face 812*c* adjacent the edge 812*a* hits or interfaces with the contact face 75*b*, which parallels to the plane X-Y, of the engaging portion 75 of the side wall 71 of the first shutter 622.

In each arm 812, the projection 812*d* positioned on the positive side of the hook piece 812*b* projects from a position adjacent to the edge 812*a* outward in the direction X and to the positive side in the direction Z, and an inclined face 812*e* is formed on the positive side in the direction Z. The inclined face 812*e* is inclined to the positive side in the direction Z as the position moves outward in the direction X. The planar body 782 further includes the pair of regulating projections 82 similarly to the first embodiment.

The auxiliary projection 211 is at or adjacent to the center position of the planar body 782 and on the negative side in the direction Z of the pressing projection 79 for retention release. The auxiliary projection 211 projects to the positive side in the direction Y from the planar body 782. On the positive side in the direction Z of the auxiliary projection 211 is a flat face 211*a* that is parallel to the plane X-Y. It is to be noted that reference character 72*d* in FIG. 36 represents a bridge that extends in the direction X between the parallel sides of the H-shaped retained piece 72 of the first shutter 622, and the size of the auxiliary projection 211 is designed such that the flat face 211*a* can contact the bridge 72*d* in the direction Z when the first and second shutters 622 and 632 are mounted to the lower wall 50*b* as shown in FIG. 38.

Similarly to the first embodiment, the shutter assembly 602 can be attached to the lower wall 50*b* of the toner cartridge 502 as shown in FIGS. 38 and 39. Specifically, the first shutter 622 is mounted to the shutter mount 61 on the lower wall 50*b* with the guide projections 76*b* of the pair of guide walls 76 thereof inserted into the pair of guide grooves 64 formed in the shutter mount 61. Then, the first shutter 622 is slidable between the sealing position and the open position in the direction Z relative to the lower wall 50*b*, being guided by the pair of guide grooves 64 and the guide projections 76*b* inserted therein.

In this state, the planar portions 66*b* (in particular, each inner face 66*e* shown in FIG. 35 inside the direction X) of the pair of support projections 66 of the lower wall 50*b* are received in the cutouts 71*a* formed in the side walls 71 of the first shutter 622. Accordingly, the projection 71*b* (shown in FIG. 36) at the negative end of the cutout 71*a* in the direction Z interferes, in the direction Z, with the stopper 66*d* (shown in FIG. 35) at the positive end of the planar portion 66*b* in the direction Z. Thus, the first shutter 622 can be prevented from disengaging from the lower wall 50*b* by moving in the direction Z relative to the lower wall 50*b*. The configurations of the projection 71*b* and the stopper 66*d* can adapt to the side walls 71 and the support projections 66 of the first embodiment.

The second shutter 632 can be attached to the lower wall 50*b* with the planar portions 66*b* of the pair of support projections 66 on the lower wall 50*b* received in the receiving recesses 80*a* formed in the pair of side walls 80. The second shutter 632 is slidable in the direction Z, relative to the lower wall 50*b*, between the open position and the shielding position via the releasing position relative to the first shutter 622, being guided by the receiving recesses 80*a* and the planar portions 66*b* inserted therein. As the second shutter 632 is moved in the direction Z relative to the first shutter 622, the auxiliary projection 211 (the flat face 211*a* in particular) of the second shutter 632 can mate with the body 72*b* (the bridge 72*d* in particular) of the first shutter 622. Accordingly, moving further in the direction Z, the second shutter 632 can cause the first shutter 622 to move from the open position to the sealing position. Thus, the movement of the second shutter 632 in the direction Z can set the first shutter 622 at the sealing position and seal the outlet 55 with the shutter seal 772.

The toner cartridge 502 is mounted to the toner supply device 43, to which the cartridge mount 902 (container mount) is provided to fit the configuration of the shutter assembly 602. Referring to FIGS. 40 and 41, the cartridge mount 902 is similar to the cartridge mount 90 of the first embodiment and includes the guide grooves 91, the first recess 94, the second recess 92, the retaining grooves 93, the pivotable pawls 95, the inlet rim 96 enclosing the developer inlet 96*a*, and the releasing members 97. The cartridge mount 902 further includes a pair of pushers 212 and a pair of auxiliary guides 213.

The guide grooves 91 are disposed in pair in the direction X to face and receive the guide walls 50*d* (shown in FIG. 46A) of the toner cartridge 502. The second recess 92 can receive the second shutter 632 movably in the direction Z. Each retaining groove 93 defines the wall 93*a* that parallels to the plane X-Y and positioned on the negative side in the direction Z. The retaining groove 93 is designed to accommodate the hook piece 812*b* (shown in FIG. 37) of the arm 812 of the second shutter 632. The first recess 94 is adjacent to the second recess 92 in the direction Z and designed to receive the first shutter 622 (refer to FIG. 48A) movably in the direction Z. The first recess 94 and the second recess 92 together form the second step 98 therebetween.

Each pawl 95 includes the first and second projections 95*a* and 95*b*. The end face of the first projection 95*a* can mate with the side face of the shutter mount 61, and the second projection 95*b* can be present on the back of the engaging portion 75 (on the negative side in the direction Z of the hook face 75*a*) of the side wall 71 of the first shutter 622 being attached to the toner cartridge 502 (refer to FIG. 48A). Each pawl 95 is pivotable about the shaft 95*c* and is biased as indicated by arrow A2 shown in FIG. 41 to the initial pivot position shown in FIGS. 40 and 41. When each pawl 95 is at the initial pivot position, the first projection 95*a* can contact the end face 67*a* of the releasing projections 67 of the shutter mount 612 in the direction Z as the toner cartridge 502 is mounted to the toner supply device 43.

The inlet rim 96 enclosing the developer inlet 96*a* is adjacent to the first recess 94 in the direction Z, and the developer inlet 96*a* communicates with the temporary reservoir 44 (shown in FIG. 3). The inlet rim 96 and the first recess 94 together form the first step 99 therebetween. The upper end face of the inlet rim 96 can contact the lower end face of the shutter mount 61 in which the outlet 55 is formed, w % ben the toner cartridge 502 is properly mounted to the toner supply device 43 similarly to the first embodiment. In this state, the outlet 55 faces the developer inlet 96*a* and is connected thereto in the direction Y.

In the releasing member 97, the elastic bias portion 97*b* applies a bias force to the claw 97*a* toward the initial projected position shown in FIGS. 40 and 41. The claw 97*a* forms the inclined front side 97*c* and the inclined rear side 97*d*. When no force is applied thereto, the claw 97*a* is at the initial projected position and can be pushed in against the force exerted by the elastic bias portion 97*b* to a position at which its end is inside the cartridge mount 902.

The pair of pushers 212 (shown in FIG. 40) is designed to shift the arms 812 outward in the direction X as the second shutter 632 enters the second recess 92. The pushers 212 are provided in pair in the direction X to correspond to the respective arms 812. Each pusher 212 includes a base 212*a* and a pusher body 212*b*. The base 212*a* is positioned at the positive end of the retaining groove 93 in the direction Z and projects inward in the direction X. The pusher body 212*b* projects from the end of the base 212*a* to the negative side in the direction Z. The position and size of the base 212*a* are designed not to hinder the hook piece 812*b* of the arm 812 entering the retaining groove 93 (refer to FIGS. 46A through 48B). A negative end in the direction Z of the pusher body 212*b* projects to the second recess 92 (hereinafter "projecting edge 212*c*"), and the projecting edge 212*c* is continuous with an inclined contact face 212*d*. The inclined contact face 212*d* is inclined to the positive side in the direction Z as the position moves outward in the direction X.

In the pusher 212, the pusher body 212*b* (the projecting edge 212*c* and the inclined contact face 212*d*) is at a height (position in the direction Y) identical or similar to the arm 812 (the projection 812*d* and the inclined face 812*e*) of the second shutter 632 disposed in the second recess 92. The pusher 212 is positioned such that the projecting edge 212*c* and the inclined contact face 212*d* of the pusher body 212*b* face, in the direction Z, the inclined face 812*e* of the projection 812*d* of the arm 812 of the second shutter 632 being at the initial curved state as shown in FIG. 46B. Additionally, the pusher 212 is positioned such that the projecting edge 212*c* and the inclined contact face 212*d* of the pusher body 212*b* can contact the projection 812*d* (i.e., the inclined face 812*e*) of the arm 812 before the second shutter 632 reaches the restriction position by the second step 98.

Figure 46A:
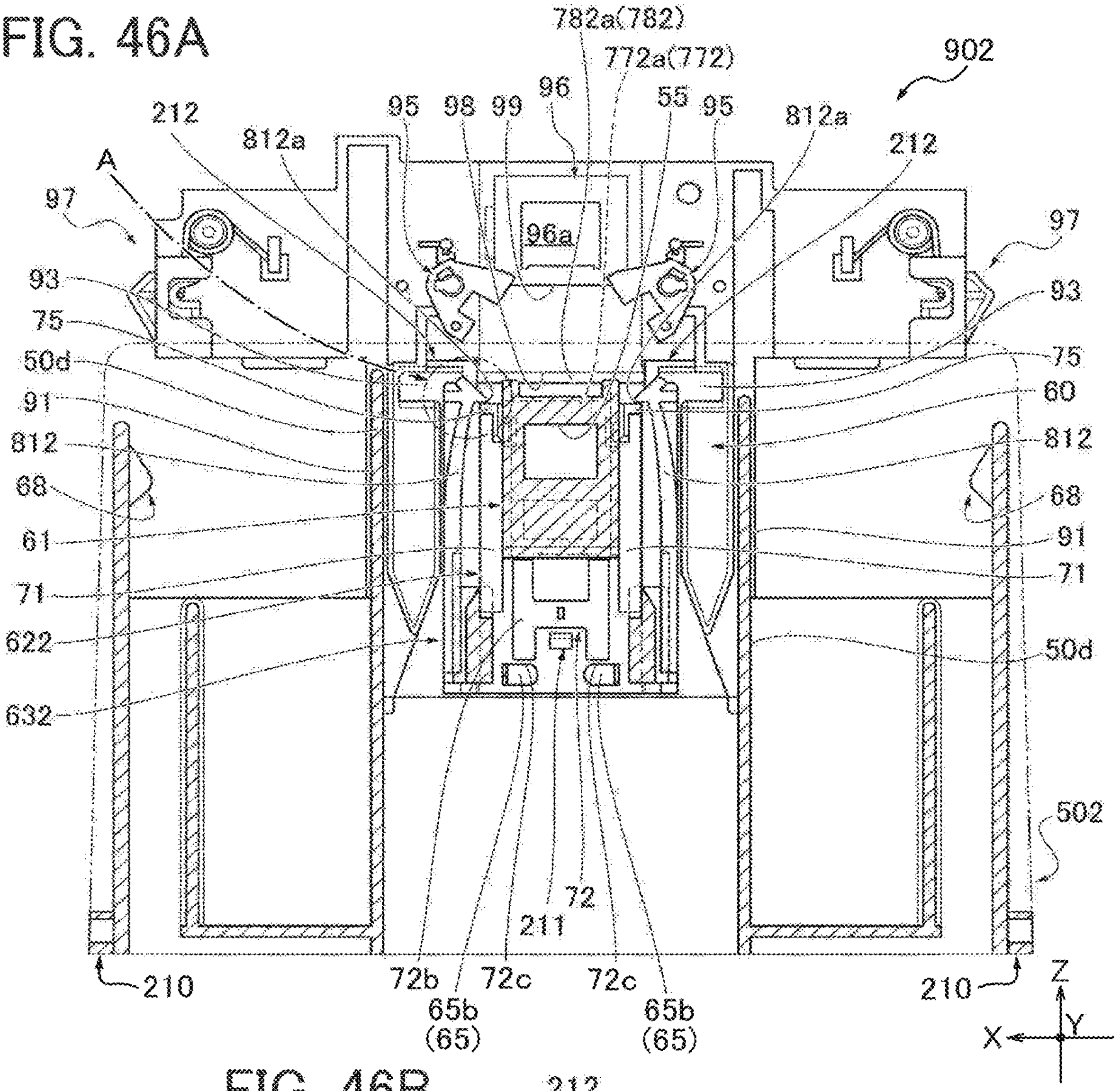
FIG. 46A is a cross-sectional view similar to FIGS. 38 and 41 and illustrates a state in which a body of each pusher provided to the cartridge frame contacts a projection of each curved arm of the second shutter.
Figure 46B:
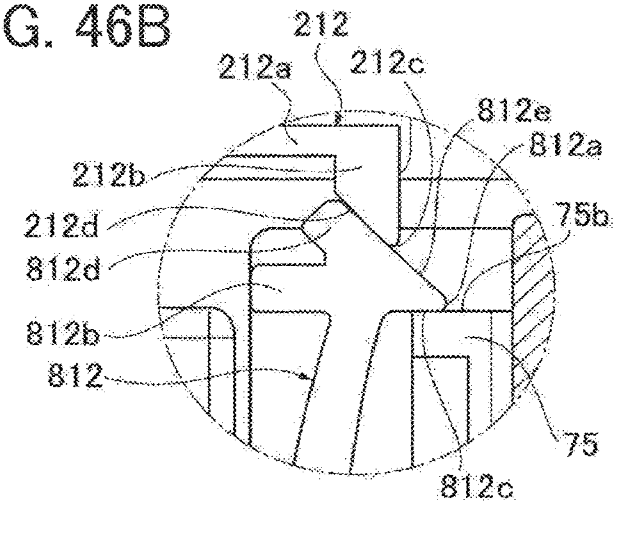
FIG. 46B is a partial enlarged view of FIG. 46A.

With this configuration, as the second shutter 632 enters the second recess 92, the pusher body 212*b* of the pusher 212 contacts the projection 812*d* of the arm 812 in the initial curved state (refer to FIGS. 46A and 46B). As the second shutter 632 moves further in the direction Z, due to the interaction between the inclined face 812*e* of the projection 812*d* and the projecting edge 212*c* and the inclined contact face 212*d* of the pusher body 212*b*, the pusher 212 shifts the hook piece 812*b* (its outer end in the direction X) of the arm 812 to the position outside the side wall 80 (its outer end), thereby causing the hook piece 812*b* to enter the retaining groove 93 (refer to FIGS. 47A and 47B).

The pair of auxiliary guides 213 is positioned at the negative end in the direction Z of a pair of walls each between the guide groove 91 and the second recess 92. The auxiliary guide 213 includes an inclined outer face 213*a* and an inclined inner face 213*b* in the direction X. The inclined outer faces 213*a* guides the pair of guide walls 50*d* of the toner cartridge 502 to the pair of guide grooves 91, facilitating insertion thereof into the guide grooves 91. The inclined inner faces 213*b* guides the second shutter 632 to the second recess 92, thereby helping the guide walls 50*d* to enter the second recess 92.

Referring to FIGS. 42 and 44, the cartridge mount 902 is provided inside the cartridge frame 220 of the image forming apparatus 102 having configurations similar to those of the image forming apparatus 10 shown in FIG. 1. As shown in FIG. 42, in the image forming apparatus 102, the multiple development devices 23 are arranged laterally (along the plane X-Z). Accordingly the photoreceptor drums 21 and the toner supply devices 43A are arranged laterally, and the transfer belt 30 (shown in FIG. 1) extends horizontally. The image forming apparatus 102 includes four cartridge frames 220 each corresponding to one of yellow, cyan, magenta, and black for accommodating the respective toner cartridges 502. The cartridge frames 220 are arranged horizontally in accordance with the horizontal arrangement of the development devices 23. It is to be noted that, similarly to the toner cartridges 502 and the cartridge mounts 902, the four cartridge frames 220 have a similar configuration except the discrimination grooves 225 for color discrimination, and only one cartridge frame 220 is described with descriptions of others omitted.

Referring to FIGS. 43A through 44, an opening 220*a* is formed in an outer wall of the image forming apparatus 102, and the cartridge frame 220*a* defines a chamber shaped like a rectangular parallelepiped and having a size to accommodate the cartridge mount 902. The opening 220*a* is substantially square and have a size to fit the substantially square rear end of the toner cartridge 502 with no or almost no clearance allowed therebetween (refer to FIG. 43B).

The cartridge frame 220 includes the rails 221 respectively provided to inner side faces 220*b* on the lateral sides (in the direction X) of the cartridge frame 220. Each rail 221 is shaped like a plate projecting from the inner side face 220*b* inward in the lateral direction (direction X). When the toner cartridge 502 is inserted into the cartridge frame 220, as shown in FIG. 45B, each rail 221 contacts an upper face of the inclined entry assist 209*b* of the rail 209 provided to the side wall 50*c* of the toner cartridge 502. As the toner cartridge 502 is inserted further, guided by the inclined entry assist 209*b*, the rails 221 move relatively above the rail body 209*a* (to the positive side in the direction Y) and contacts the rail body 209*a* from above as shown in FIGS. 45B and 45C. Thus, the pair of rails 221 can prevent the toner cartridge 502 from moving up (in the direction Y) while determining the posture of the toner cartridge 502.

Referring to FIGS. 43A through 44, further a pair of holding pieces 222 is provided on the inner side faces 220*b* above the pair of rails 221. The pair of holding pieces 222 projects from the inner side faces 220*b* inward in the direction X, and the projecting amount progressively increases toward the positive side in the direction Z. The pair of holding pieces 222 can catch the toner cartridge 502 from both sides at least at a position where the projecting amount is maximum.

Referring to FIG. 44, the cartridge frame 220 further includes a pair of pedestals 223 positioned to cover the lateral ends of the cartridge mount 902. An upper face (positive side in the direction Y) of each pedestal 223 is curved, forming the holding face 224 conforming to the curved of the lower wall 50*b* (shown in FIG. 28) not to hinder insertion of the lower wall 50*b*. Each holding face 224 is designed to allow the contact plate 207 (shown in FIG. 28) provided on the lower wall 50*b* to slide thereon when the toner cartridge 502 moves in the direction Z relative to the cartridge frame 220. The holding face 224 does not contact the lower wall 50*b* of the toner cartridge 502 due to the configuration of the contact plate 207 described above. Configurations of the holding faces 224 and the contact plates 207 can adapt to the toner cartridge 50 and the cartridge mount 90 of the first embodiment.

The pedestal 223 is provided with the discrimination grooves 225 and an engagement groove 226. The discrimination grooves 225 prevent the toner cartridge 502 from being mounted to the cartridge frame 220 for the color different from the color of developer (i.e., toner) contained in that toner cartridge 502. The discrimination grooves 225 are recessed from the holding face 224 to the negative side in the direction Y and extend in the direction Z. The size of each discrimination groove 225 is designed to accommodate the discrimination projection 208 (shown in FIG. 28) provided to the cartridge mount 902.

The discrimination grooves 225 are different in number and arrangement depending on the color of developer contained in the corresponding toner cartridge 502. In the configuration shown in FIG. 44, the number of the discrimination grooves 225 is two on either lateral side, that is, four in total. With this configuration, the discrimination grooves 225 allow the toner cartridge 502 to be inserted into only the cartridge frame 220 for the same color.

The engagement groove 226 is positioned on the lateral outer side (in the direction X) in a lower portion of the pedestal 223. The engagement groove 226 is recessed inward and extends in the direction Z. The engagement groove 226 can receive the retention releasing piece 68 (refer to FIG. 38) of the toner cartridge 502 and allow the retention releasing piece 68 to move in the direction Z to the releasing member 97 (the claw 97*a* shown in FIG. 40).

Descriptions are given below of operations of the shutter assembly 602 and the cartridge mount 902 during installation of the toner cartridge 502 in the cartridge frame 220 with reference to FIGS. 46A to 48B. Descriptions of the operations similar to those of the shutter assembly 60 and the cartridge mount 90 of the first embodiment are simplified or omitted.

Figure 47A:
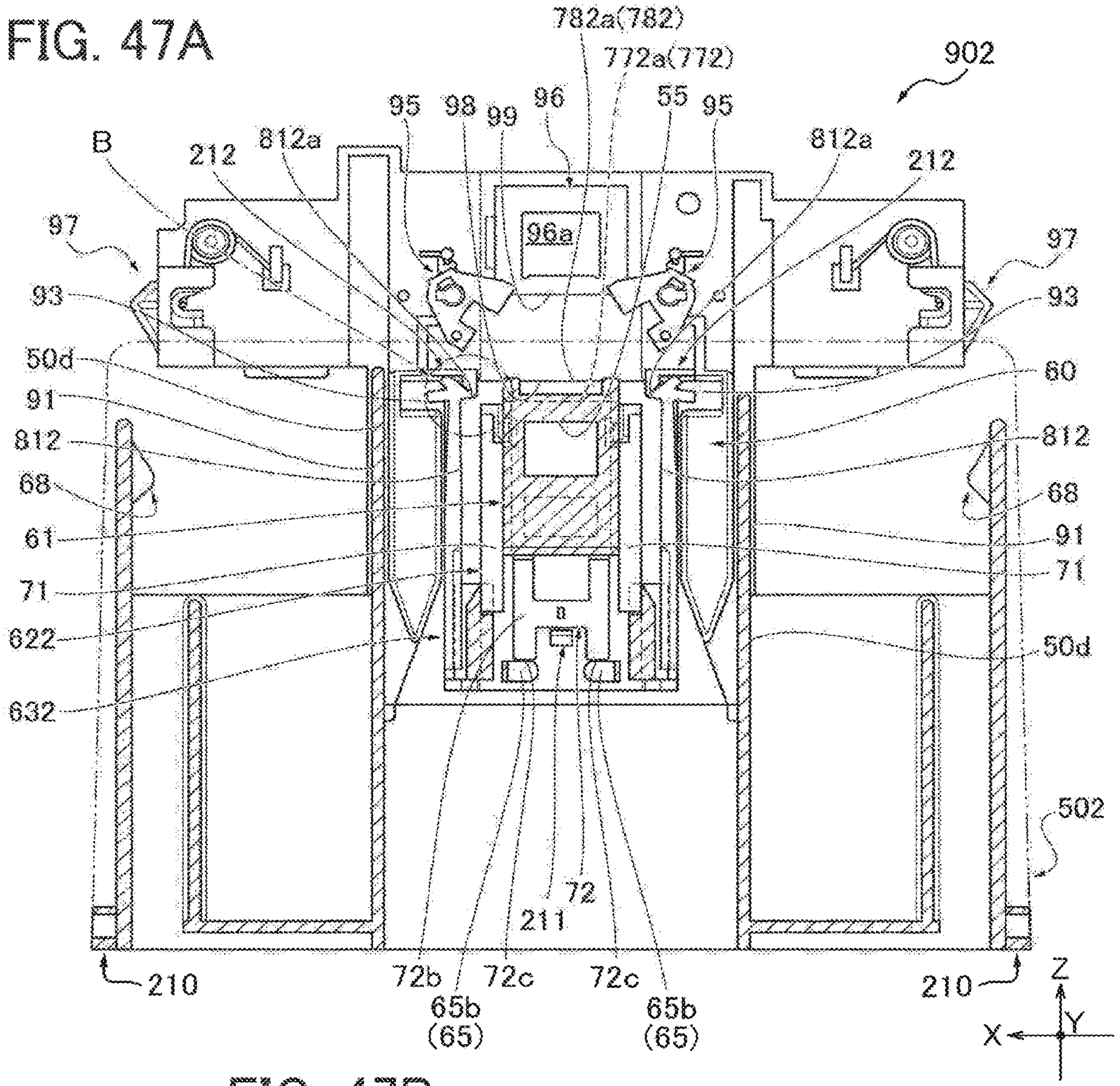
FIGS. 47A and 47B are respectively a cross-sectional view and a partial enlarged view similar to FIGS. 46A and 46B and illustrate the second shutter in contact with the second step.
Figure 47B:
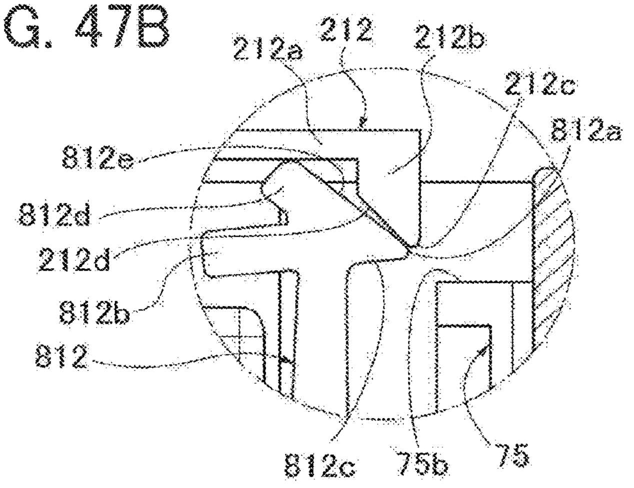
Figure 48A:
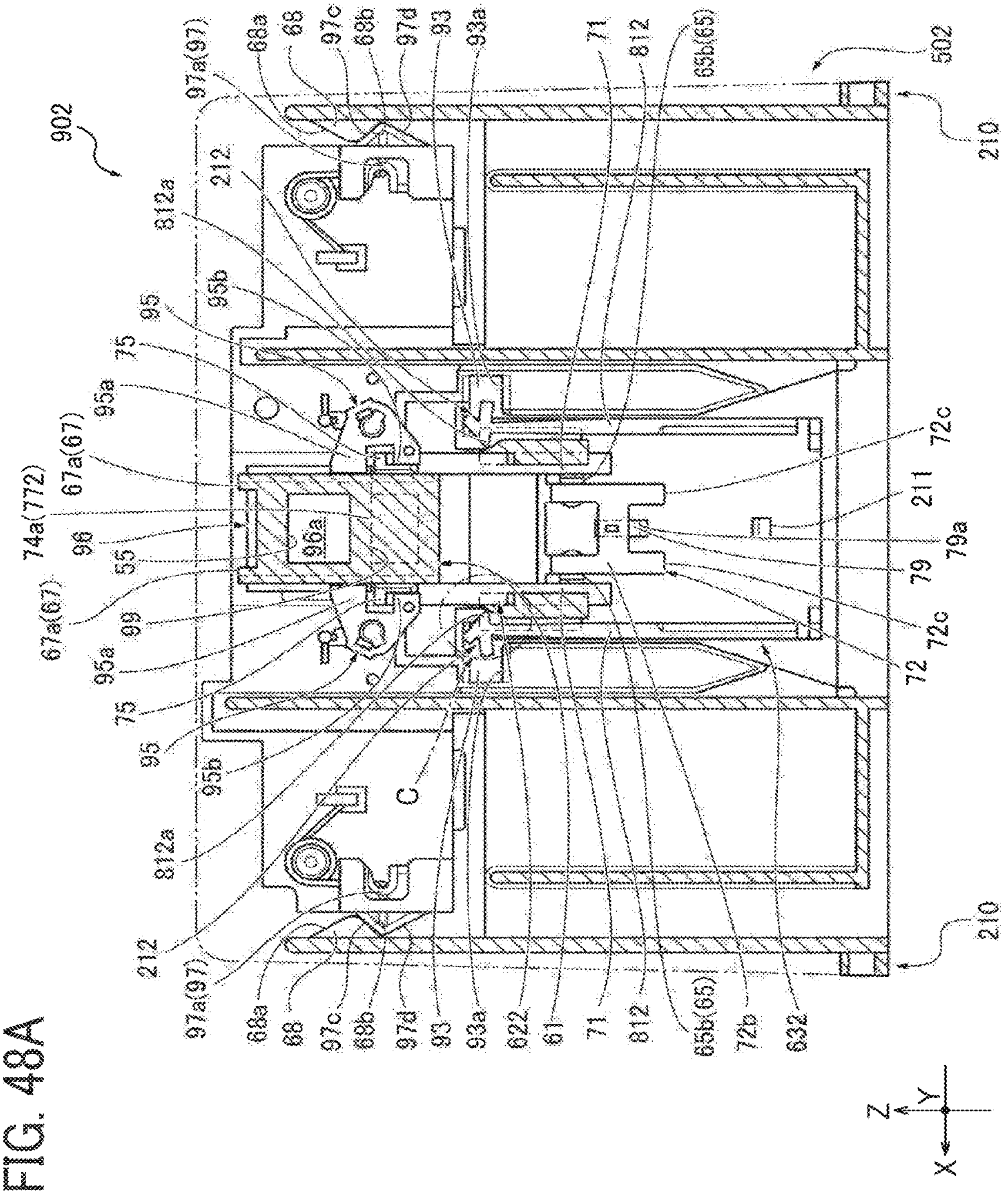
FIGS. 48A and 48B illustrate the outlet of the toner cartridge connected to the developer inlet of the toner supply device on a cross section similar to that shown in FIGS. 46A and 46B.
Figure 48B:
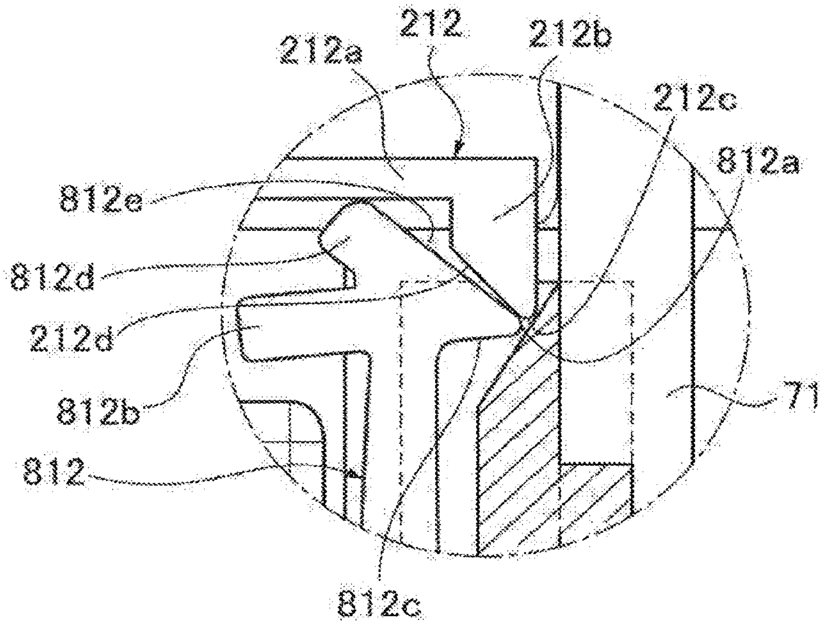

FIG. 46A is a cross-sectional view similar to FIGS. 38 and 41 and illustrates a state in which the pusher body 212*b* of each pusher 212 provided to the cartridge mount 902 contacts the projection 812*d* of each curved arm 812 of the second shutter 632 during installation of the toner cartridge 502 in the cartridge mount 902, and FIG. 46B is a partial enlarged view of FIG. 46A. FIGS. 47A and 47B are respectively a cross-sectional view and a partial enlarged view similar to FIGS. 46A and 46B and illustrate the second shutter 632 in contact with the second step 98. FIGS. 48A and 48B illustrate the outlet 55 of the toner cartridge 502 connected to the developer inlet % a of the toner supply device 43 on a cross section similar to that shown in FIGS. 46A and 46B.

Initially, hold the handle 206 (shown in FIGS. 43A and 43B) and move the toner cartridge 502 in the installation direction Z to the cartridge frame 220 (the cartridge mount 902) as indicated by arrow A11 shown in FIG. 43A. At that time, insert the pair of guide walls 50*d* (shown in FIG. 38) of the toner cartridge 502 into the pair of guide grooves 91 (shown in FIGS. 40 and 41) formed in the cartridge mount 902, and place the contact plates 207 (shown in FIG. 28) formed on the lower wall 50*b* of the toner cartridge 502 on the holding faces 224 (shown in FIG. 44) of the cartridge frame 220. Then, the pair of rails 209 formed on the side walls 50*c* of the toner cartridge 502 contact the respective rails 221 of the cartridge frame 220 from under (refer to FIGS. 45A to 45C). Additionally, the toner cartridge 502 is sandwiched by the holding pieces 222 from both lateral sides (in the direction X). Thus, the direction in which the cartridge mount 902 moves relative to the toner cartridge 502 is limited to the installation direction Z.

The first shutter 622 is at the sealing position in this state. Accordingly, the shutter seal 772 is pressed against the shutter mount 61 on the periphery of the outlet 55, sealing the outlet 55. Additionally, the second shutter 632 is at the shielding position, covering the first shutter 622 including the pressed projection 73. Since the legs 72*c* of the body 72*b* of the retained piece 72 of the first shutter 622 contact the respective pressed portions 65*b* of the retaining projections 65 on the lower wall 50*b*, the first shutter 622 is prevented from moving from that position in the direction opposite the installation direction Z relative to the shutter mount 61. Subsequently, in the second shutter 632, the flat faces 812*c*, which are parallel to the plane X-Y and adjacent to the edges 812*a*, of the respective arms 812 contact the contact faces 75*b* of the engaging portions 75 at the front ends of the side walls 71 of the first shutter 622, and the second shutter 632 is prevented from moving relative to the shutter mount 61 in the direction opposite the installation direction Z.

Subsequently, as the toner cartridge 502 is moved in the installation direction Z, the second shutter 632 enters the second recess 92 of the cartridge mount 902. Then, the projections 812*d* (the inclined faces 812*e*) of the arms 812 of the second shutter 632 in the initial curved state contact the respective pushers 212 (inclined contact faces 212*d* at the projecting edges 212*c*) as shown in FIGS. 46A and 46B. As the toner cartridge 502 moves further in the direction Z, due to the interaction between the inclined face 812*e* of the projection 812*d* and the projecting edge 212*c* and the inclined contact face 212*d* of the pusher body 212*b*, the arms 812 move outward in the direction X. Accordingly, the hook pieces 812*b* thereof project outward in the direction X and enter the respective grooves 93 continuous with the second recess 92 (refer to FIGS. 47A and 47B). As the hook pieces 812*b* enter the retaining grooves 93, the second shutter 632 (in particular, the front end face 782*a*) contacts the second step 98 of the cartridge mount 902 (refer to FIG. 47A). Therefore, the second shutter 632 is restricted from moving in the installation direction Z relative to the cartridge mount 902.

Subsequent movement in accordance with the toner cartridge 502 moving further in the installation direction Z is similar to that in the first embodiment. As the toner cartridge 502 moves further in the installation direction Z, the outlet 55 of the shutter mount 61 faces and is connected to the developer inlet 96*a* in the direction Y with the lower end face (on the negative side in the direction Y) of the shutter mount 61 mated with the upper end face (positive side in the direction Y) of the inlet rim 96 as shown in FIG. 48A. In the state in which the outlet 55 is connected to the developer inlet 96*a*, the second projection 95*b* of each pawl 95 is on the back of the engaging portion 75 (in particular, on the negative side in the direction Z of the hook face 75*a*) of the side wall 71 of the first shutter 622 being at the open position, restricted by the first step 99. Additionally, the first shutter 622 is at the restriction position by the first step 99 with the front end face 74*a* of the mount 74 (or the end 772*a* of the shutter seal 772) in contact with the first step 99.

At that time, in the first shutter 622, the end 772*a* of the shutter seal 772 projects more than the front end face 74*a* of the mount 74 as shown in FIG. 36, and accordingly the projecting portion of the shutter seal 772 is compressed by the first step 99. Thus, clearance between the first step 99, that is, the inlet rim 96, and the first shutter 622 can be sealed by the compressed portion of the shutter seal 772 when the outlet 55 is connected to the supply opening 96*a*.

In this state, additionally the second shutter 632 is at the open position and restricted by the second step 98 with the hook piece 812*b* of each arm 812 thereof inserted in the retaining groove 93. At that time, each arm 812 is kept stretched in the direction Z with the edge 812*a* shifted outside in the direction X since the projections 812*d* of the arms 812 of the second shutter 632 contact the pusher bodies 212*b* of the pushers 212 of the first shutter 62, or the edges 812*a* contact the side walls 71 of the first shutter 622. Additionally, the inclined rear side 68*b* of the retention releasing piece 68 at the side wall 50*c* faces the inclined front side 97*c* of the claw 97*a* in the direction Z, fixing the position of the toner cartridge 502 relative to the cartridge mount 902 releasably.

Further, when the outlet 55 is connected to the supply opening 96*a*, the first and second positioning protrusions of the cartridge frame 220 are respectively inserted into the first and second positioning recess 201 and 202 (shown in FIG. 26), and the toner cartridge 502 is set in at the predetermined posture relative to the cartridge frame 220. The electronic board 572 is set in position with the positioning protrusion of the cartridge frame 220 fitted in the positioning hole 572*b* (shown in FIG. 26) formed in the electronic board 572.

Additionally, while the toner cartridge 502 is inserted to the position where the outlet 55 is connected to the supply opening 96*a*, the clamping pieces 205 (shown in FIG. 26) provided on the upper face of the toner cartridge 502 contact the upper wall 220*c* (shown in FIG. 44) of the cartridge frame 220, and the bottom support pieces 214 (shown in FIG. 28) on the respective bottom walls 50*f* of the toner cartridge 502 contact the lower wall 220*d* (shown in FIG. 44) of the cartridge frame 220. Thus, the rear side of the toner cartridge 502 is prevented from moving upward and downward (refer to FIG. 43B). In the state in which the outlet 55 is connected to the supply opening 96*a*, as shown in FIG. 43B, the opening 220*a* of the cartridge frame 220 is filled with the rear side of the toner cartridge 502. Then, the agitator drive coupling 301 provided to the cartridge frame 220 is connected to the connected portion 522*a* of the agitator 52 as shown in FIG. 32D, and the screw drive coupling provided to the cartridge frame 220 is connected to the connected portion 562*a* (shown in FIG. 26) of the conveyance screw 56.

Thus, the toner cartridge 502 is mounted to the cartridge mount 902, and installation thereof in the cartridge frame 220 is completed. When the toner cartridge 502 is connected thereto, the toner supply device 43 can lead developer discharged from the outlet 55 to the temporary reservoir 44 (refer to FIG. 3) inside the toner supply device 43 through the developer inlet 96*a* as the agitator 52 and the conveyance screw 56 are driven by the agitator drive coupling 301 and the screw drive coupling, respectively. Then, developer is supplied from the toner cartridge 502 to the development device 23 shown in FIG. 42.

Descriptions are given below of operations of the shutter assembly 602 and the cartridge mount 902 during removal of the toner cartridge 502 from the cartridge frame 220 with reference to FIGS. 49A to 50B. Descriptions of the operations similar to those of the shutter assembly 60 and the cartridge mount 90 of the first embodiment are simplified or omitted.

Figure 49A:
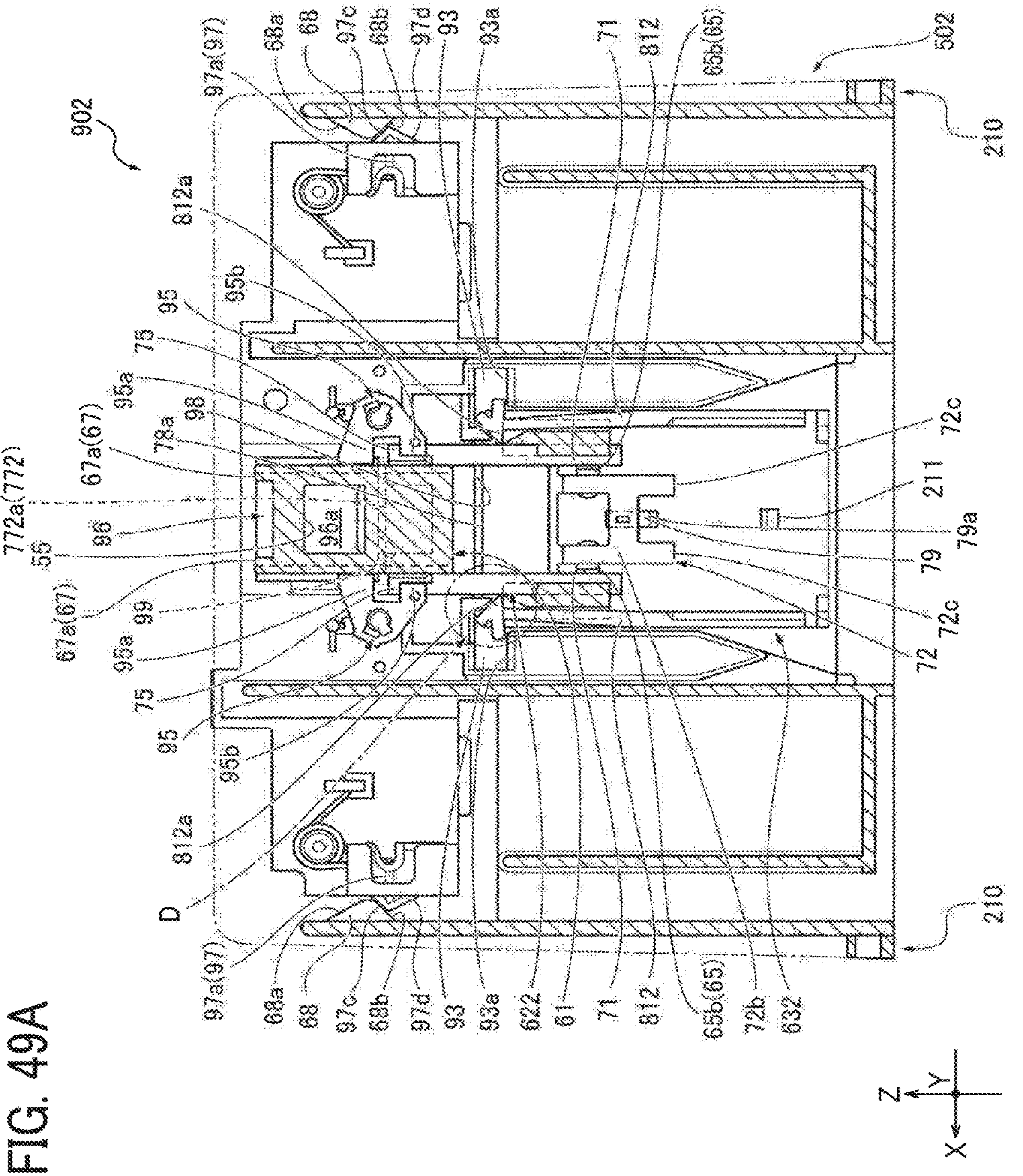
FIGS. 49A and 49B are respectively a cross-sectional view and a partial enlarged view similar to FIGS. 46A and 46B and illustrate release of the toner cartridge retained by the releasing member during removal of the toner cartridge from the cartridge frame.
Figure 49B:
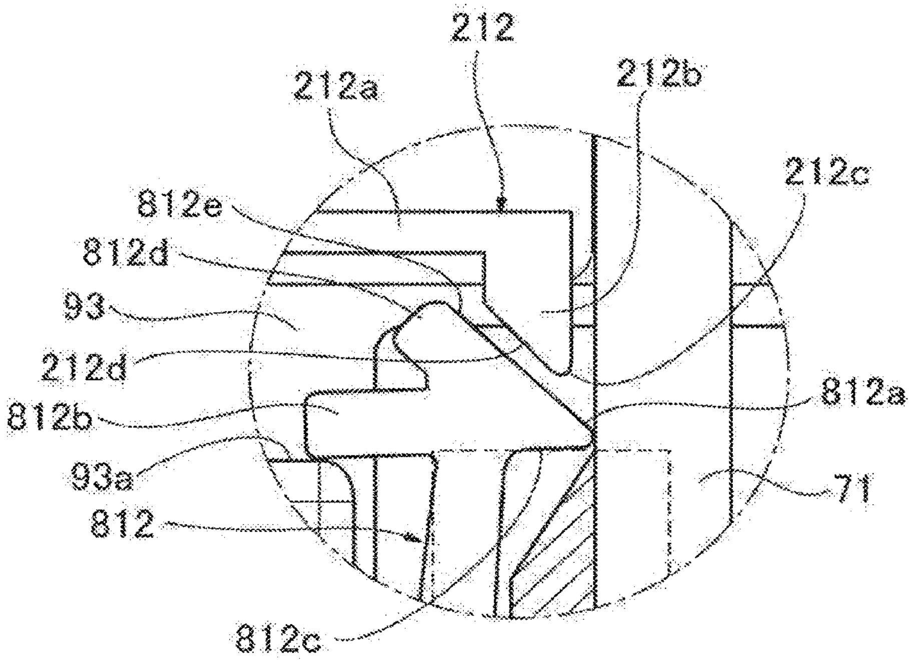
Figure 50A:
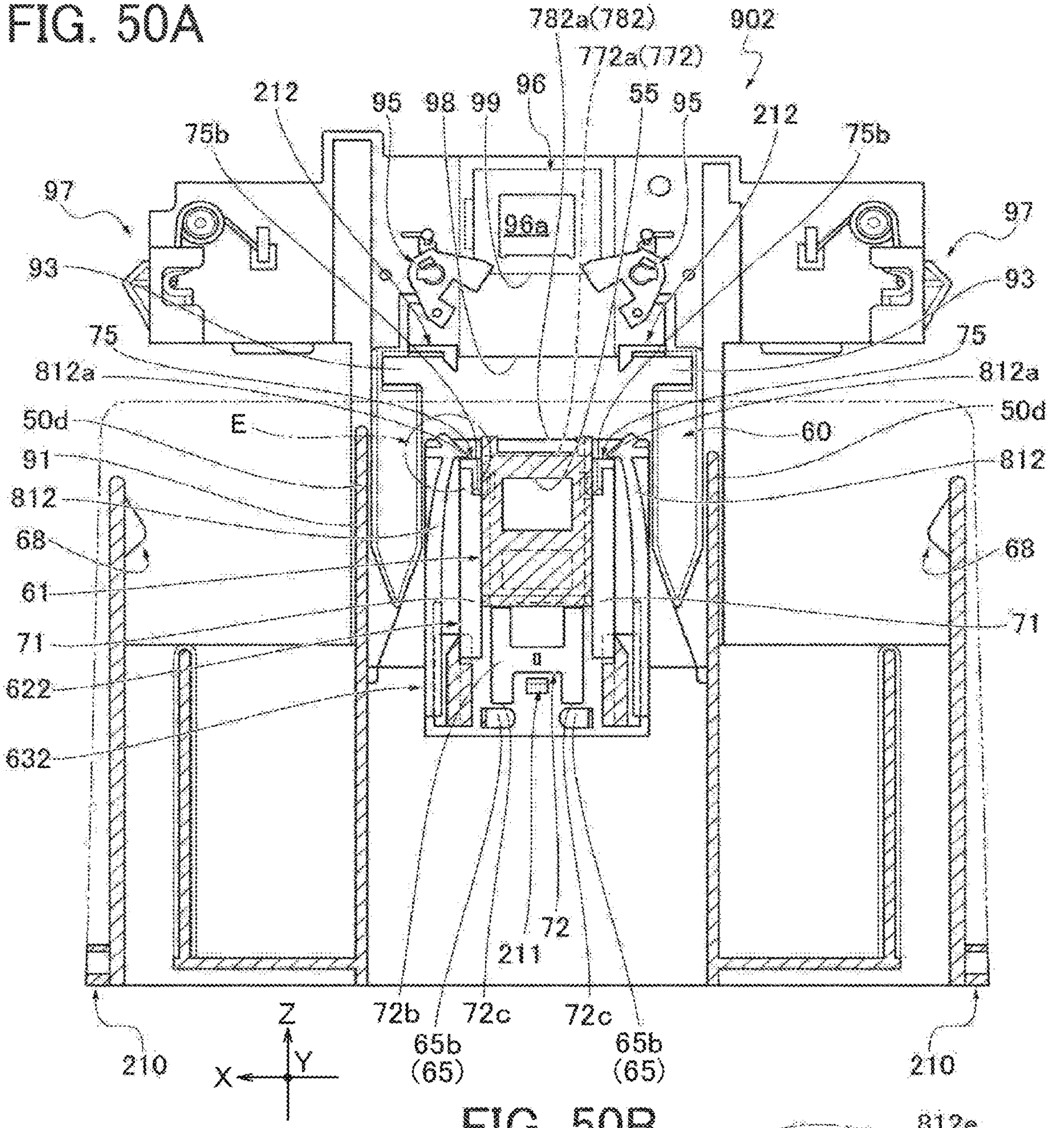
FIGS. 50A and 50B are respectively a cross-sectional view and a partial enlarged view similar to FIGS. 46A and 46B and illustrate a state in which the second shutter is released from retention by the hook pieces and the retaining grooves.
Figure 50B:
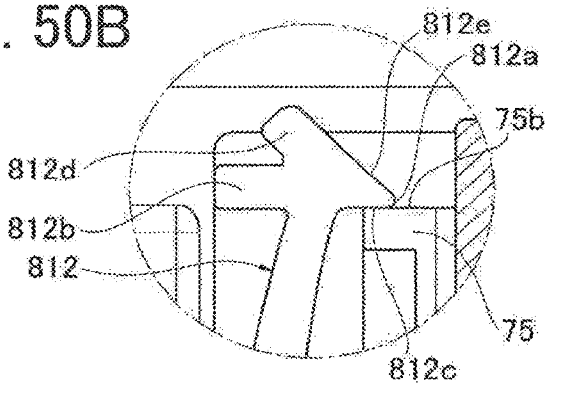

FIGS. 49A and 49B are respectively a cross-sectional view and a partial enlarged view similar to FIGS. 46A and 46B and illustrate release of the toner cartridge 502 retained by the releasing member 97 during removal of the toner cartridge 502 from the cartridge mount 902. FIGS. 50A and 50B are respectively a cross-sectional view and a partial enlarged view similar to FIGS. 46A and 46B and illustrate a state in which the second shutter 632 is released from retention by the hook pieces 812*b* and the retaining grooves 93.

In removal of the toner cartridge 502 from the cartridge mount 902, the toner cartridge 502 is moved to the negative side in the direction Z (i.e., removal direction). Initially, hold the handle 206 (shown in FIGS. 43A and 43B) and move the toner cartridge 502 in the removal direction opposite the direction Z relative to the cartridge frame 220 (the cartridge mount 902). Then, the retention achieved by the retention releasing pieces 68 on the side walls 50*c* of the toner cartridge 502 and the releasing members 97 of the cartridge mount 902 is canceled (refer to FIG. 49A). FIG. 49A illustrates an initial stage of the releasing members 97 being pushed inside the cartridge mount 902 for canceling retention.

Then, the shutter mount 61 of the toner cartridge 502 moves in the removal direction, and the outlet 55 is shifted from the supply opening 96*a* of the cartridge mount 902 in the direction Y. At that time, since the second projection 95*b* of each pawl 95 of the cartridge mount 902 is inserted on the back side of each engaging portion 75 of the first shutter 622, the second projection 95*b* contacts the hook face 75*a* of the engaging portion 75 in the direction Z, thereby inhibiting the first shutter 622 from moving in the removal direction relative to the cartridge mount 902.

Additionally, the edge 812*a* of each arm 812 of the second shutter 632 contacts the side wall 71 of the first shutter 622, and the hook piece 812*b* is in the retaining groove 93 of the cartridge mount 902. Accordingly, the hook piece 812*b* interferes with the wall 93*a* of the retaining groove 93 in the direction Z, thereby inhibiting the second shutter 632 from moving in the removal direction relative to the cartridge mount 902. At that time, although the second shutter 632 is shifted from the restriction position by the second step 98 slightly to the negative side in the direction Z, the releasing position relative to the first shutter 62 can be maintained.

In the second shutter 632, the projections 812*d* (the inclined faces 812*e*) can be prevented from interfering with the projecting edges 212*c* (inclined contact faces 212*d*) while the arms 812 revert to the initial curved state from the state in which the hook pieces 812*b* engage the retaining grooves 93 as the second shutter 632 moves slightly in the removal direction from the restriction position by the second step 98 (refer to FIGS. 50A and 50B). Therefore, the first and second shutters 622 and 632 are inhibited from moving in the removal direction together with the shutter mount 61. In other words, the first and second shutters 622 and 632 move in the installation direction Z with the releasing state of the second shutter 632 maintained.

Subsequent movement in accordance with the toner cartridge 502 moving further in the removal direction is similar to that in the first embodiment. As the toner cartridge 502 is moved in the removal direction, the first shutter 622 is retained by the pawls 95 at the restriction position by the first step 99 until the first shutter 622 reaches the sealing position to seal the outlet 55 with the shutter seal 772 (shown in FIG. 39). Subsequently, the first shutter 622 reaches the sealing position, and the shutter seal 772 is pressed against the periphery of the outlet 55 in the toner cartridge 502, sealing the outlet 55.

Then, the releasing projections 67 (the end faces 67*a* in particular) of the shutter mount 61 are moved to the position upstream (negative side) from the first projections 95*a* of the pawls 95 in the direction Z, and the shutter mount 61 no more presses the first projections 95*a* in the direction Z. Then, each pawl 95 pivots around the shaft 95*c* to the initial pivot position. Accordingly, the second projection 95*b* of each pawl 95 is disengaged from the back side of the engaging portion 75 of the first shutter 622, thereby allowing the first shutter 622 to move in the removal direction relative to the cartridge mount 902. With this operation, during removal of the toner cartridge 502 from the cartridge mount 902, shielding of the outlet 55 by the first shutter 622 and the shutter seal 772 can be secured.

Subsequently, as the toner cartridge 502 is moved in the removal direction, the first shutter 622 moves in the removal direction together, and the second shutter 632 remains at or adjacent to the restriction position by the second step 98. That is, the second shutter 632 moves in the direction Z while the first shutter 622 remains at the sealing position. As the first and second shutters 622 and 632 move relatively in the installation direction Z, the releasing state in which the releasing projection 73 of the first shutter 622 faces the releasing projection 79 of the second shutter 632 is canceled. Then, the first shutter 622 is retained at the sealing position with the shutter seal 772 sealing the outlet 55 and inhibited from moving in the removal direction relative to the toner cartridge 502.

Subsequently, referring to FIGS. 50A and 50B, as the toner cartridge 502 moves in the removal direction opposite the direction Z, the first shutter 622 is interposed between the arms 812 of the second shutter 632, disengaging the edges 812*a* of the arms 812 from the side walls 71 of the first shutter 622. Accordingly, the arm 812 is shifted to the initial curved state, disengaging the hook piece 812*b* from the retaining groove 93 of the cartridge mount 902. Thus, the second shutter 632 can move in the removal direction relative to the cartridge mount 902.

At that time, since the projections 812*d* (the inclined faces 812*e*) can be prevented from interfering with the pusher body 212*b* (inclined contact faces 212*d*) as described above, recovery of the arms 812 to the initial curved state from the state in which the hook pieces 812*b* engage the retaining grooves 93 can be secured. At that time, referring to FIG. 50A, the second shutter 632 is at the shielding position, preventing the pressed projection 73 of the first shutter 622 from appearing outside the toner cartridge 502 (the lower wall 50*b*).

Subsequently, the toner cartridge 502 is removed from the cartridge mount 902 by moving in the removal direction. At that time, as shown in FIGS. 38, 39, and 50A, the first shutter 622 is at the sealing position, and the shutter seal 772 is pressed against the shutter mount 61 on the periphery of the outlet 55, sealing the outlet 55. Additionally, the second shutter 632 is at the shielding position, covering the first shutter 622 including the pressed projection 73. Thus, the outlet 55 is closed by the shutter assembly 602, which is a state similar to the state before the toner cartridge 502 is mounted to the cartridge mount 902 in the cartridge frame 220 of the toner supply device 43. Thus, removal of the toner cartridge 502 is completed.

With the configurations similar to those of the toner cartridge 50 according to the first embodiment, the toner cartridge 502 (502Y, 502M, 502C or 502BK) according to the second embodiment can attain similar effects.

In addition, in the toner cartridge 502, since the arms 812 of the second shutter 632 include the flat faces 812*c* that are parallel to the plane X-Y in the initial curved state, the flat faces 812*c* can contact, in the direction Z, the front end of the side walls 71 of the first shutter 622, that is, the faces 75*b* (of the engaging portions 75) parallel to the plane X-Y, if the first shutter 622 moves in the direction Z relative to the second shutter 632. This configuration can enhance inhibition of movement of the second shutter 632 to the negative side in the direction Z relative to the first shutter 622 compared with that of the second shutter 63 of the first embodiment.

Further, with the enhanced inhibition of relative movement of the second shutter 632 to the first shutter 622, unintended opening of the outlet 55 can be prevented more effectively in the toner cartridge 502.

In the toner cartridge 502, since the arms 812 of the second shutter 632 further include the projections 812*d* (inclined faces 812*e*), the arms 812 can be deformed outward in the direction X (lateral direction) by the force to the negative side in the direction Z, exerting on the inclined faces 812*e*, and the hook pieces 812*b* can be inserted in the retaining grooves 93 continuous with the second recess 92. This configuration can secure deformation of the arms 812 even if inhibition of relative movement of the second shutter 632 to the first shutter 622 is enhanced. Accordingly, inhibition of movement of the second shutter 632 relative to the cartridge mount 902 to the negative side in the direction Z can be secured.

The shutter assembly 602 can be simplified because deformation of the arms 812 of the second shutter 632 can be recovered using the first shutter 622 (the side walls 71 in particular).

In the toner cartridge 502, the area of the lower wall 50*b* in contact with the holding faces 224 of the cartridge frame 220 can be reduced to the contact plates 207 provided to the lower wall 50*b*, thereby facilitating movement of the toner cartridge 502 in the direction Z relative to the cartridge frame 220, that is, the cartridge mount 902. Since the contact plates 207 are disposed in pair in the direction X, even with the reduced contact area, the toner cartridge 502 can move reliably in the direction Z relative to the cartridge frame 220, that is, the cartridge mount 902.

Since the rails 209 are provided to the side walls 50*c*, the toner cartridge 502 can be prevented from moving upward in the cartridge frame 220 and set in position therein as the rails 221 provided to the cartridge frame 220 contact the rails 209 from above.

Additionally, since the clamping pieces 205 are provided on the upper face of the toner cartridge 502, the rear side of the toner cartridge 502 can be prevented from moving upward as the clamping pieces 205 contact the upper wall 220*c* (shown in FIG. 44) of the cartridge frame 220. This configuration can facilitate insertion of the first positioning protrusion of the cartridge frame 220 into the first positioning recess 201 (shown in FIG. 26), the second positioning protrusion of the cartridge frame 220 into the second positioning recess 202, the positioning protrusion of the cartridge frame 220 into the positioning hole 572*b* formed in the electronic board 572.

This configuration can further facilitate connection of the agitator drive coupling 301 to the connected portion 522*a* of the agitator 52 (refer to FIGS. 32A to 32C) and connection of the screw drive coupling to the connected portion 562*a* of the conveyance screw 56. This feature is effective particularly in the configuration in which the handle 206 is positioned on the rear side (negative side in the direction Z) of the toner cartridge 502. The handle 206 can make it easier for users to hold the toner cartridge 502 by gripping the handle wall 206*b* with his or her hand inserted in the recess 206*a*.

Additionally, since the bottom support pieces 214 are provided on the bottom walls 50*f* of the toner cartridge 502, the rear side of the toner cartridge 502 can be prevented from moving downward as the bottom support pieces 214 contact the lower wall 220*d* (shown in FIG. 44) of the cartridge frame 220. This configuration enables proper insertion or connection of the above-described elements and can secure communication between the electronic board 572 and the communication board of the toner supply device 43 by preventing the rear side of the toner cartridge 502 from tilting down. This feature is effective because the rear side of the toner cartridge 502 may tilt down due to the weight thereof (or the weight of developer contained therein).

Thus, the vertical position of the rear side of the toner cartridge 502 can be set properly with the clamping pieces 205 on the upper face in contact with the upper wall 220*c* and the bottom support pieces 214 on the bottom walls 50*f* in contact with the lower wall 220*d*, enabling proper insertion or connection of the above-described elements. Additionally, the clamping pieces 205 and the bottom support pieces 214 are shaped such that the projecting amount in the direction Y increases progressively as the position in the direction Z moves to the negative side. Accordingly, insertion of the toner cartridge 502 can be smooth while attaining the above-described effects.

Since the toner cartridge 502 includes the raised rear sections 210 to make the toner cartridge 502 fit inside the opening 220*a* of the cartridge frame 220 with almost no clearance, the toner cartridge 502 can close the opening 220*a* when mounted in the cartridge frame 220 (refer to FIG. 43B). This configuration can prevent leakage of developer through the opening 220*a* outside the cartridge frame 220 even if developer accidentally leaks from the toner cartridge 502 inside the cartridge frame 220. Additionally, since the opening 220*a* is closed, appearance of the image forming apparatus 102 with the toner cartridges 502 mounted therein can improve even w % ben the upper part (i.e., the developer chamber 51 shown in FIG. 3) is greater in size in the direction X than the lower part (i.e., the tapered portion 53 and the discharge channel 54) in the toner cartridge 502. Therefore, the capacity of the developer chamber 51 can be increased while preventing leakage of developer from the opening 220*a* and improving the appearance when the toner cartridge 502 is mounted in the apparatus.

In the toner cartridge 502, since the ventilation section 203 is provided not to be covered with developer when a sufficient amount of developer is contained therein, air supply to the developer chamber 51 can be secured. Accordingly, pressure inside the developer chamber 51 can be prevented from falling to the negative pressure (i.e., lower than the ambient pressure) due to the discharge of developer through the outlet 55. With this configuration, developer can be discharged smoothly from the outlet 55 and supplied smoothly to the temporary reservoir 44 through the supply opening 96*a* of the cartridge mount 902.

With the above-described location of the ventilation section 203, even when air flows in through the supply opening 96*a* of the cartridge mount 902, air can be exhausted from the developer chamber 51, thereby preventing pressure rise in the developer chamber 51.

The toner cartridge 502 further includes the shutter protector 50*e* (shown in FIG. 26) positioned at the end of each guide wall 50*d* and projecting beyond the shutter assembly 602 to the positive side in the direction Z. Accordingly, even if an unintended object approaches relatively from the positive side in the direction Z, the shutter protector 50*e* can contact the object before the first and second shutters 622 and 632 do, thereby preventing the first and second shutters 622 and 632 from being pushed to the negative side in the direction Z relatively. Thus, the first and second shutters 622 and 632 can be protected. With this configuration, even if the periphery of the shutter assembly 602 hits the cartridge frame 220 or the cartridge mount 902 during installation of the toner cartridge 502 in the direction Z, the shutter protector 50*e* can prevent the first and second shutters 622 and 632 from being pushed to the negative side, opening the outlet 55.

Since the inclined face 522*d* is provided to the pair of projections 522*b* of the agitator 52, the interaction between the inclined face 522*d* and the inclined face 301*c* at the projecting end 301*b* of the pair of projections 301*a* of the agitator drive coupling 301 can prevent the interference state in which the projecting end 301*b* of the agitator drive coupling 301 and the projecting end 522*c* of the connected portion 522*a* get stuck with each other at their projecting edges. In addition, since the projecting end 522*c* of the projection 522*b* parallels the center axis Ca of the projecting end 301*b*, guiding effect exerted by the inclined face 522*d* and the inclined face 301*c* can facilitate the rotation of the agitator drive coupling 301 relative to the connected portion 522*a*. Accordingly, the above-described interference state can be prevented more effectively.

Since the inclined faces 522*d* of the projections 522*b* of the agitator 52 are disposed in pair in the circumferential direction, with the interaction between the inclined faces 522*d* and the inclined faces 301*c* of the projections 301*a* disposed in pair in the circumferential direction, the amount of relative clearance (escape amount) to avoid the interference state can be reduced, which is described in detail with reference to FIGS. 32C through 32E.

Referring to FIG. 32C, it is assumed that the circumferential dimension of the projecting end 522*c* corresponding to one of the inclined faces 522*d* is a, and the circumferential dimension of the projecting end 301*b* corresponding to one of the inclined faces 301*c* is β. Then, with the guiding effects of the inclined face 522*d* and the inclined face 301*c*, the above-described interference state between the projecting end 522*c* and the projecting end 301*b* can be prevented by rotating relative to each other an amount of $\alpha+\beta$ at the maximum.

By contrast, for example, FIG. 32E illustrates a pair of projections 5220*b* and a pair of projections 3010*a* according to a comparative configuration. In FIG. 32E, an inclined face 522*f* that is uniform over the entire circumference is formed at a projecting end 522*c* of the projection 5220*b*, and an inclined face 301*d* that is uniform over the entire circumference is formed at a projecting end 301*b* of the projection 3010*a*. In the configuration shown in FIG. 32E, to prevent the projecting end 522*c* and the projecting end 301*b* from getting stuck each other using the guiding effects of the inclined face 522*f* and the inclined face 301*d*, the projection 5220*b* and the projections 3010*a* are required to rotate relative to each other an amount of $2\alpha+2\beta$ at the maximum.

Therefore, as in the present embodiment, the amount of relative clearance (escape amount) to avoid the interference state can be reduced by the inclined faces 522*d* disposed in pair in the circumferential direction of the projecting end 522*c* and the inclined faces 301*c* disposed in pair in the circumferential direction of the projecting end 301*b* to interact with each other. In the second embodiment, the amount of clearance can be about half the amount in the configuration shown in FIG. 32E.

It is to be noted that the configuration of the two inclined faces 522*d* in pair is not limited to the configuration above. For example, the two inclined faces 522*d* can be different in inclination or dimension in the circumferential direction with the axial line centered as long as the above-described effect can be attained. Similarly, the inclined faces 301*c* are not limited to the above-described configuration.

In the toner cartridge 502, the projecting ends 522*c* of the projections 522*b* of the agitator 52 are inclined to the negative side in the direction Z as the projecting ends 522*c* approach each other, and the projecting ends 522*c* parallel the projecting ends 301*b* of the projections 301*a* in the direction of center axis Ca. Accordingly, as the pair of projecting ends 522*c* contacts the pair of projecting ends 301*b*, a force for guiding the projections 301*a* inside the projections 522*b* can be caused by the guiding effects thereof.

This configuration can prevent a force acting on the connected portion 522*a* and the agitator drive coupling 301 to shift the center axis Ca (shown in FIG. 32A) from the axis of the connected portion 522*a* even when the projection 301*a* (the projecting end 301*b*) contacts the projection 522*b* (the projecting end 522*c*) as described above.

It is to be noted that the effects and variations in configuration of the connected portion 522*a* of the agitator 52 (and the agitator drive coupling 301 connected thereto) can adapt to the connected portion 562*a* of the conveyance screw 56 (and the screw drive coupling connected thereto).

In the toner cartridge 502, developer agitation effects in the developer chamber 51 can improve since the first hollow cylinder 201*a* defining the first positioning recess 201 and the second hollow cylinder 202*a* defining the second positioning recess 202 are continuous with the inner face of the developer chamber 51, which is described in detail below with reference to FIGS. 51A and 51B. It is to be noted that, in FIGS. 51A and 51B, reference character 52*b* represents blades of the agitator 52, extending radially from the axial line.

Figure 51B:
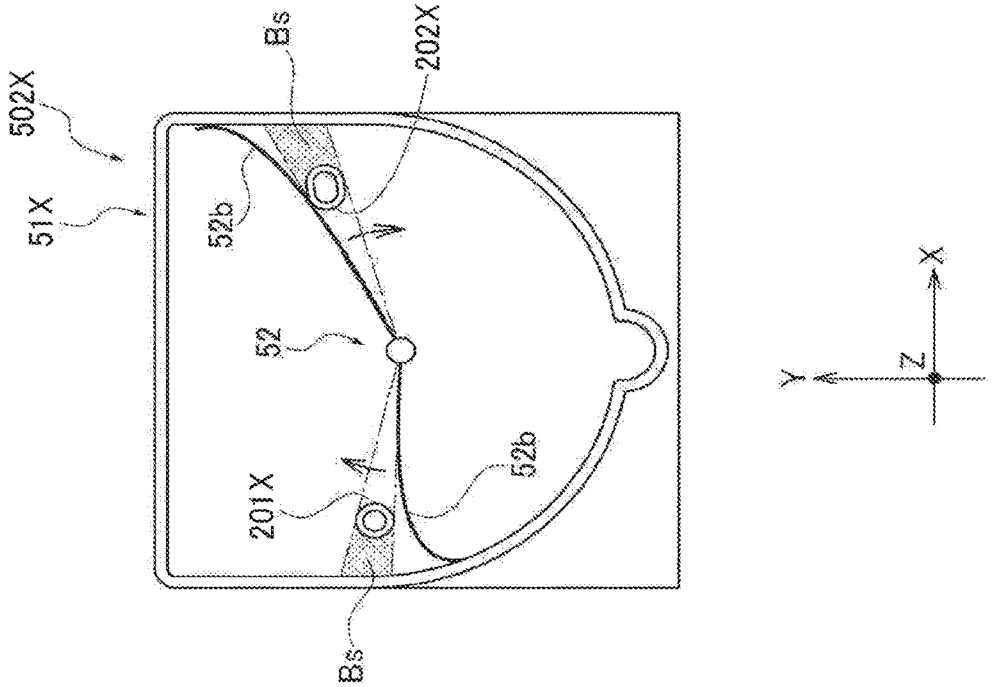
FIG. 51B illustrates an interior of a comparative toner cartridge.

For example, FIG. 51B illustrates a comparative toner cartridge 502X in which first and second positioning recesses 201X and 202X are not continuous with an inner face of a developer chamber 51X. In the configuration shown in FIG. 51B, when viewed in the axial direction of the agitator 52, blind spots Bs are present between the inner face of the developer chamber 51X and the first and second positioning recesses 201X and 202X. It is difficult to agitate developer in the blind spots Bs by the blades 52*b* even if the agitator 52 is driven.

Figure 51A:
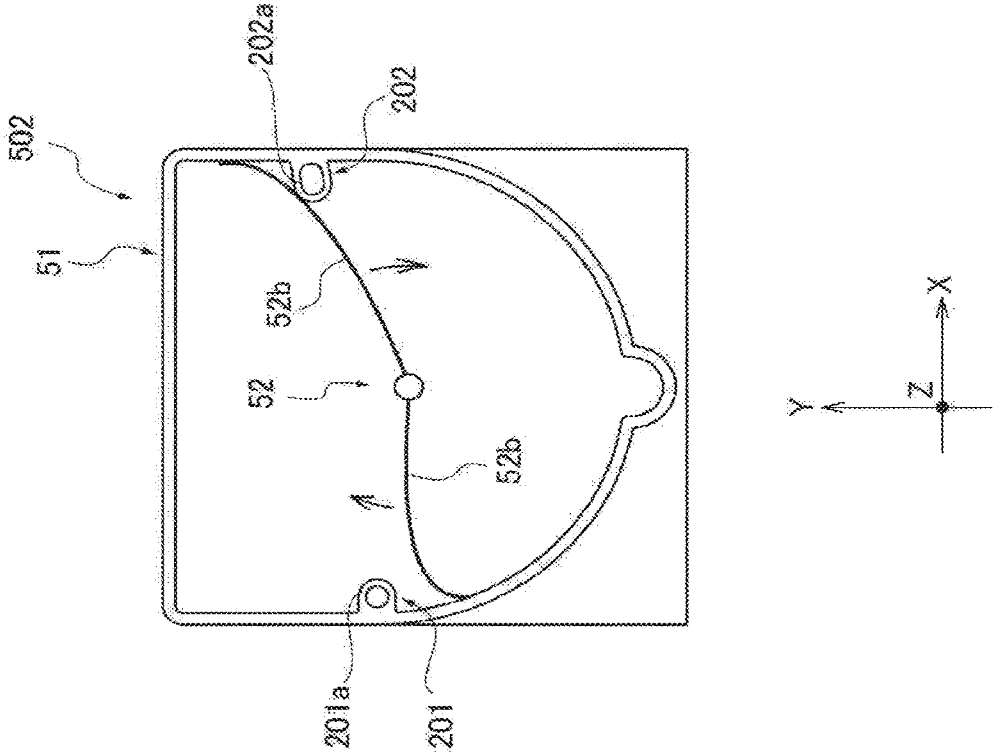
FIG. 51A illustrates first and second positioning recesses and an interior of the toner cartridge.

By contrast, the toner cartridge 502 shown in FIG. 51A according to the second embodiment can avoid creation of such blind spots Bs because the first and second hollow cylinders 201*a* and 202*a* are continuous with the inner face of the developer chamber 51. Accordingly, developer inside the entire chamber 51 can be agitated by blades 52*b* of the agitator 52, thus facilitating developer agitation inside the developer chamber 51. It is to be noted that, in FIGS. 51A and 51B, the interior of the developer chamber 51 or 51X and the blades 52*b* are simplified with changes in the blades 52*b* emphasized, and those configurations are not necessarily conform to those of product or other figures.

In the first shutter 622 of the toner cartridge 502, the end 772*a* of the shutter seal 772 projects more than the front end face 74*a* of the mount 74 in the direction Z. Accordingly, the projecting portion of the shutter seal 772 is compressed by the first step 99 of the cartridge mount 902 when the first shutter 622 contacts the first step 99. Thus, clearance between the first step 99, that is, the inlet rim 96, and the first shutter 622 can be sealed by the compressed portion of the shutter seal 772 when the first shutter 622 is at the restriction position by the first step 99 and the outlet 55 is connected to the supply opening 96*a*. This configuration can prevent leakage of developer from between the inlet rim 96 and the first shutter 622 into the cartridge frame 220 even if developer leaks from between the outlet 55 and the supply opening 96*a* in an unanticipated situation.

With the configurations similar to those of the toner supply device 43 according to the first embodiment, the second embodiment can attain similar effects.

In addition, the toner supply device 43 according to the second embodiment further includes the pair of pushers 212. With this configuration, when the second shutter 632 enters the second recess 92, the pusher bodies 212*b* are pressed in the direction Z against the projections 812*d* of the arms 812, thereby shifting the arms 812 outward in the direction X by the guiding interaction between the inclined face 812*e* and the projecting edge 212*c* and the inclined contact face 212*d*, and causing the hook pieces 812*b* to project in the direction X beyond the side walls 80. Accordingly, the hook pieces 812*b* can be guided into the respective grooves 93, and the first shutter 622 at or adjacent to the restriction position by the first step 99 can be prevented from moving to the negative side in the direction Z.

Therefore, unintended opening of the outlet 55 can be inhibited.

It is to be noted that, although the pushers 212 deform the arms 812 of the second shutter 632 to guide the hook pieces 812*b* into the retaining grooves 93, the configurations of the pushers 212 and the arms 812 are not limited to the above-described configuration as long as each arm 812 can be moved outward in the direction X by guiding effects between the projecting edges 212*c* and the inclined contact faces 212*d* of the pusher bodies 212*b* and the inclined faces 812*e* of the projections 812*d* of the arms 812. Alternatively, for example, the edge 812*a* may be moved outward in the direction X while extending in the direction Z, causing the hook piece 812*b* to enter the retaining groove 93, as the edge 812*a* of each arm 812 moved outward contacts the side wall 71 of the first shutter 622.

It is to be noted that although one shutter protector 50*e* is provided to the end of the guide walls 50*d* on the right in FIG. 35 in the above-described configuration, the number and position thereof are not limited thereto as long as, during installation of the toner cartridge 502, the shutter protector 50*e* can contact an unintended object, if any, present on the positive side before the first and second shutters 622 and 632 contact it. Alternatively, for example, the shutter protector 50*e* can be provided to each guide wall 50*d*, or the guide wall 50*d* on the left in FIG. 35.

Additionally, although the first and second hollow cylinders 201*a* and 202*a* of the first and second positioning recesses 201 and 202 are continuous with the inner face of the developer chamber 51 in the second embodiment, the first and second hollow cylinders 201*a* and 202*a* can be designed otherwise. For example, the first and second hollow cylinders 201*a* and 202*a* may be inside the side faces of the toner cartridge 502, that is, the side wall may have a thickness to accommodate the first positioning recess 201 or the second positioning recess 202 therein.

It is to be noted that, although the toner cartridges are described as the powder containers according to the present invention, embodiments of the present invention are not limited thereto as long as the powder container includes a powder chamber for containing powder, a powder outlet formed in a face of the powder container (or face of the powder chamber), and a shutter assembly to open and close the powder outlet, including a first shutter and a second shutter. The first shutter is movable between a sealing position to close the powder outlet and an open position to open the powder outlet and includes a pressed member to cancel retention of the first shutter at the sealing position, and the second shutter includes a pressing projection that interferes with the pressed member of the first shutter and is movable between a shielding position to cover the pressed member without interference between the pressing projection and the pressed member and a releasing position to press the pressed member with the pressing projection.

It is to be noted that, although the hook pieces 81*b* (or 812*b*) of the arms 81 (or 812) of the second shutter 63 and the retaining grooves 93, in particular, the walls 93*a*, of the cartridge mount 90 (or 902) inhibit the second shutter 63 (or 632) from moving to the negative side in the direction Z from the restriction position by the second step 98 in the above-described first and second embodiments, this feature is not so limited as long as the second shutter 63 can be retained at or adjacent to the restriction position by the second step 98 while the toner cartridge 50 (or 502) is moved in the removal direction relative to the cartridge mount 90.

Additionally, although the first shutter 62 is inhibited from moving from the restriction position by the first step 99 to the negative side in the direction Z by the pawls 95 of the cartridge mount 90 and the engaging portions 75 (the hooks 75*a*) of the side walls 71 of the first shutter 62, this feature is so not limited as long as the first shutter 62 can be retained at or adjacent to the restriction position by the first step 99 while the toner cartridge 50 is moved in the removal direction relative to the cartridge mount 90.

Additionally, the toner supply device 43 can adapt to single-color image forming apparatuses instead of the multicolor image forming apparatus 10 (or 102).

Additionally, although two-component developer consisting essentially of carrier (carrier particles) and toner (toner particles) is used in the above-described embodiments, the features of the present invention can adapt to one-component developer. For example, powder containers as the embodiments of the present invention can contain toner, carrier to electrostatically adsorb toner, or mixture (i.e., premixed toner) of toner and carrier. In each case, similar effects can be attained.

Figure 52:
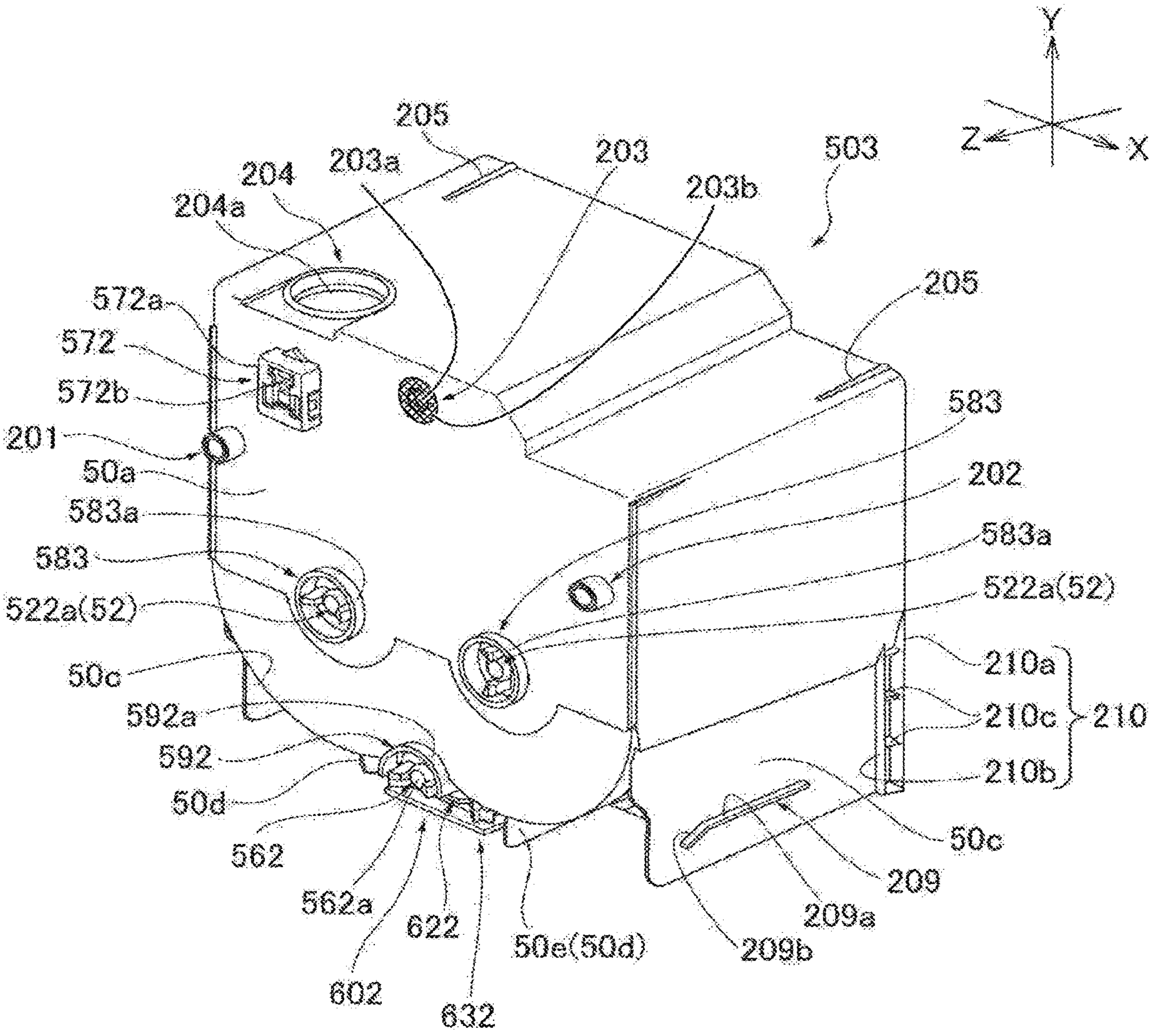
FIG. 52 is a perspective view of a toner cartridge according to another embodiment, as viewed from above and a front side.

Additionally, number of the agitator 52 in the toner cartridge 50 is not limited to one. For example, FIG. 52 illustrates a toner cartridge 503 that includes two agitators 52. In the toner cartridge 503 shown in FIG. 52, two connection openings 583 are formed in a front face (on the positive side in the direction Z) of the developer chamber 51 to expose the connected portions 522*a* of the respective agitators 52. The connection opening 583 can be configured similarly to the connection opening 58 or 582. The toner cartridge 503 has configurations similar to those of the toner cartridge 502 according to the second embodiment except the number of the agitator 52. The toner cartridge 503 can have an increased capability to agitate developer with the two agitators 52.

The configurations of each of the toner cartridge 50, the cartridge mount 90, and the image forming apparatus 10 of the first embodiment can adapt to the second embodiment or be combined with the elements of the second embodiment. Similarly, the elements of the second embodiment can adapt to the first embodiment or be combined with the elements of the first embodiment.

Numerous additional modifications and variations are possible in light of the above teachings. It is therefore to be understood that, within the scope of the appended claims, the disclosure of this patent specification may be practiced otherwise than as specifically described herein.

The invention claimed is:

1. A powder container which is attachable and detachable to and from an image forming apparatus, comprising:

a powder chamber having a powder outlet configured to discharge powder; and a shutter system to open and close the powder outlet, the shutter system including:

a first shutter positioned at a closing position configured to close the powder outlet in a condition in which the powder container is detached from the image forming apparatus, and at an opening position configured to open the powder outlet in a condition in which the powder container is attached to the image forming apparatus; and a second shutter positioned at a covering position configured to cover an edge portion of the first shutter in a condition in which the powder container is detached from the image forming apparatus, and at an exposing position configured to expose the edge portion of the first shutter in a condition in which the powder container is attached to the image forming apparatus.

2. The powder container according to claim 1, wherein:

the second shutter covers a downstream edge of the first shutter in an installation direction in which the powder container is attached to the image forming apparatus.

3. The powder container according to claim 1, wherein:

the first shutter includes a surface to cancel retention of the first shutter at a sealing position, the surface to move together with the first shutter, and said surface of the first shutter is at an end portion of the first shutter.

4. The powder container according to claim 1, wherein:

the first shutter includes a surface to cancel retention of the first shutter at a sealing position, the surface to move together with the first shutter, said surface of the first shutter is at an end portion of the first shutter, the second shutter includes a projection that contacts said surface of the first shutter, and the projection of the second shutter is at a central portion of the second shutter.

5. The powder container according to claim 1, wherein:

the edge portion of the first shutter is apart from the second shutter in the condition in which the powder container is attached to the image forming apparatus.

6. The powder container according to claim 1, wherein:

the edge portion of the first shutter moves away from the second shutter during installation of the powder container to the image forming apparatus.

7. The powder container according to claim 1, wherein:

the second shutter is restricted from moving in an installation direction before the first shutter is restricted from moving in the installation direction during installation of the powder container to the image forming apparatus.

* * * * *